(12) United States Patent
Fujiwara et al.

(10) Patent No.: US 7,549,788 B2
(45) Date of Patent: Jun. 23, 2009

(54) FLUID MIXING APPARATUS AND FLUID MIXING SYSTEM

(75) Inventors: Takayuki Fujiwara, Kanagawa (JP); Mamoru Fujisawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 188 days.

(21) Appl. No.: 10/831,120

(22) Filed: Apr. 26, 2004

(65) Prior Publication Data

US 2004/0213083 A1 Oct. 28, 2004

(30) Foreign Application Priority Data

Apr. 28, 2003 (JP) ............................. 2003-123864
Mar. 24, 2004 (JP) ............................. 2004-086528

(51) Int. Cl.
*B01F 5/00* (2006.01)
*B01F 3/00* (2006.01)

(52) U.S. Cl. ................. 366/336; 366/172.1; 366/172.2; 366/172.3

(58) Field of Classification Search ................. 366/336, 366/172.1, 172.2, 172.3
See application file for complete search history.

(56) References Cited

U.S. PATENT DOCUMENTS

| | | | |
|---|---|---|---|
| 5,305,638 A | 4/1994 | Saghatchi et al. | |
| 5,484,697 A | 1/1996 | Mignot et al. | |
| 5,534,328 A | 7/1996 | Ashmead et al. | |
| 5,690,428 A * | 11/1997 | Bryan et al. | 366/172.1 |
| 6,838,232 B2 * | 1/2005 | Nagasawa et al. | 430/449 |
| 2002/0043801 A1 | 4/2002 | Ogawa | |
| 2002/0124896 A1 | 9/2002 | O'Connor et al. | |

FOREIGN PATENT DOCUMENTS

| | | |
|---|---|---|
| DE | 199 17 330 A1 | 10/2000 |
| DE | 202 01 753 U1 | 5/2002 |
| DE | 202 06 371 U1 | 6/2002 |
| DE | 101 48 615 A1 | 4/2003 |
| EP | 1 222 957 A1 | 7/2002 |
| JP | 2002-292274 A | 10/2002 |
| WO | WO 00/62914 A1 | 10/2000 |
| WO | WO 02/064247 A1 | 8/2002 |

OTHER PUBLICATIONS

Japanese Abstract No. 63319030, dated Dec. 27, 1988.
Bertsch A et al., 3D Micromixers—Downscaling Large Scale Industrial Static Mixers, Proceedings of the IEEE 14$^{TH}$. Annual International Conference on Microelectro Mechanical Systems. MEMS 2001. Interlaken, Switzerland, Jan. 21-25, 2001, IEEE International Micro Electro Mechanical Systems Conference, New York, NY: IEEE, US, vol. CONF. 14, Jan. 21, 2001, pp. 507-510, XP010534659.

* cited by examiner

*Primary Examiner*—Krishnan S Menon
(74) *Attorney, Agent, or Firm*—Sughrue Mion, PLLC

(57) ABSTRACT

In a fluid mixing apparatus and a fluid mixing system including the apparatus, a micro-reactor has a plate sandwiched by a lid member and a receiving member. In the plate, a plate through hole, a slit cylindrical through hole, and an outer layer channel are formed, and three fluids flowing in the lid member are allowed to flow out in the same direction, respectively. Further, in the micro-reactor, the receiving member having a mixing channel having an outer periphery in the same form as an outermost periphery of the outer layer channel is provided detachably to the plate.

24 Claims, 47 Drawing Sheets

FLUID MIXING APPARATUS AND FLUID MIXING SYSTEM

CROSS-REFERENCE TO RELATED APPLICATION

This application claims priority under 35 USC 119 from Japanese Patent Application Nos. 2003-123864 and 2004-86528, the disclosure of which is incorporated by reference herein.

BACKGROUND OF THE INVENTION

1. Field of the Invention

The present invention relates to a fluid mixing apparatus and a fluid mixing system for mixing two or more inflow fluids or causing reaction between them.

2. Description of the Related Art

Recently, a chemical reaction in which materials are diffused in a short period of time in micro-channels has attracted attention as an innovative technology for making reacting and mixing more efficient and faster, and a precise reacting and mixing system (micro-reactor) for chemical solutions and the like using micro-channels formed by a micro-manufacturing such as etching has been proposed.

For example, in International Patent Application No. WO 00/62914, as shown in FIGS. 53 and 54, a micro-reactor 600 for mixing two kinds of solutions is disclosed. Comb-shaped micro-channels 604 of 20 μm in width are provided so as to alternately mesh with each other, and alternately arranged fluid 1 and fluid 2 flow as a laminar flow. A discharge opening 608 has a slit shape of 60 μm in width, and disposed along a direction orthogonal to the comb-shaped micro-channels. The fluid 1 and the fluid 2 are formed in alternately arranged bands in the discharge opening and discharged.

However, in the publication No. WO 00/62914, because the kinds of fluids that can flow are limited to two, in order to allow three or more fluids to flow for mixing or reaction, plural apparatuses are required, and accordingly, these lead the following problems: (1) the structure of the apparatus becomes complex and large-scaled, and equipment cost and maintenance cost for cleaning and others become higher; (2) a large number of fluids cannot be mixed simultaneously, and the design of the reaction system becomes largely restricted (that is, three or more fluids cannot be simultaneously mixed and caused to chemically react with each other); (3) its manufacturing process is based on the silicon process used for semiconductor manufacturing, and thus, usable materials are limited and performance such as strength and chemical resistance deteriorates.

Further, the micro-reactor 600 can also be applied to reactive fluids, and a reaction product S can be efficiently obtained by causing the fluid 1 and the fluid 2 to react with each other, however, because the reaction product produced in the vicinity of inner walls of the slit adheres to the inner walls, there is a problem that the fluids cannot flow smoothly, and further, there is fear that the channels might become occluded. As measures against that, mirror polishing the inner walls of the slit and the like has been considered, however, because the channels are miniaturized, the measures have not put into practical use yet.

In addition, in U.S. Pat. No. 5,534,328, as shown in FIG. 55, a micro-reactor 610 comprised by laminating plates on which micro-channels are formed is disclosed. The micro-channels are processed on the plates having good manufacturing aptitude, and a three-dimensional micro-reactor having a complex construction is manufactured by laminating the plates.

However, gaps produced in bonded surfaces between adjacent plates and bumps of through holes cannot be eliminated. Accordingly, there has been a problem that the gaps and bumps cause a turbulent flow. Further, because the reaction product easily adheres to the gaps and steps, there has been another problem in that channels might be occluded.

In order to solve these problems, in Japanese Patent Application (JP-A) No. 2002-292274, as shown in FIGS. 56A through 56C, a micro-reactor 620 provided with introduction channels combined into a main channel has been proposed. In this micro-reactor 620, the fluid 2 is prevented from contacting with the main channel walls by allowing the fluid 2 to flow from the introduction channel 624 into the fluid 1 flowing through the main channel 622, thus, the occlusion of the micro-channels caused by adherence of the reaction product to the channel walls is reduced.

However, in JP-A No. 2002-292274, because the micro-reactor 620 is formed by allowing the main channel to penetrate the introduction channels, the manufacturing aptitude is not very good compared to the micro-reactor 610 in U.S. Pat. No. 5,534,328 using LIGA process and the like. Thus, in the case of mass production of the micro-reactor 620, it is assumed that there will be difficulties with regard to production time and production cost. The LIGA process is a manufacturing method for mass-producing components by molding after manufacturing a mold with nickel or the like (electro-molding) with a master formed by a semiconductor manufacturing method such as lithography and precision etching as an original form.

Because it is important for the micro-reactor that micro-channels be formed within the micro-space, increasing in yield by essentially the enlargement of the apparatus cannot be expected. Furthermore, the yield obtained from each micro-reactors is a minute amount. Accordingly, increasing in the number of apparatuses becomes important for increasing the yield. Thus, a micro-reactor is required to have good manufacturing aptitude, that is, it can be mass-produced at low cost in a short period of time.

In addition, in the publications of U.S. Pat. No. 5,534,328 and JP-A No. 2002-292274, because the micro-reactor cannot be easily disassembled into component members, there have been difficulties in that maintenance of the apparatus and replacement of-components are not easy.

As described above, a micro-reactor that satisfies all of the followings (1) to (4) has not been realized. That is, (1) channels are prevented from being occluded with the reaction product by covering the channel wall with a fluid; (2) manufacturing appliance is good and desired yield can be obtained by increasing the number of apparatuses; (3) three or more fluids are efficiently mixed or caused to react with each other; and (4) maintenance and the like can be easily performed.

SUMMARY OF THE INVENTION

One of the subjects of the present invention is to provide a fluid mixing apparatus and a fluid mixing system capable of preventing reaction products from adhering to the channel wall, being mass-produced at low cost, and having ease of maintenance.

A first aspect of the invention is to provide a fluid mixing apparatus for mixing different kinds of fluids, comprising the parts as separate members: a concentrically rectifying portion for allowing fluids that have flown in to flow out as concentric flows corresponding to the number of kinds; and a fluid mixing portion for mixing the concentric flow that has flown out from the concentrically rectifying portion.

The form of the outflow port of the concentrically rectifying portion is not limited particularly. The channel formed within the concentrically rectifying portion is often a micro-channel, and, to form the micro-channel, micro electric discharge machining, ultra-precise machining (cutting, grinding, and the like), etching such as ICP, and the like are used. By machining using such machining method, freedom of choice of materials of component members can be improved. Further, with the plate manufactured by the machining method as a form, mass production technologies such as LIGA process, molding, hot emboss, fine blanking, injection molding, and the like can be applied.

The fluids that have flown respectively into the concentrically rectifying portion flow out concentrically, flow into the fluid mixing portion, and are mixed. As a result of mixing, a reaction may occur.

At that time, by adjusting the flow volume, flow rate, fluid concentration, and the like of the fluids respectively allowed to flow into the concentrically rectifying portion and allowing them to flow out concentrically in a laminar flow, chemical reaction can be precisely controlled. For example, in the case photosensitive emulsion is produced as a reaction product, particle diameters of emulsification and diffusion can be controlled easily. In order to make the speed of mixing and reaction faster, the fluids may be allowed to flow out as a turbulent flow. Further, because the channel wall is protected by the fluid of the outermost layer flowing out in the laminar flow, occlusion of the outflow channel due to adherence of the mixture and reaction product to the channel wall can be prevented from being produced, and, even if the reaction product is a fluid having strong corrosive nature, the channel wall can be prevented from corrosion.

Thus, in the invention, because the concentrically rectifying portion and the fluid mixing portion are made separated, and the fluids that have flown in are allowed to flow out as concentric flows corresponding to the number of kinds, the mixed flow formed by mixing in the fluid mixing portion hardly contacts the channel wall of the concentrically rectifying portion in which micro-channels are often formed. Therefore, an adherent material easily generated within the mixed flow hardly adheres to the channel wall within the concentrically rectifying portion.

Furthermore, the apparatus is easily made to have a construction in which a wide variety of fluids are allowed to flow out in a multilayer form, and, by adopting such construction, freedom of choices of mixing conditions can be improved.

In the invention, the concentrically rectifying portion may have a plate form and include plural outflow channels for allowing a number of fluids as concentric flows to flow and may be detachably mounted to the fluid mixing portion.

Because the concentrically rectifying portion and the fluid mixing portion are detachably mounted, thereby, when operation such as maintenance and replacement (hereinafter, referred to as maintenance) is performed, maintenance can be performed by detaching only a target component. Thus, maintenance becomes remarkably easier, and time required for the maintenance can be drastically shortened. Further, because the concentrically rectifying portion has a plate form, it is easily attached to and detached from the fluid mixing portion.

In the invention, a lid portion to which an inflow pipe is connected for guiding the fluid from the inflow pipe to an inflow port of the concentrically rectifying portion may be detachably mounted to an inflow port side of the concentrically rectifying portion.

Thereby, the concentrically rectifying portion further becomes easier to be attached and detached.

In the invention, positioning holes may be formed in the lid portion, the concentrically rectifying portion, and the fluid mixing portion, and the relative positions of the lid portion, the concentrically rectifying portion, and the fluid mixing portion may be positioned by a positioning pin penetrating the positioning holes.

Thereby, positioning of the lid portion, the concentrically rectifying portion, and the fluid mixing portion can be easily performed.

In the invention, spigot structure portions may be formed in the lid portion, the concentrically rectifying portion, and the fluid mixing portion, and the relative positions of the lid portion, the concentrically rectifying portion, and the fluid mixing portion may be positioned by the spigot structure portions.

Thereby, positioning of the lid portion, the concentrically rectifying portion, and the fluid mixing portion can be easily performed.

In the invention, the concentrically rectifying portion may have a plate form and includes plural outflow channels for allowing fluids as concentric flows, and the concentrically rectifying portion and the fluid mixing portion are bonded by hot direct bonding or cold direct bonding. Thereby, screw cramping becomes unnecessary.

In the invention, the concentrically rectifying portion and the fluid mixing portion may be manufactured by forming a large number of the parts on a wafer in an arranged state and dicing them. Thereby, because manufacturing appliance is good, the fluid mixing apparatus can be produced by an existing mass production machining technology with high manufacturing efficiency. Note that the material constituting the wafer is not limited to semiconductor. For example, a wafer made of SUS can be wet etched, and realize the same mode. Further, by using the wafer made of SUS, a fluid having corrosion behavior can be handled.

In the invention, a large number of the concentrically rectifying parts and the fluid mixing parts may be formed on a wafer or a blank material, and a channel plate for supplying fluids from one or a small number of supply ports to the large number of the concentrically rectifying parts and the wafer or the blank material may be coupled.

Thereby, in the case where a large amount of reaction products is manufactured by increasing the number of apparatuses, time required for the piping operation can be drastically reduced. In such construction, there is fear that the channels are occluded in the conventional normal fluid mixing apparatus, however, by adopting the concentric type as in the invention, a large scaled apparatus in which occlusion hardly occurs can be constructed.

In the invention, mixed fluids discharged from a large number of the fluid mixing parts may be taken out from one or a small number of take-out ports.

Thereby, the effect obtained in the invention can be made more significant.

In the invention, a tapered portion may be formed in a direction in which an outflow cross section area is enlarged on at least one channel wall of the plural outflow channels. Thereby, rectification effect becomes easier to be obtained and the concentrically rectifying portion can be produced with high efficiency by injection molding.

In the invention, an outflow port area of the plural outflow channels may be set according to concentration of fluids to be allowed to flow in the concentrically rectifying portion so that a flow volume ratio of the fluids respectively flowing out from the plural outflow channels becomes a mixing ratio necessary for a product formed by mixing.

Thereby, mixing and reaction are completed with no excess or deficiency, and time required for mixing and reaction can be shortened.

In the invention, a rib may be provided along an outflow direction between an innermost channel wall portion forming an innermost channel located innermost of the plural outflow channels and an adjacent channel wall portion located outside of the innermost channel wall portion and forming an outflow channel between the innermost channel wall portion and itself, and the innermost channel wall portion may be supported onto the adjacent channel wall portion by the rib.

Thereby, the structure holding the innermost channel wall portion can be simplified, and the flow within the channel formed between the innermost channel wall portion and the adjacent channel wall portion is kept undisturbed.

In the invention, an downstream portion side of the rib may be eliminated. Thereby, because the outflow port of a adjacent out flow channel has a continuous annular form, the fluid flowing out from the adjacent out flow channel can be made in a contact state over the entire outer peripheral area of the fluid flowing out from the innermost outflow channel.

In the invention, the downstream portion side of the rib is chamfered or streamlined. Thereby, the flow of the fluid flowing along the rib side surface can be further prevented from being disturbed.

In the invention, an annular channel may be formed by putting a core material through the innermost outflow channel.

Thereby, the fluid resistance that the outermost layer fluid receives from the channel wall and the fluid resistance that the innermost layer fluid receives from the channel wall (core material surface) can be made equal. Further, because the width of the innermost layer can be made narrow, a large scaled fluid mixing apparatus can be realized.

In the invention, a cross section area of at least one of the plural outflow channels may have a polygonal form or a contact area enlargement form in and out of which the channel wall comes.

Because the polygonal form can be adopted, the freedom of the cross section form of the outflow channel is increased. Further, because the contact interface area between the fluids can be made larger by adopting the contact area enlargement form, the reaction time can be shortened, and the yield per one fluid mixing apparatus can be drastically increased.

In the invention, a turbulence plate in which a turbulence generating hole for generating a turbulent flow by passage of fluids is formed between the concentrically rectifying portion and the fluid mixing portion may be included. Thereby, the time required for mixing can be shortened.

In the invention, the fluid mixing apparatuses may be serially connected, and fluids mixed in the upstream side fluid mixing apparatus may be allowed to flow in one inflow port of the downstream side fluid mixing apparatus, and fluids to be mixed may be further allowed to flow in the other inflow port of the downstream side fluid mixing apparatus.

Thereby, the number of layers of the fluids allowed to flow out can be increased without enlarging the diameter of the concentric flows.

In the invention, the fluid mixing apparatuses may be serially connected with a plate-form connecting member therebetween, and an inflow port for allowing fluids to be mixed to flow in may be further formed in the connecting member.

Thereby, a region that easily receives deformation force such as the pipe connecting the concentrically rectifying portion can be eliminated and a connector for connecting the pipe is dispensed with, and thereby, the apparatus construction can be made compact.

In the invention, plural of the concentrically rectifying parts may be formed in one plate. Thereby, the number of apparatuses of the fluid mixing apparatus can be increased, and high density packaging can be performed.

In the invention, fluid mixing apparatuses having any one of the above described constructions may be modularized and connected to each other. Thereby, a pipe and a connector for connecting micro-reactors need not be provided, and a compact fluid mixing apparatus can be realized.

In the invention, a concave portion may be formed in the concentrically rectifying portion, and a convex portion that enters the concave portion may be formed in the fluid mixing portion, and the outermost outflow channel may be extended by clearance formed by the concave portion and the convex portion.

Thereby, the operation of machining the extended portion of the outflow channel within the concentrically rectifying portion can be omitted partially. This exerts a large effect to the shortening of the manufacturing time and the facilitating of the manufacture especially in the case where micro-channels are required to be formed.

In the invention, a temperature sensor for measuring temperature of fluids and a heater for heating fluids within the channels may be provided in the concentrically rectifying portion. Thereby, highly precise temperature control can be performed, and the reaction can be made uniform and highly efficient.

In the invention, the temperature sensor and the heater may be embedded in the concentrically rectifying portion.

The embedding may be performed by mounting by a MEMS technology, for example. The MEMS technology is an abbreviated expression of micro electro mechanical system and a technology used in the semiconductor device manufacture.

By constructing as such, a high precision temperature sensor and heater can be provided easily in the concentrically rectifying portion.

In the invention, the concentrically rectifying portion and the fluid mixing portion may be consisted of a magnetic material, and may be attracted to each other by magnetic force. Thereby, a gap is hardly produced between the concentrically rectifying portion and the fluid mixing portion when using the fluid mixing apparatus. Further, by allowing a magnetic fluid in the outermost layer, a magnetic protective layer can be formed on the inner surface of the micro-channels and the pipes, and thereby, coverage effect of the channel wall can be improved.

A second aspect of the invention is to provide a fluid mixing system includes: a fluid mixing apparatus of the first aspect of the invention; retention means for retaining a low specific gravity fluid having a lower specific gravity than fluids flowing out from the fluid mixing apparatus, and retaining a fluid having flown into the low specific gravity fluid from the fluid mixing apparatus on a lower layer side of the low specific gravity fluid; mixed product taking out means for taking out a mixed product in liquid form formed by allowing to flow out from the fluid mixing apparatus and being mixed in the retention tank; and ref lux means for taking out fluids that have flown out from the fluid mixing apparatus and been unmixed in the retention tank and refluxing them into the fluid mixing apparatus.

Thereby, an outflow pipe becomes unnecessary to be connected to the fluid mixing apparatus. Further, by controlling the temperature of the low specific gravity fluid, the reaction temperature can be precisely controlled. A third aspect of the invention is a fluid separation apparatus including a flow dividing portion having an inflow port in which different kinds of fluids flow in a concentric flow and an extraction partition wall plate portion forming at least one extraction port within the inflow port formed therein, wherein at least one layer fluid of the concentric flow having flown in the inflow port is flow divided and extracted.

Thereby, with an apparatus having a simple structure, at least one layer of the concentric flow having flown in can be extracted.

Here, by forming the extraction partition wall plate portion in multistage type, the number of layers of fluids to be extracted can be further increased, and an arbitrary layer can be extracted. Further, plural layers may be separated and extracted at a time.

A fourth aspect of the invention is a combination of the fluid mixing apparatus of the first aspect and the fluid separation apparatus of the third aspect provided on the downstream side of the fluid mixing apparatus.

Thereby, a fluid mixing and separation apparatus that obtains the advantages of the first aspect of the invention and the advantages of the third aspect of the invention is realized.

In the case where the fluid to be extracted is allowed to flow in the innermost portion of the concentric flow, the extraction port formed in the flow dividing portion is often formed in a circular form, however, in other cases, the extraction port is often formed in a circular ring form.

By changing the shape of the extraction partition wall plate portion forming this extraction port so as to make the extraction port area slightly broader, the collection efficiency of the extracted fluid can be improved. Further, by changing the shape of the extraction partition wall plate portion forming this extraction port so as to make the extraction port area slightly narrower, the purity of the extracted fluid can be improved.

DETAILED DESCRIPTION OF THE INVENTION

Hereinafter, embodiments of the present invention will be explained with reference to the embodiments. After the first embodiment, the same components as that in the previously described embodiment will be assigned with the same signs, and omitted the description thereof.

First Embodiment

Figure 1:
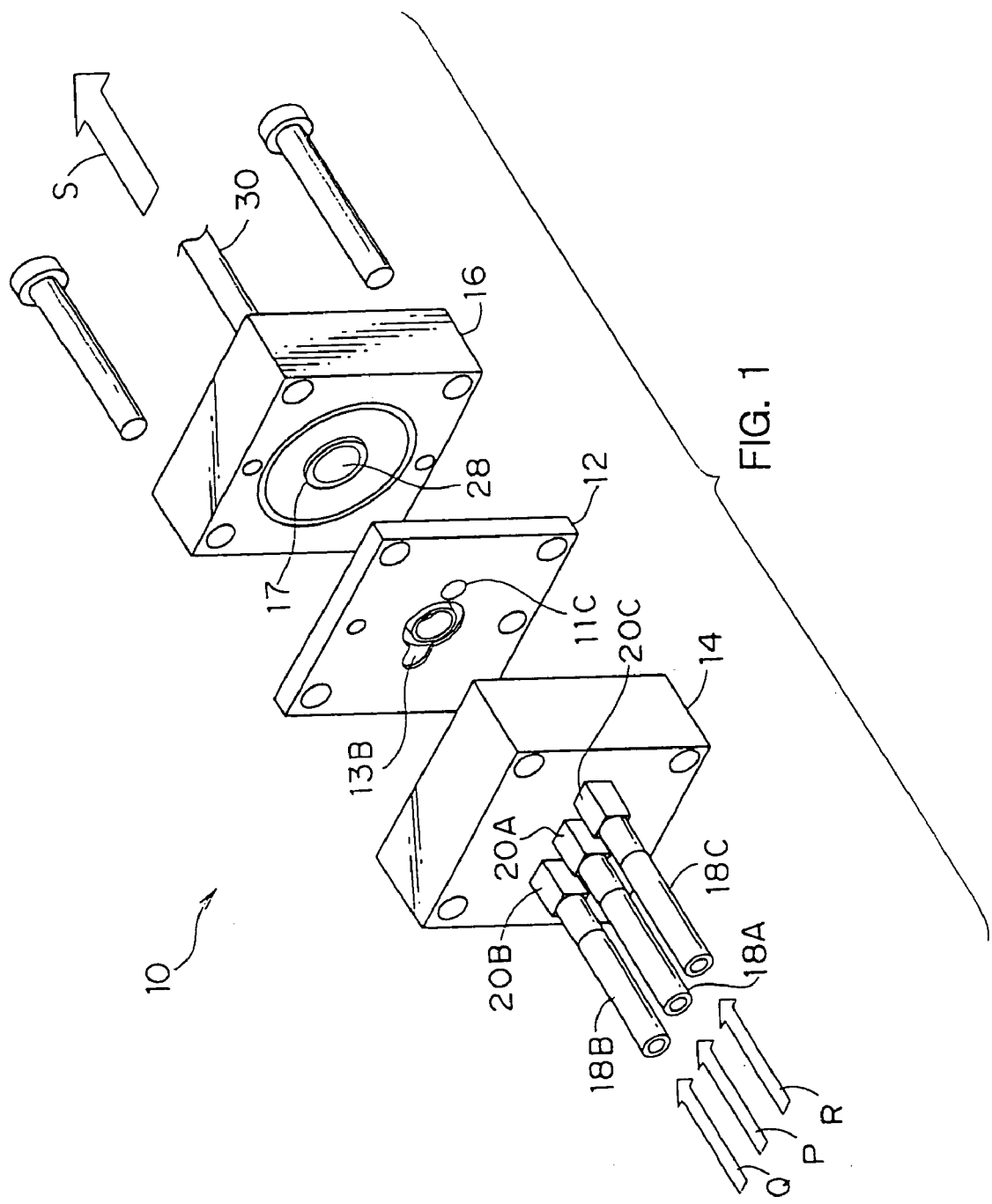
FIG. 1 is a development perspective view of a micro-reactor of a first embodiment.
Figure 2:
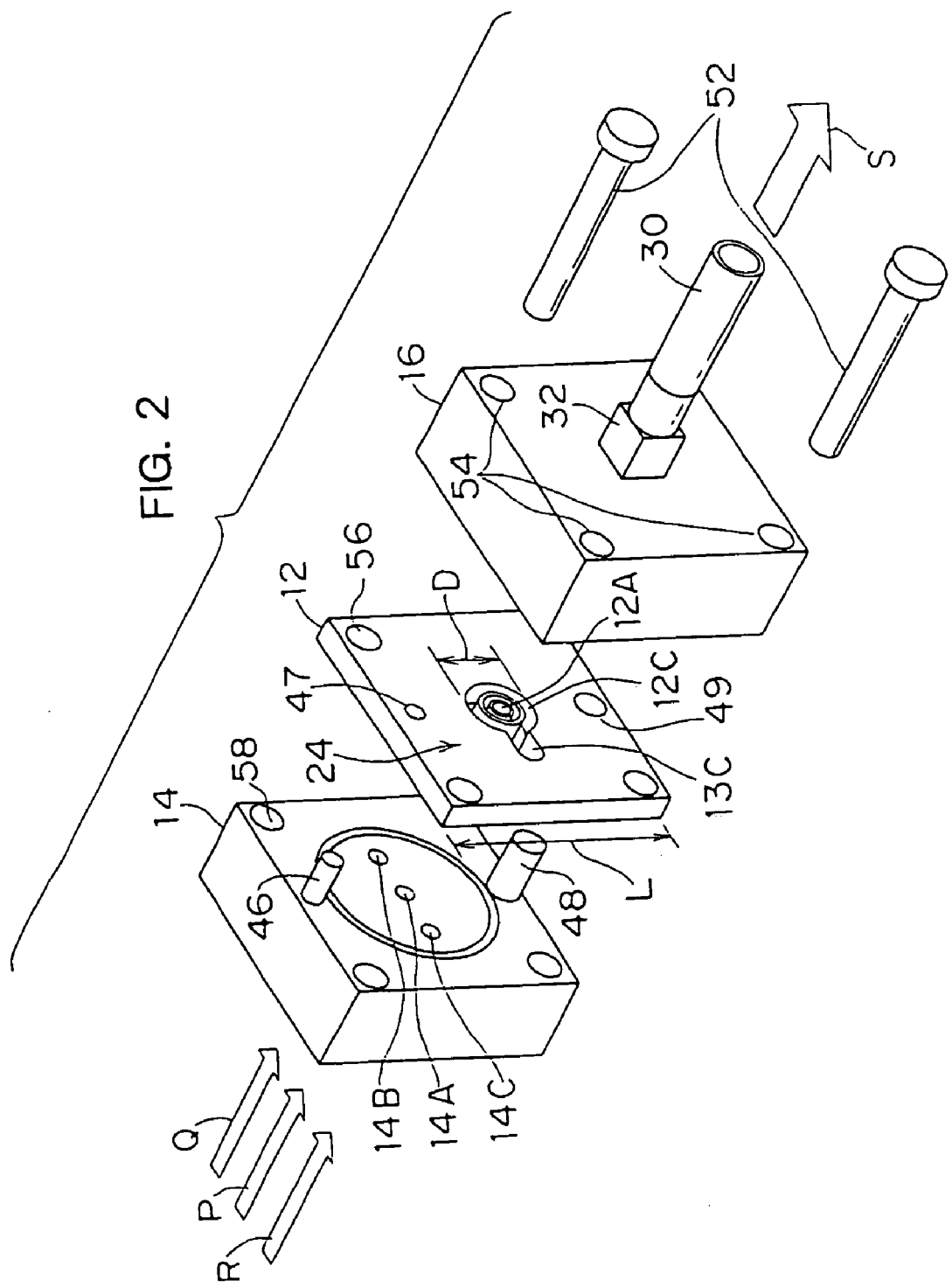
FIG. 2 is a development perspective view of the micro-reactor of the first embodiment.
Figure 3:
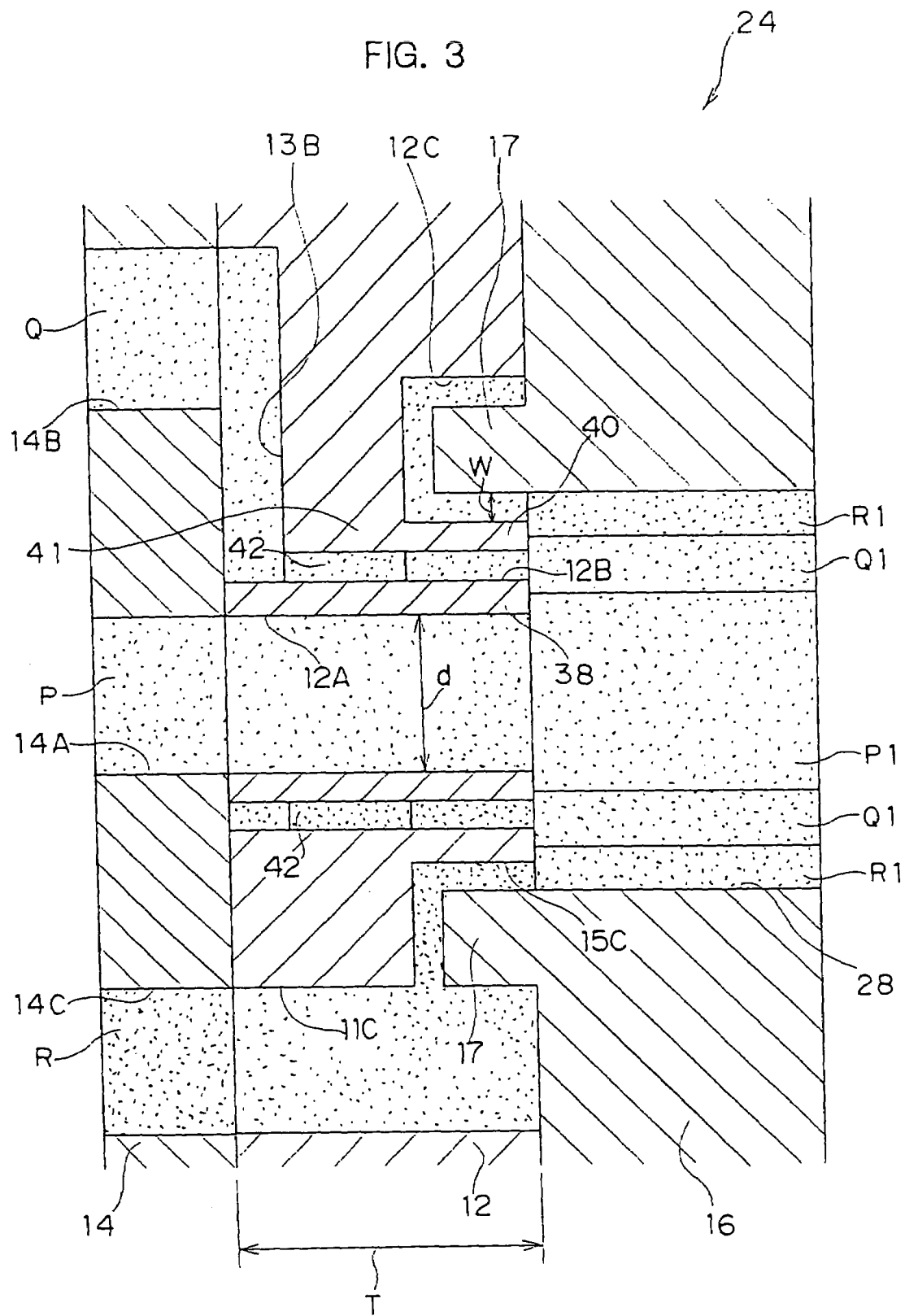
FIG. 3 is a plan sectional view showing the construction of the micro-reactor of the first embodiment.
Figure 4:
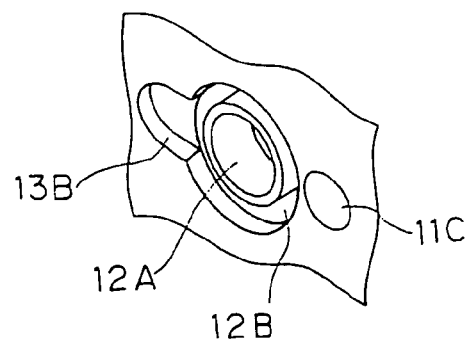
FIG. 4 is a partial perspective view showing the inflow side of a plate constituting the micro-reactor of the first embodiment.
Figure 5:
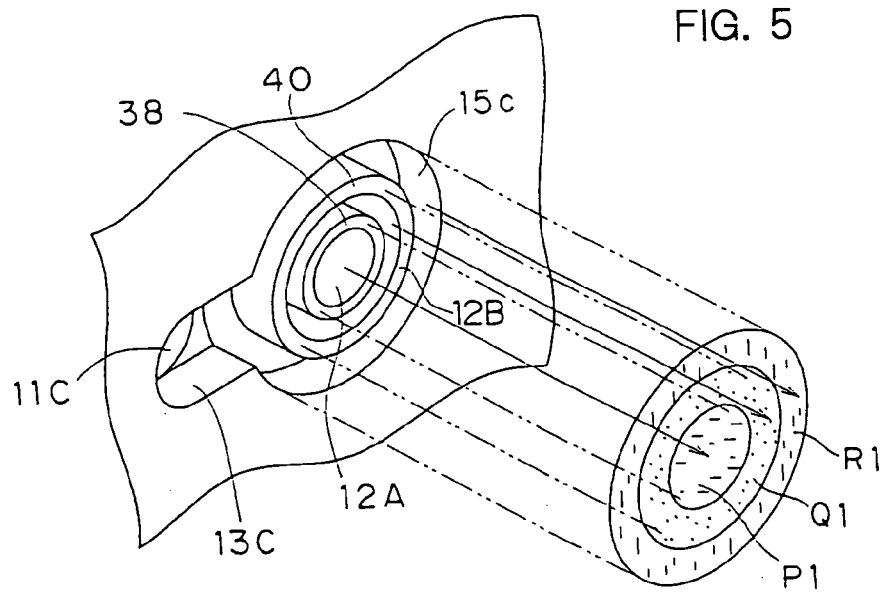
FIG. 5 is a partial perspective view showing the outflow side of the plate constituting the micro-reactor of the first embodiment.

First, the first embodiment will be described. As shown in FIGS. 1 to 3, a micro-reactor 10 according to the first embodiment is an apparatus for causing three fluids to react with each other by making them into a concentrically laminar flow and simultaneously mixing them. The micro-reactor 10 includes a plate 12, and a lid member 14 and a receiving member 16 disposed on the upstream side and the downstream side of the plate 12, respectively, so as to sandwich the plate 12.

On the upstream side of the lid member 14, connectors 20A to 20C on which three inflow pipes 18A to 18C are detachably mounted are provided. In the plate 12, micro-channels 24 for making the fluids to concentrically flow out from the pipes 18A to 18C are formed. In the receiving member 16, a mixing channel 28 for simultaneously mixing the three fluids flowing out from the micro-channels 24 to make them into mixed fluids (reaction product) is formed, and, on the downstream side of the receiving member 16, a connector 32 on which an outflow tube 30 is detachably mounted is provided.

As shown in FIG. 3, in the lid member 14, lid member through holes 14A to 14C in which the fluids from the pipes 18A to 18C flow, respectively, are formed.

As shown in FIGS. 3 to 6, at the center of the plate 12, a plate through hole 12A that communicates the lid member through hole 14A is formed. The inner diameter of the plate through hole 12A is determined so that the fluid may flow in a laminar flow within the plate through hole 12A (that is, Reynolds number may be equal to or less than 2320). Further, the lid member through hole 14A and the plate through hole 12A are made to have the same diameter so that no step is produced between the lid member through hole 14A and the plate through hole 12A.

In addition, in the plate 12, a slit cylindrical through hole 12B formed in a slit form around the plate through hole 12A and a radial channel 13B that communicates the slit cylindrical through hole 12B and the lid member through hole 14B are formed. The channel cross section area of the radial channel 13B is set so as not to be a bottle neck.

Furthermore, in the plate 12, a thick and short cylindrical concave portion 12C formed around the slit cylindrical through hole 12B, an outer layer through hole 11C that communicates the lid member through hole 14C, and a radial channel 13C (see FIG. 2) that communicates the outer layer through hole 11C and the thick and short cylindrical concave portion 12C are formed. The radial channel 13C is formed substantially in a symmetrical position to the radial channel 13B, and the channel cross section area of the radial channel 13C is set so as not to be a bottle neck.

The plate through hole 12A and the slit cylindrical through hole 12B are partitioned by an inside partition wall plate portion 38 in a thin and short cylindrical form, and the slit cylindrical through hole 12B and the thick and short cylindrical concave portion 12C are partitioned by a middle partition wall plate portion 40 in a thin and short cylindrical form.

The plate 12 has a channel wall forming portion 41 that forms the bottom portion of the thick and short cylindrical concave portion 12C and the channel wall on the outer periphery side of the slit cylindrical through hole 12B, and the middle partition wall plate portion 40 extends out from the innermost side of the channel wall forming portion 41 along the outflow direction.

As shown in FIG. 2, the length L of one side of the plate 12 is made longer than 1.5 times the outer diameter D of the thick and short cylindrical concave portion 12C. If L is shorter than that, the formation of the micro-channels 24 by machining is not easy. The plate 12 may be manufactured by bonding two plate members after machining them, respectively, or, by cutting one plate member.

As shown in FIG. 3, the above described mixing channel 28 is formed in the receiving member 16, and the fluids respectively flowing out from the thick and short cylindrical concave portion 12C, the slit cylindrical through hole 12B, and the plate through hole 12A are mixed in the mixing channel 28 and react with each other. Further, on the upstream side of the receiving member 16, a ring-shaped raised portion 17 inserted into the thick and short cylindrical concave portion 12C at the time of assembly of the micro-reactor 10 to form a slit ring-shaped outer layer channel 15C between the middle partition wall plate portion 40 and itself.

Figure 6:
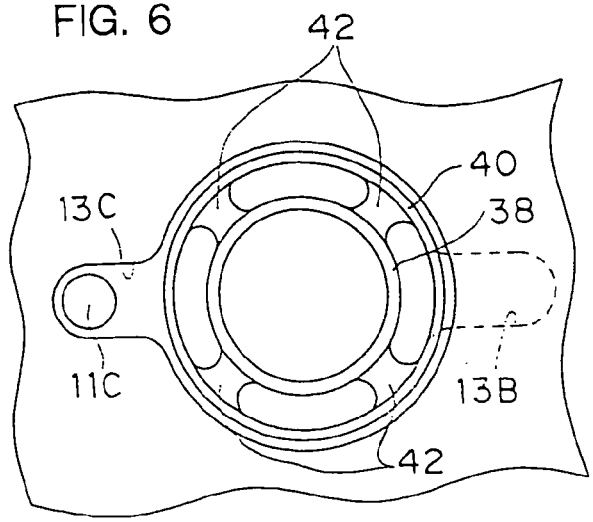
FIG. 6 is a partial front view showing the outflow side of the plate constituting the micro-reactor of the first embodiment.
Figure 7:
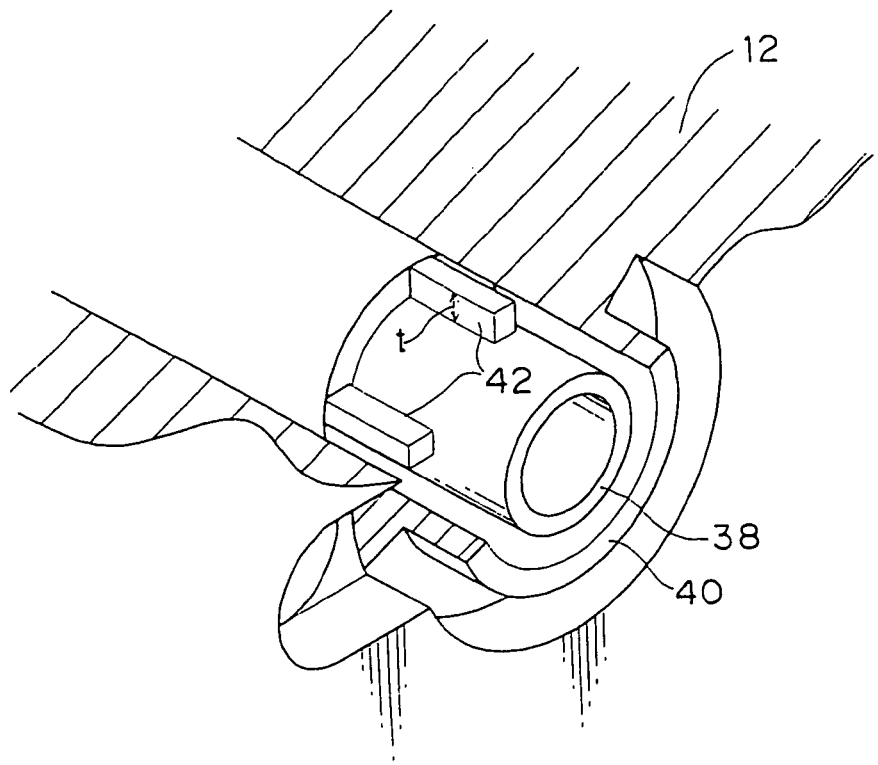
FIG. 7 is a partial perspective view showing the form of ribs of the plate constituting the micro-reactor in the first embodiment.

As shown in FIGS. 6 and 7, in the slit cylindrical through hole 12B, plural number of ribs 42 that continue from the inside partition wall plate portion 38 and the channel wall forming portion 41 are disposed. These ribs 42 are disposed so that distances between them may be nearly uniform while avoiding the space in which the radial channels 13B and 13C are formed as shown in FIG. 6. Further, the rib 42 is not provided near the outflow port of the slit cylindrical through hole 12B in order to allow the fluids in a laminar flow in a circular tube form.

By the above described construction, the fluids flowing through the outer layer channel 15C, the slit cylindrical through hole 12B, and the plate through hole 12A flow in the same direction and in a laminar flow. Therefore, these three channels set run-up sections of the respective fluids.

Figure 8:
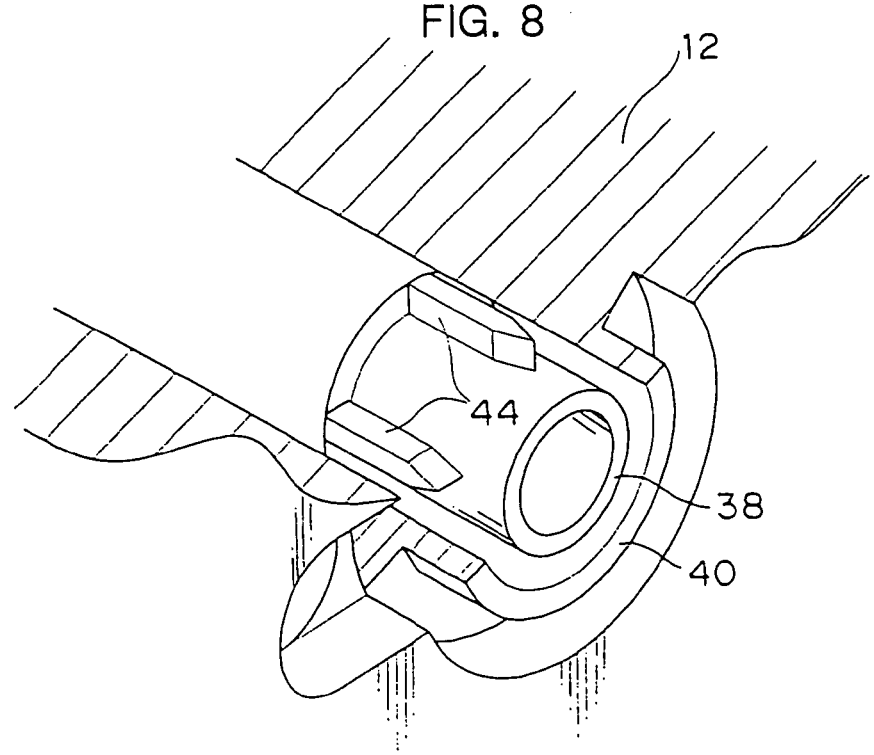
FIG. 8 is a partial perspective view showing the form of ribs of the plate constituting the micro-reactor in a modified example of the first embodiment.

Note that, in the case where the flow rate of the fluid flowing through the micro-reactor is low, it is not problematic in practical use that the rib 42 reaches the back surface of the plate 12. Further, a rib 44 having a chamfered downstream side end as shown in FIG. 8 and a rib having a streamlined downstream side end may be provided, and thereby, the flow of the fluids passing through the slit cylindrical through hole 12B can be stably made in a laminar flow at a short distance.

Figure 9:
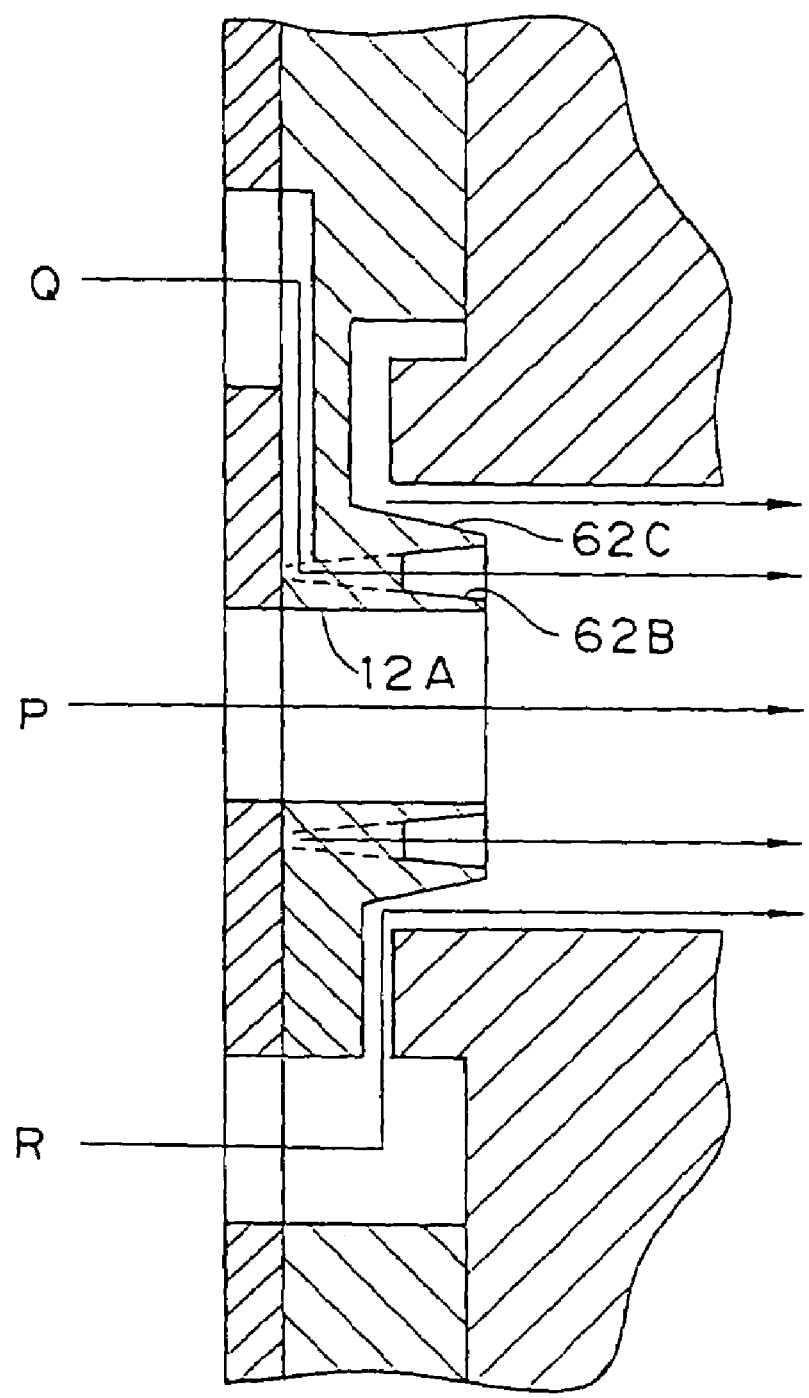
FIG. 9 is a sectional view cut with a plane passing through the opposite ribs showing the concept of a modified example of the form of the outflow channels formed in the plate constituting the micro-reactor in the first embodiment.

In addition, as shown in FIG. 9, a slit cylindrical through hole 62B and a thick and short cylindrical concave portion 62C tapered so that the openings gradually expands from the upstream side to the down stream side of the flow may be provided. Thereby, rectification effect can be obtained. Further, such tapered portion forms the so-called draft angle and the plate 12 can be mass-produced by injection molding that enables highly efficient production.

Figure 10:
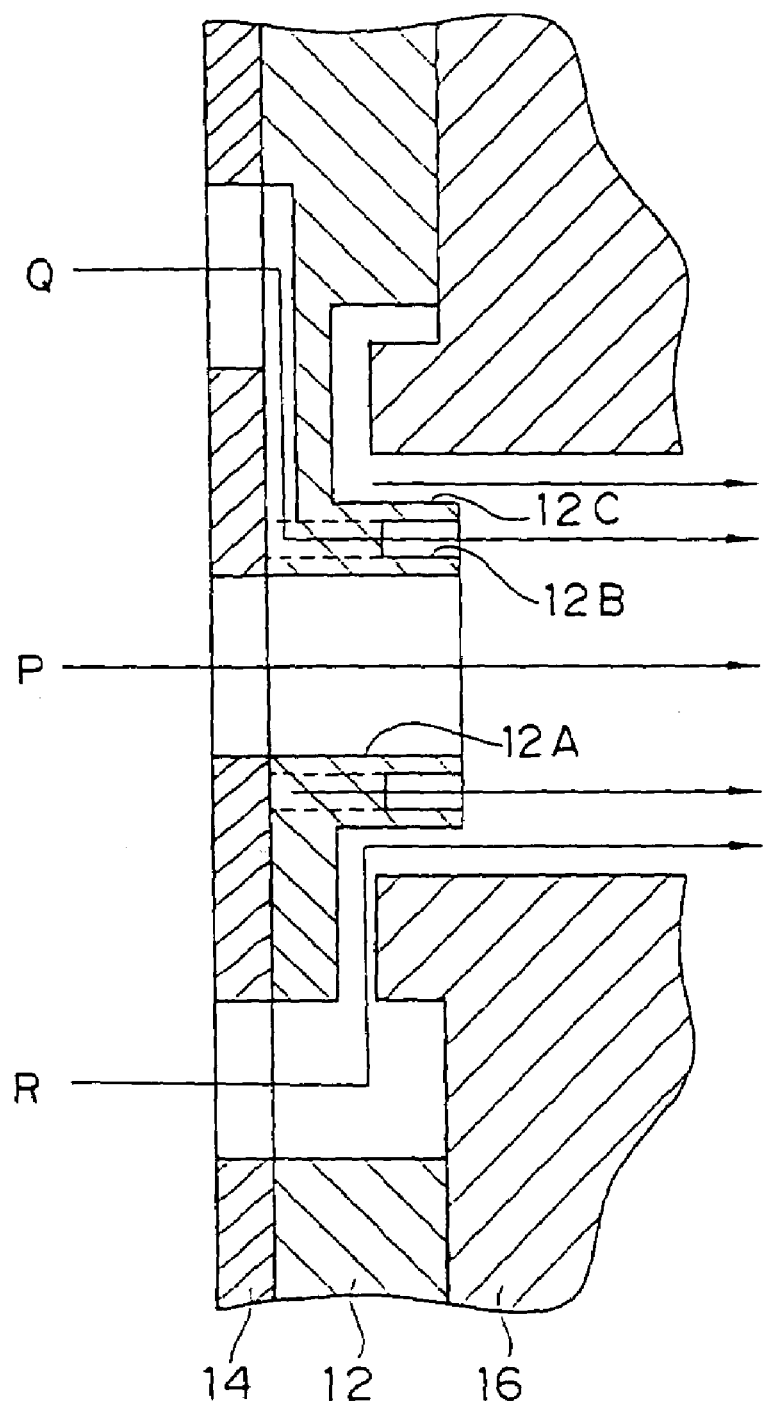
FIG. 10 is a sectional view cut with a plane passing through the opposite ribs showing the concept of the form of the outflow channels formed in the plate constituting the micro-reactor in the first embodiment.

In the case of using a machining method that does not require a draft angle such as the hot emboss process or a machining method in which tapered shaping is difficult such as precision punching machining, the tapered angle may be 0° (that is, tapered shaping may is not required) as shown in FIGS. 3 and 10. In this case, compared to the case of the tapered shape, it is often required that production conditions when using the apparatus are set by considering that conditions of the flow rate, the fluid viscosity, and the like for forming the laminar flow are restricted.

As shown in FIG. 2, inside the lid member 14, two engaging bar portions 46 and 48 extending out from the upper center and the lower center of the lid member 14, respectively, are provided, and, in the plate 12, engaged holes 47 and 49 into which the engaging bar portions 46 and 48 are inserted, respectively, are formed. By the insertion of the engaging bar portions 46 and 48 into the engaged holes 47 and 49, respectively, the relative positions between the lid member 14 and the plate 12 are positioned. The engaging bar portions 46 and 48 have different diameters from each other and the engaged holes 47 and 49 also have different hole diameters from each other, and thereby, the lid member 14 is prevented from being mounted upside down relative to the plate 12.

In four corners of the receiving member 16, through holes 54 into which coupling bolts 52 are inserted are formed, respectively. Similarly, in four corners of the plate 12, and, in four corners of the lid member 14, through holes 56 and through holes 58 are formed, respectively.

As an example of dimensions, as shown in FIG. 3, the diameter d of the plate through hole 12A is 500 µmφ, the channel width (gap) W of the slit cylindrical through hole 12B is 100 µmφ, the thickness T of the plate 12 is 600 µm, and the thickness t of the rib 42 (see FIG. 7) is 100 µm. In order to allow the three fluids to flow out in a concentrically laminar flow from the plate 12, the above described dimensions may be changed when the Reynolds number is equal to or less than the critical Reynolds number (2320 in the case of a circular tube).

Note that, because the diffusion speed of the materials desired to react is not too high normally, the larger the diameters of the plate through hole 12A, the slit cylindrical through hole 12B, and the thick and short cylindrical concave portion 12C, the longer necessary reaction time. On this account, these diameters are sometimes set to equal to or less than 1 mmφ. Further, considering restriction of machining, the relationship between flow resistance of the flowing fluid and yield, and the like, these diameters are sometimes set to equal to or more than 1 µmφ.

As materials of the members constituting the micro-reactor 10, members made of SUS (stainless steel) are often micro-electric discharge machined to form micro-channels in order to improve strength, corrosion control, and fluidity. Base materials having quality shown in Table 1 can be machined by the machining methods shown corresponding thereto to form component members of the micro-reactor 10, and thus, a wide variety of materials can be machined by a wide variety of machining methods to form component members.

TABLE 1

| Classification of Machined Materials | Quality of Machined Materials | Major Machining Methods |
| --- | --- | --- |
| Metal, alloy | Ni, Al, Cu, Ag, Au, Pt, Ta, T, SUS, Ni—Fe, Au—Pt | Ultra-precise machining, micro electric discharge machining, dry etching (ICP etc.), fine blanking (punching), water jet, laser processing, sand blast, wet etching, precision molding |
| Conductive ceramics | SiC | Ultra-precise machining, micro electric discharge machining, dry etching (ICP etc.), fine blanking (punching), water jet, laser processing, sand blast, wet etching, precision molding and sintering |
| Ceramics | Glass, $Al_2O_3$ | Ultra-precise machining, dry etching, hot emboss, water jet, laser processing, sand blast, wet etching, precision molding and sintering |
| Resin | Acryl, PP, PE | Injection molding, ultra-precise machining, hot emboss, dry etching, water jet, laser processing, sand blast, wet etching |

Further, corrosion resistance and fluidity may be improved by performing surface modification treatment such as the plasma CVD method to form a film of $SiN_4$, $SiN_2$, and $Al_2O_3$ on the surfaces of the component members of the micro-reactor 10.

As below, as the operation of the micro-reactor 10, the case where three fluids of a silver nitrate solution ($AgNO_3$ solution), a gelatin solution, and a haloid salt solution (such as XCl solution, X is selected according to the reaction to be produced) are simultaneously mixed by the micro-reactor 10 to produce a photosensitive emulsion.

In the embodiment, the silver nitrate solution P and the haloid salt solution R are prepared so that reaction may be completed at 1:1 of volumetric conversion. For this purpose, the apparatus is designed so as to complete the reaction of the silver nitrate solution P and the haloid salt solution R made in a laminar flow in the micro-channels 24 to the gelatin solution Q at the same flow rate with the same timing by setting the cross section area on the surface orthogonal to the flow direction in the plate through hole 12A and the cross section area on the surface orthogonal to the flow direction in the outer layer channel 15C as 1:1.

In the case where a difference is generated between flow rates of the silver nitrate solution P and the haloid salt solution R by the influence of the fluid viscosity, shearing resistance force produced between the haloid salt solution R and the mixing channel 28 and the inner wall of the tube 30, and the like, reaction conditions within the gelatin solution Q are optimized by adjusting concentration and pressure.

In the embodiment, the silver nitrate solution P, the gelatin solution Q, and the haloid salt solution R are allowed to flow through the pipes 18A, 18B, and 18C, respectively.

As a result, the silver nitrate solution P flows in the plate through hole 12A via the lid member through hole 14A, the gelatin solution Q flows in the slit cylindrical through hole 12B sequentially via the lid member through hole 14B and the radial channel 13B, and the haloid salt solution R flows in the outer layer channel 15C sequentially via the lid member through hole 14C, the outer layer through hole 11C, and the radial channel 13C, respectively.

Accordingly, on the downstream side of the plate 12, the silver nitrate solution P flows out from the plate through hole 12A, the gelatin solution Q flows out from the slit cylindrical through hole 12B, and the haloid salt solution R flows out from the outer layer channel 15C, respectively, and then, they flow into the mixing channel 28 of the receiving member 16 in a state in which an innermost layer is a silver nitrate solution layer P1, an intermediate layer is a gelatin solution layer Q1, and an outermost layer is an haloid salt solution layer R1.

Then, in the process of flowing through the mixing channel 28 and the tube 30, the silver nitrate solution P and the haloid salt solution R are diffused within the gelatin solution layer Q1, and react therein, and a photosensitive emulsion as a reaction product is synthesized.

As described above, because the haloid salt solution R and the silver nitrate solution P are simultaneously diffused and flow from outside and inside, respectively into the gelatin solution layer Q1 flowing into the mixing channel 28 in a laminar state to flow through the tube 30, the time taken until the reaction (mixing) ends can be drastically shortened. Further, because the haloid salt solution layer R1 flows outside the gelatin solution in the laminar flow state, the photosensitive emulsion S as a reaction product can be prevented from adhering to the channel wall of the mixing channel 28.

In addition, although there are some steps both at the connection opening between the mixing channel 28 and the connector 32 and at the connection opening between the connector 32 and the tube 27, the gelatin solution layer Q1 as a reaction layer maintains the laminar flow state (see FIG. 3) because the haloid salt solution R forms reservoirs at the steps.

For the same reason, the gelatin solution layer Q1 as a reaction layer is maintained in the laminar flow state without mirror finishing of the machining surface of the micro-channels because the haloid salt solution R forms reservoirs in the micro-convex portions on the channel wall. Further, channel occlusion can be prevented from being produced by the photosensitive emulsion S as a reaction product adhering to the rough inner surface of the channel.

As described above, in the first embodiment, the lid member 14, the plate 12, and the receiving member 16 are modularized, and all of them are detachably mounted to the micro-reactor 10. Thereby, at the time of maintenance, only a member having the need to be maintained of the lid member 14, the plate 12, and the receiving member 16 can be detached and maintained, and thus, the maintenance becomes remarkably easier and the time required for the maintenance can be drastically shortened. The advantage is not limited to the maintenance, but in the replacement of components.

In addition, because the three fluids are allowed to flow out concentrically and mixed in the mixing channel 28, instead of being mixed directly at the outflow port of the plate, the solidified matter of the reaction product can be prevented from adhering to the outflow port of the plate 12.

Further, because the structure of the micro-channels 24 has a structure in which the plate 12 can be constituted by one member, the plate 12 can be manufactured easily.

Moreover, because the haloid salt solution layer R1 is allowed to flow in a laminar flow in the outermost layer, the photosensitive emulsion S as a reaction product can be prevented from adhering to the channel wall within the mixing channel 28.

Second Embodiment

Figure 11:
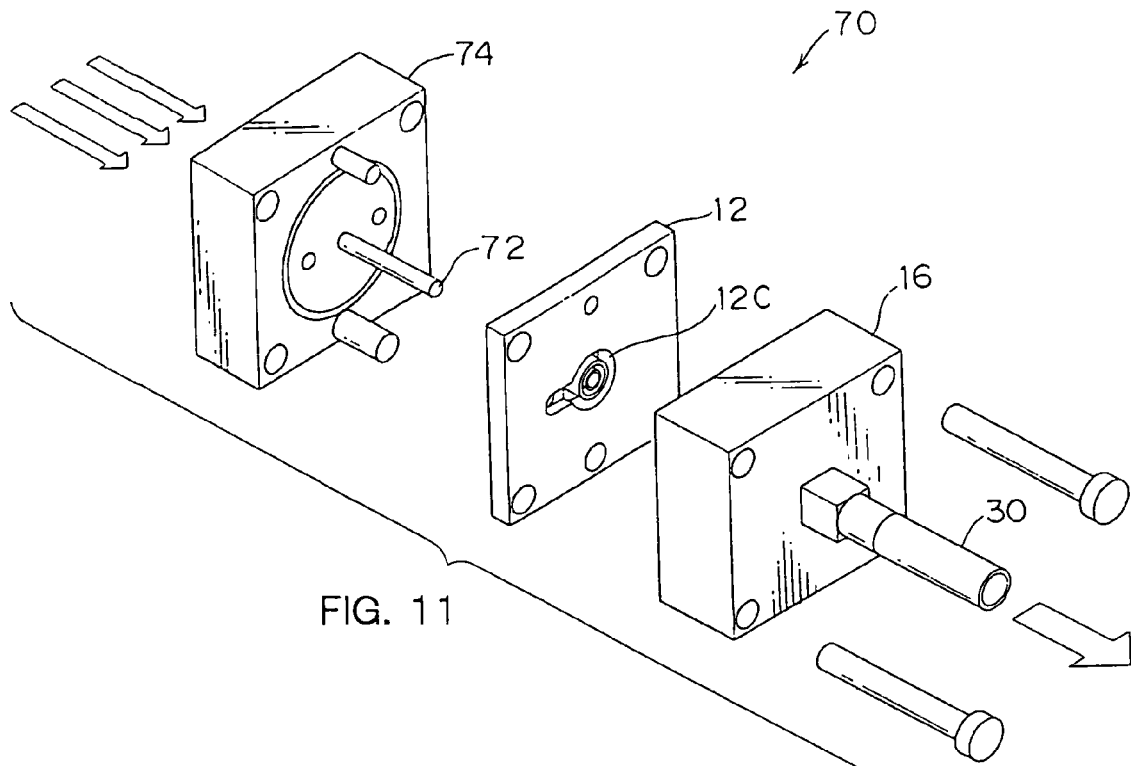
FIG. 11 is a development perspective view of a micro-reactor of a second embodiment.

Next, the second embodiment will be described. As shown in FIG. 11, compared to the first embodiment, a micro-reactor 70 according to the second embodiment includes a lid member 74 having a cylindrical core material 72 to be inserted into the plate through hole 12A in place of the lid member 14 (see FIGS. 1 and 2) and an annular channel is formed by the core material 72 and the inside partition wall plate portion 38.

Thereby, by setting the diameter of the core material 72 after preadjustment, the fluid resistance that the outermost layer (for example, the haloid salt solution layer) flowing into the mixing channel 28 (see FIG. 3) receives from the channel wall and the fluid resistance that the innermost layer (for example, the silver nitrate solution layer) receives from the channel wall (core material surface) can be made equal. Further, because the width of the innermost layer (that is, the channel width formed by the core material 72 and the inside partition wall plate portion 38 (see FIG. 3)) can be made narrower even when the diameters of the slit cylindrical through hole 12B and the mixing channel 28 (both see FIG. 3) are made larger, a large scaled micro-reactor of equal to or more than 1 mmφ can be realized. Further, because the area of the contact interface between the fluids can be made larger, the yield per one micro-reactor can be drastically increased.

Third Embodiment

Figure 12:
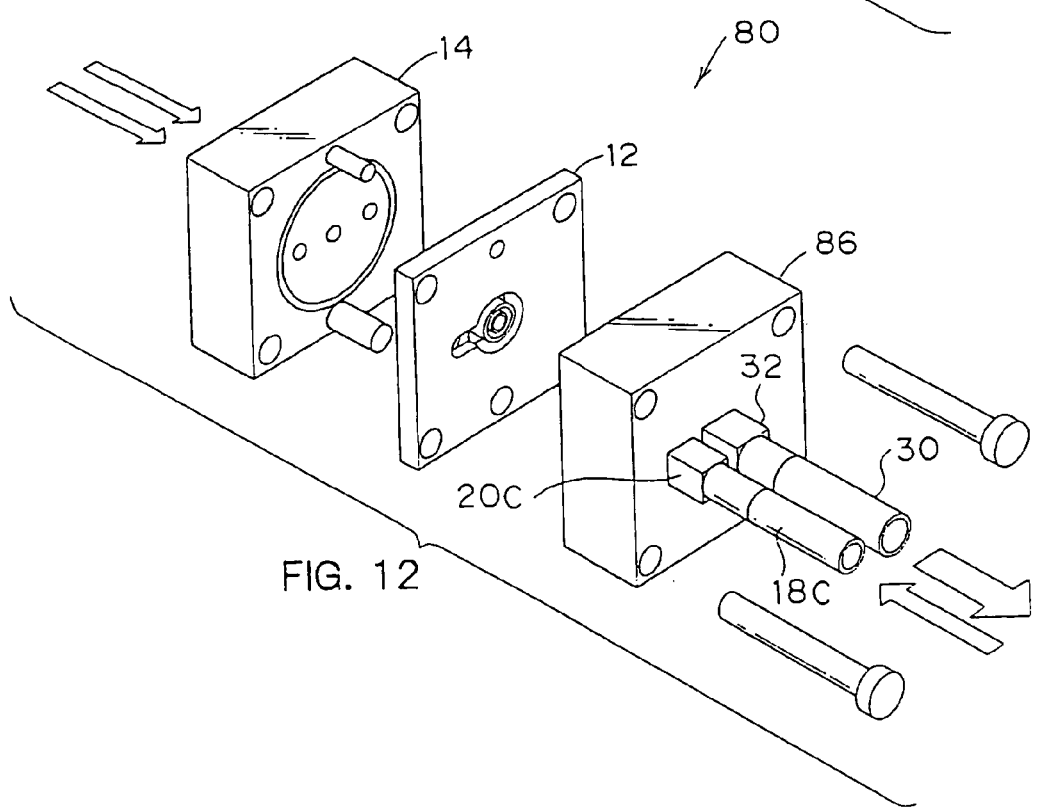
FIG. 12 is a development perspective view of a micro-reactor of a third embodiment.

Next, the third embodiment will be described. As shown in FIG. 12, compared to the first embodiment, a micro-reactor 80 according to the third embodiment is an example in which the connector 20C is provided to a receiving member 86 that sandwiches the plate 12 between the lid member 14 and itself, and the pipe 18C is connected to the connector 20C.

In the case where the tube 30 is allowed to pass through a heat medium such as a hot water bath for temperature control in order to perform acceleration of the reaction, as described in the first embodiment, the connector 20C is often provided on the same side as the side where the connectors 20A and 20B (see FIG. 1) are mounted, however, in the case where the tube 30 is unnecessary to be allowed to pass through the heat medium, this embodiment is effective as an embodiment in which the freedom of the position where the pipe 18C is located is provided, and the outer layer through hole 11C (see FIGS. 1 and 3) as described in the first embodiment is formed in the receiving member 86 instead of being formed in the lid member 14.

Fourth Embodiment

Figure 13:
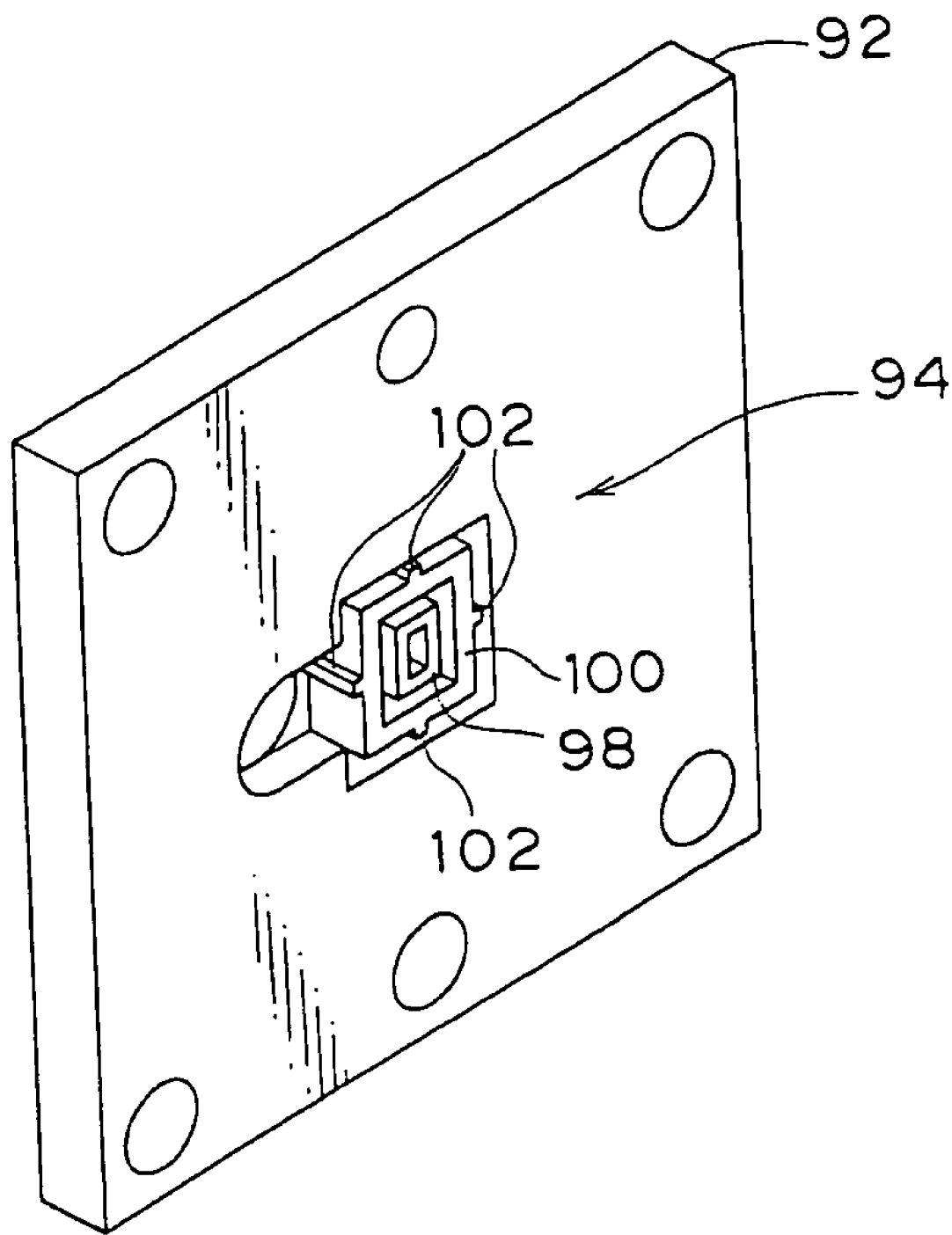
FIG. 13 is a perspective view of a plate of a micro-reactor of a fourth embodiment.

Next, the fourth embodiment will be described. As shown in FIG. 13, compared to the first embodiment, a micro-reactor according to the fourth embodiment is different in the form of the micro-channel 94 formed in a plate 92 that is sandwiched by the lid member 14 and the receiving member 16 (see FIGS. 1 to 3) and the micro-channels 94 have a rectangular shape seen from the outflow side and the inflow side of the plate 92.

That is, both a middle partition wall plate portion 100 that partitions the fluid in the outermost layer (for example, haloid salt solution) and the fluid in the intermediate layer (for example, gelatin solution) and an inside partition wall plate portion 98 that partitions the fluid in the intermediate layer and the fluid in the innermost layer (for example, silver nitrate solution) have rectangular shapes seen from the outflow side of the plate 92. Conforming to these, the mixing channel (not shown) of the receiving member has a rectangular shape.

Further, on the outer periphery side of the middle partition wall plate portion 100, reinforcing ribs 102 for reinforcing the flat portions of the middle partition wall plate portion 100 are provided, and thereby, the flat portions of the middle partition wall plate portion 100 are reinforced. Note that, even when the middle partition wall plate portion 100 has a cylindrical shape seen from the outflow side of the plate 92, providing the reinforcing rib 102 is effective in light of improvement in strength.

According to the fourth embodiment, the outer shape of the micro-channel formed in the plate can be arbitrarily determined.

Fifth Embodiment

Figure 14:
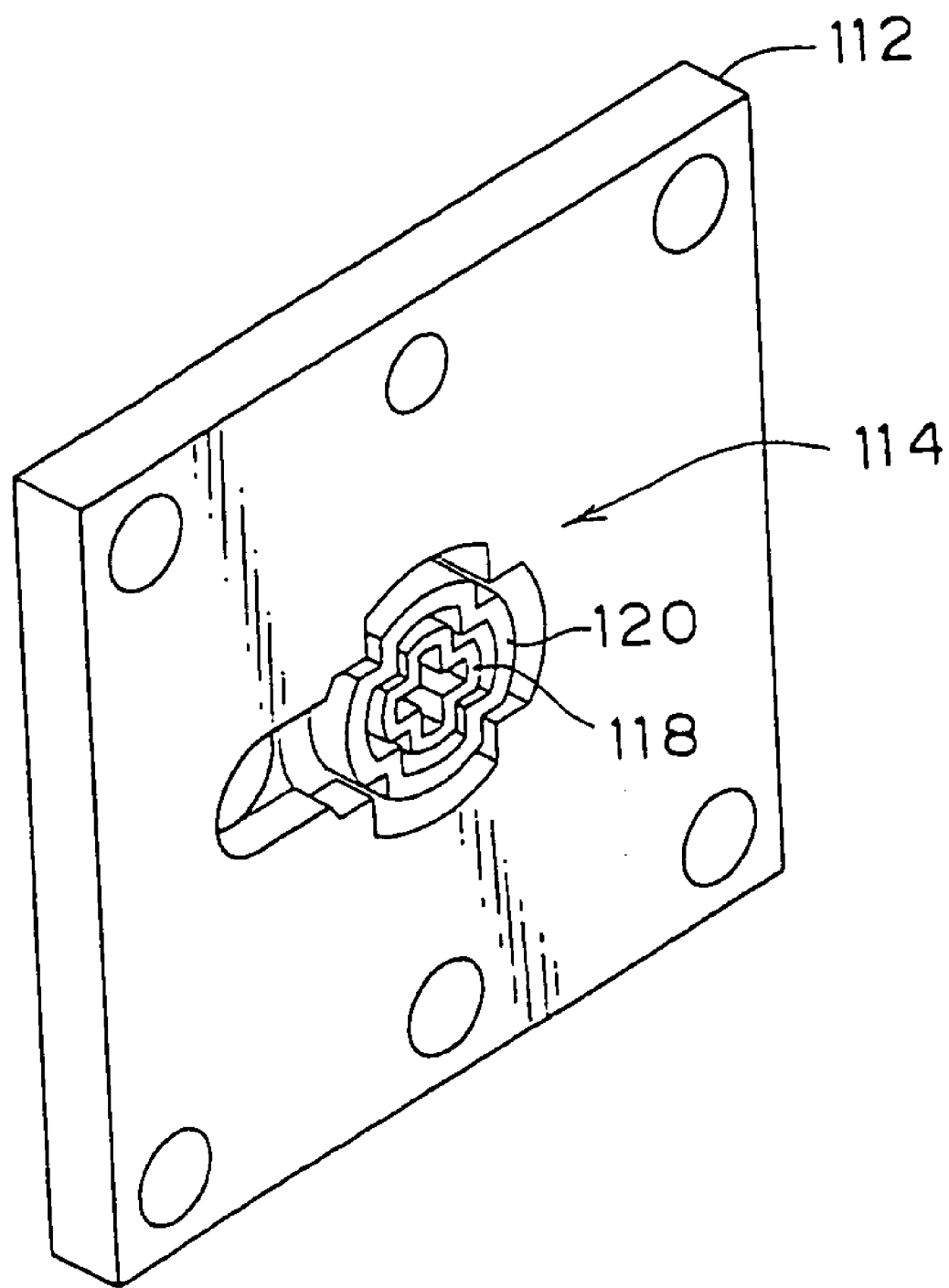
FIG. 14 is a perspective view of a plate of a micro-reactor of a fifth embodiment.

Next, the fifth embodiment will be described. As shown in FIG. 14, compared to the first embodiment, a micro-reactor according to the fifth embodiment is different in the form of micro-channels 114 formed in a plate 112 and the micro-channel 114 has a zigzag shape (for example, star shape or hand shape) seen from the outflow side and the inflow side of the plate 112.

That is, both an middle partition wall plate portion 120 that partitions the fluid in the outermost layer (for example, haloid salt solution) and the fluid in the intermediate layer (for example, gelatin solution) and an inside partition wall plate portion 118 that partitions the fluid in the intermediate layer and the fluid in the innermost layer (for example, silver nitrate solution) have zigzag shapes seen from the outflow side of the plate 112. Conforming to these, the mixing channel (not shown) of the receiving member has a zigzag shape. To form such channel by machining, the existing micro electric discharge machining technology can be performed.

According to the fifth embodiment, because the area of the contact interface between the fluids can be made larger, the reaction time can be shortened and the yield per one micro-reactor can be drastically increased.

Sixth Embodiment

Figure 15:
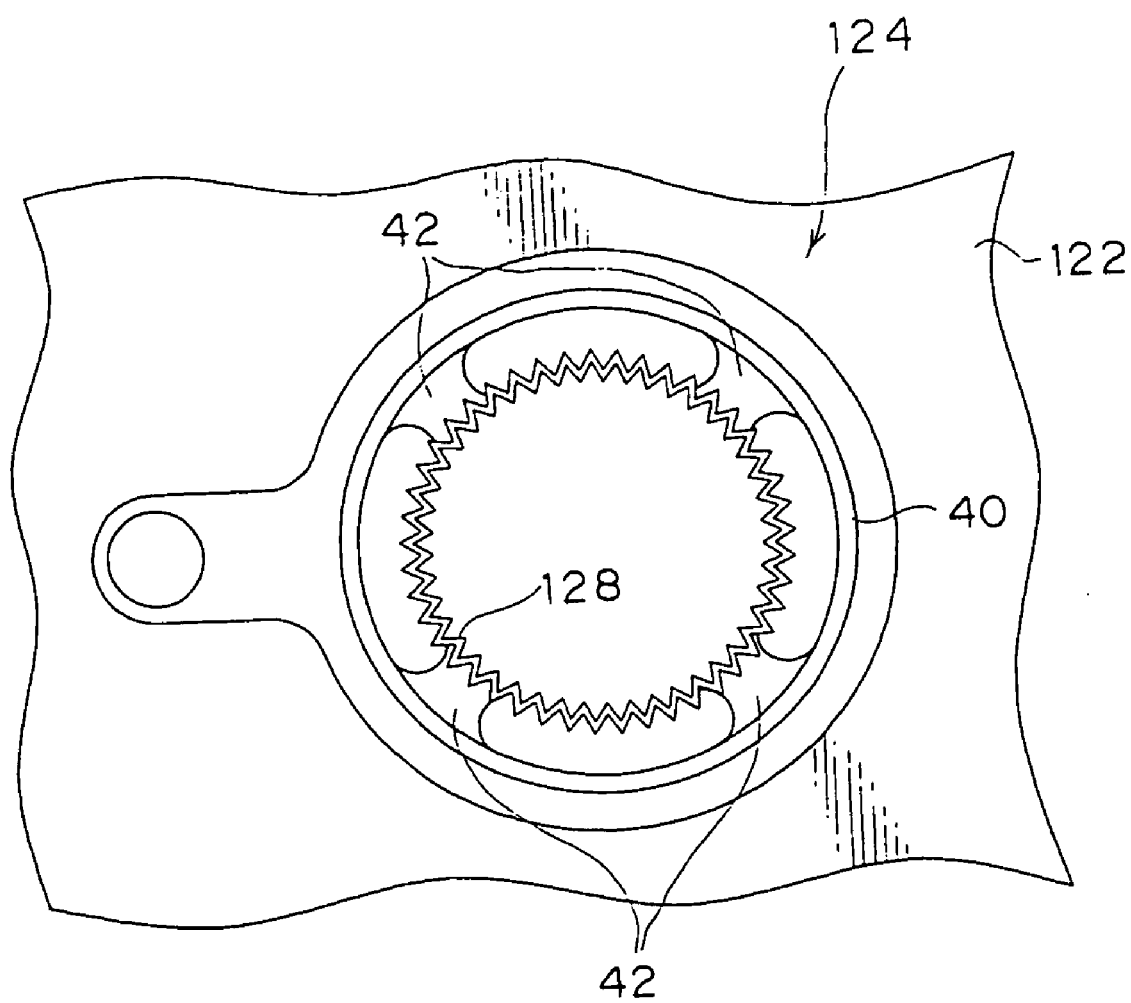
FIG. 15 is a partial front view showing the outflow side of a plate of a micro-reactor of a sixth embodiment.

Next, the sixth embodiment will be described. As shown in FIG. 15, compared to the first embodiment, a micro-reactor according to the sixth embodiment is different in the form of micro-channels 124 formed in a plate 122 and only an inside partition wall plate portion 128 is made in a zigzag shape seen from the outflow side and the middle partition wall plate portion 40 is made in the cylindrical shape same as the conventional one. Note that the same ribs 42 as in the first embodiment are provided.

In the case where a laminar flow is concentrically formed to make cross section areas of the respective fluid layers uniform, the interface area (contact area) of the fluid flowing in the innermost layer (that is, the fluid flowing in the central channel) with the fluid flowing in the intermediate layer is smaller that that of the fluid flowing in the outermost layer. Accordingly, because the diffusion rate from the fluid flowing in the innermost layer central channel to the fluid flowing in the intermediate layer becomes lower than the diffusion rate from the fluid flowing in the outermost layer to the fluid flowing in the intermediate layer, it is conceivable that the situation in which the time taken until the reaction is completed becomes longer can be invited. In the sixth embodiment, only the inside partition wall plate portion 128 is made in a zigzag shape and the middle partition wall plate portion 40 is made in the same cylindrical shape as the conventional one, and thereby, the interface area can be made equal between the inner periphery side and the outer periphery side of the intermediate layer, that is, the diffusion rate can be made equal between them, and the reaction time can be shortened.

Seventh Embodiment

Figure 16:
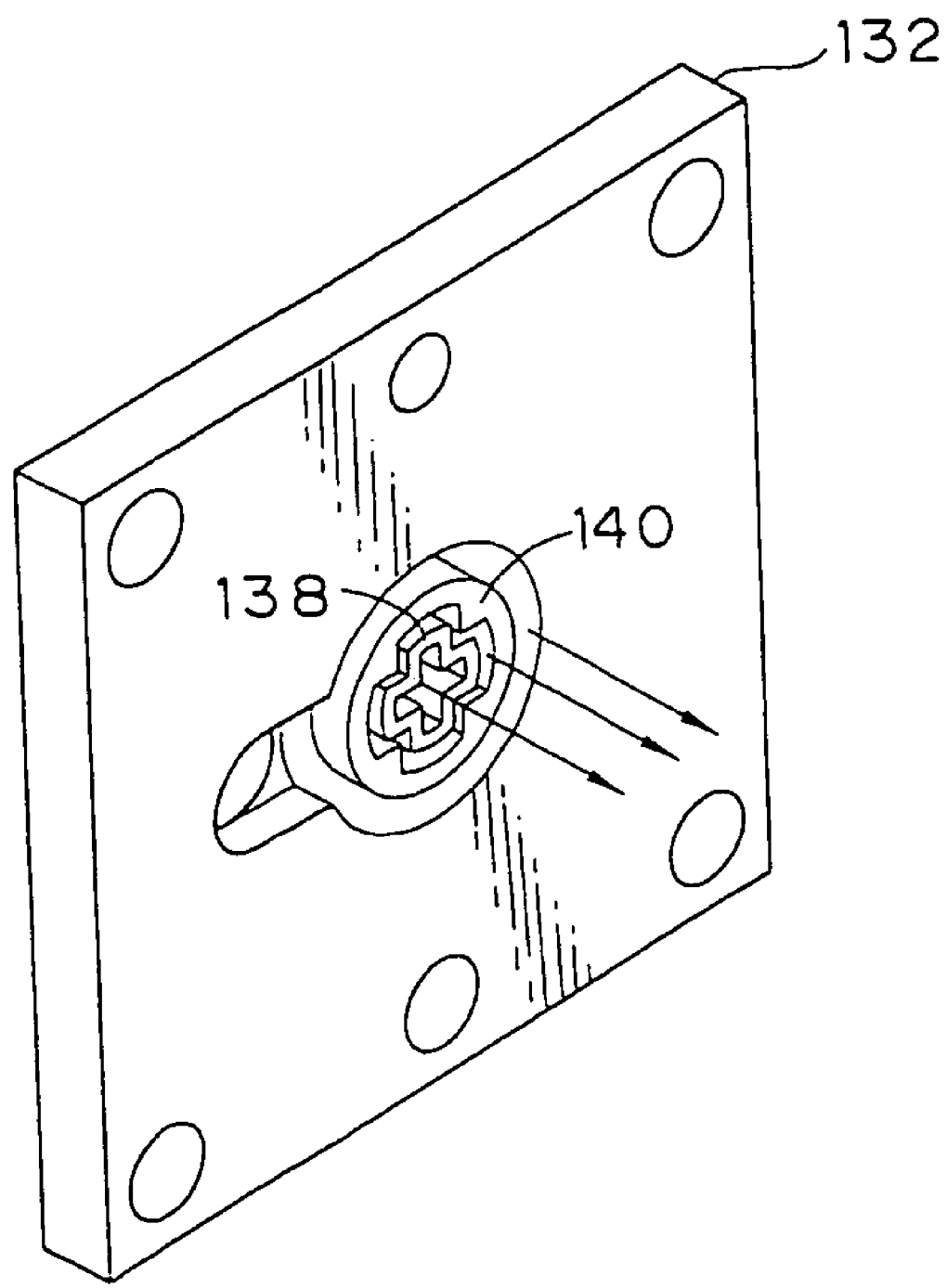
FIG. 16 is a perspective view of a plate of a micro-reactor of a seventh embodiment.

Next, the seventh embodiment will be described. As shown in FIG. 16, compared to the fifth embodiment, in a micro-reactor according to the seventh embodiment, an inside partition wall plate portion 138 provided in a plate 132 for partitioning the innermost layer and the intermediate layer has a zigzag shape as well as in the fifth embodiment, however, the outer periphery of the middle partition wall plate portion 140 that partitions the outermost layer and the intermediate layer, that is, the inner periphery of the outermost layer channel has a circular cross section, and the outer periphery of the outermost layer channel also has a circular cross section. Therefore, the outermost layer has a ring shape seen from the outflow side and is laminated.

In this embodiment, both the fluid of the innermost layer and the fluid of the intermediate layer are intentionally allowed to flow in the conditions exceeding the critical Reynolds number and made into turbulent flow. Thereby, the reaction between the fluid of the innermost layer and the fluid of the intermediate layer proceeds rapidly and ended in a short period of time. Further, even if the reaction product is an active drug or highly corrosive substance, the outer channel wall of the channel of the outermost layer can be protected against the reaction product by the fluid of the outermost layer.

Eighth Embodiment

Figure 17:
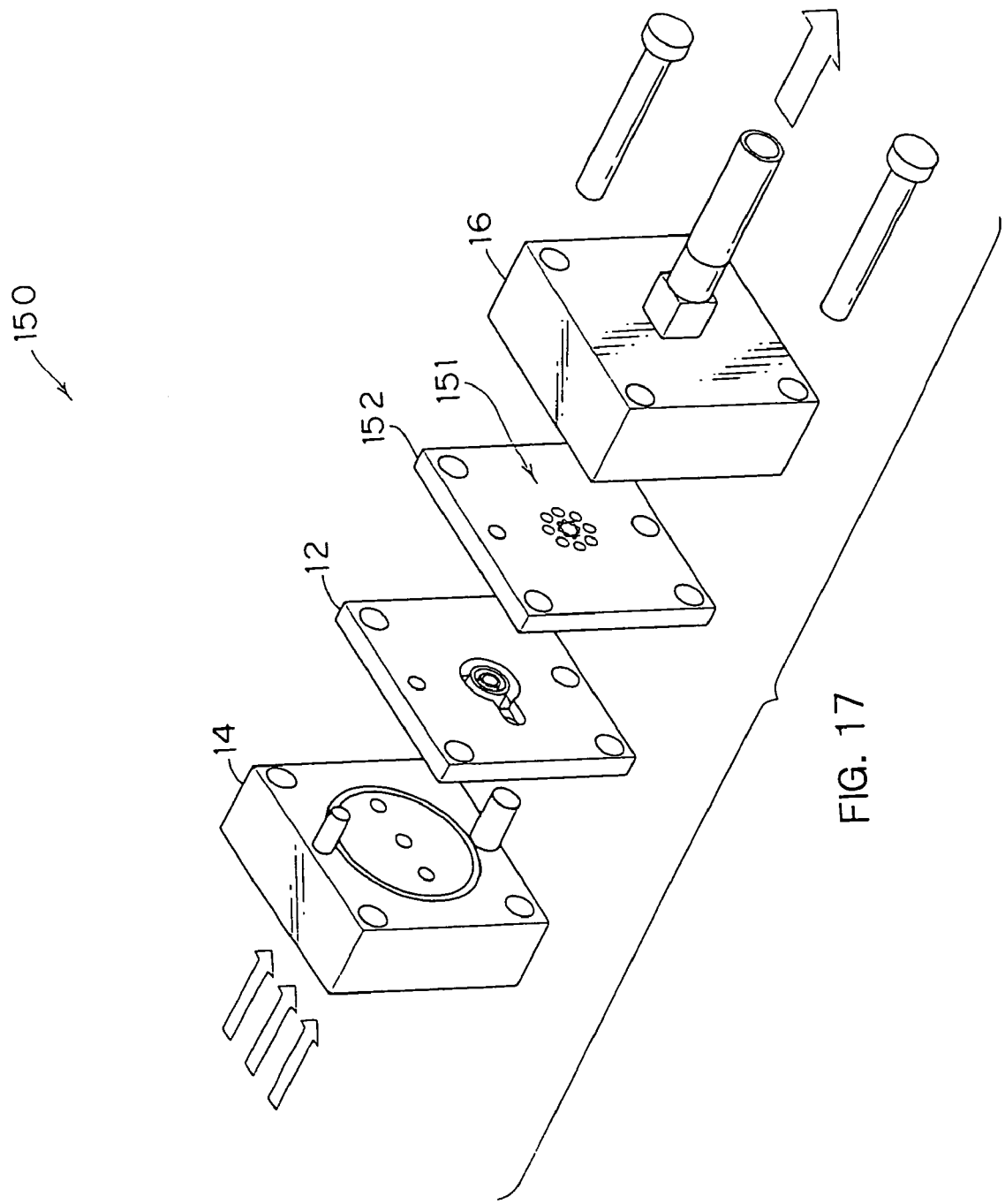
FIG. 17 is a development perspective view of a micro-reactor of an eighth embodiment.

Next, the eighth embodiment will be described. As shown in FIG. 17, compared to the first embodiment, in a micro-reactor 150 according to the eighth embodiment, an orifice plate 152 in which orifices 151 for generating a turbulent flow are formed is detachably provided between the plate 12 and the receiving member 16.

Thus, the plate member sandwiched by the lid member 14 and the receiving member 16 has been multilayered and the replacement of the orifice plate 152 has been made easier, and thereby, a micro-reactor capable of flexibly accommodating a wide variety of fluids without replacing the expensive plate 12 having micro-channels can be realized.

The orifice plate 152 can be obtained by machining a wide variety of materials by a wide variety of machining methods, as shown in Table 1, as well as the plate 12.

Ninth Embodiment

Figure 18:
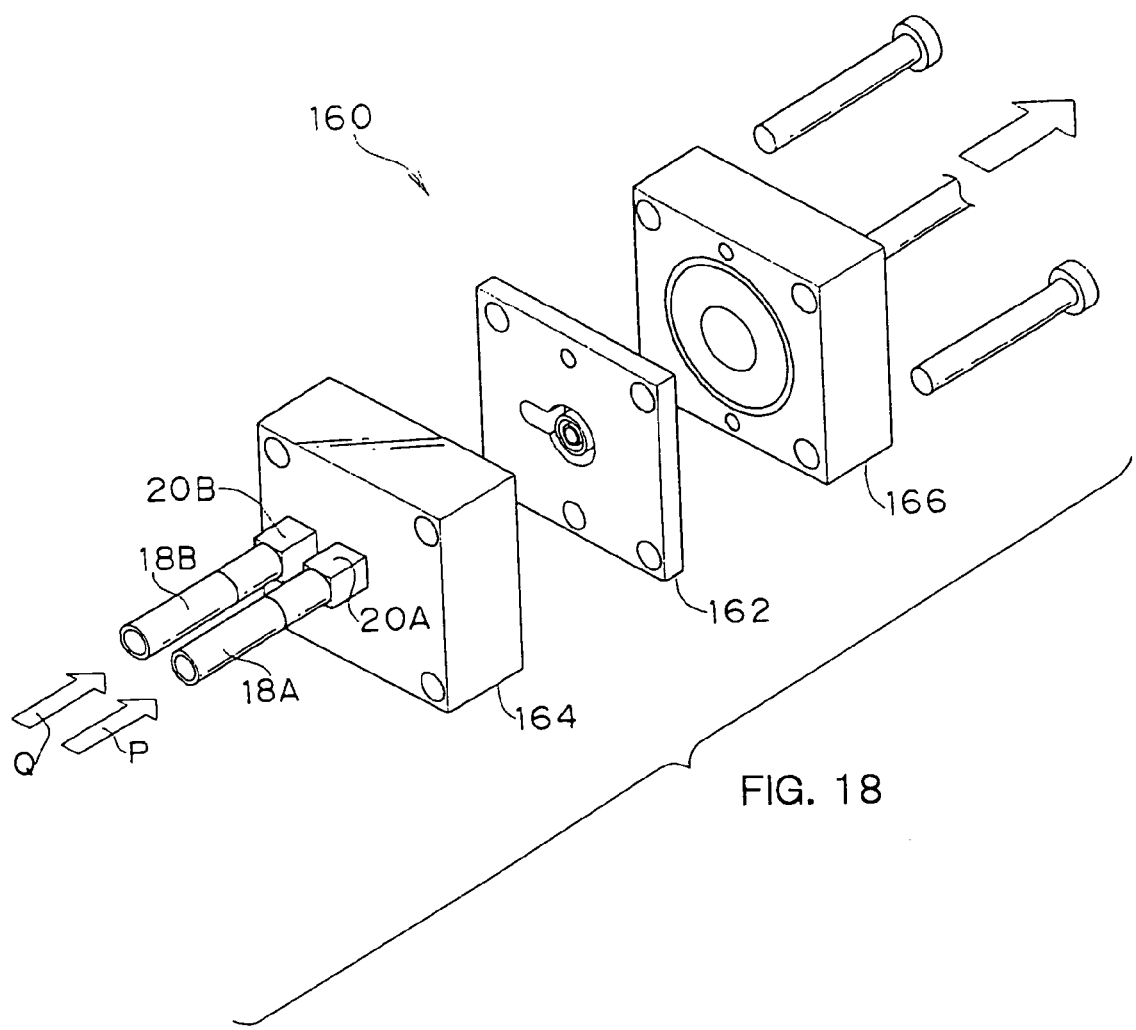
FIG. 18 is a development perspective view of a micro-reactor of a ninth embodiment.

Next, the ninth embodiment will be described. As shown in FIG. 18, compared to the first embodiment, in a micro-reactor 160 according to the ninth embodiment, the apparatus construction is simplified to be a construction for forming a concentrically laminar flow of two layers, and the two layer fluids are allowed to chemically react with each other or mixed.

The connectors provided in a lid member 164 of the micro-reactor 160 are two connectors of the connector 20A to which the pipe 18A is connected and the connector 20B to which the pipe 18B is connected, and the connector 20C described in the first embodiment is not provided. Further, a plate 162 has no outermost channel formed therein as compared to the plate 12 described in the first embodiment (see FIGS. 1 to 3). Furthermore, a receiving member 166 has no raised portion 17 (see FIG. 1) described in the first embodiment formed therein.

According to this embodiment, a micro-reactor having a further simplified apparatus construction is realized. In addition, by laminating the plates in which micro-channels are formed, that is, providing plural plates between the lid member 164 and the receiving member 166, a multi-layer concentric laminar flow can be formed.

Tenth Embodiment

Figure 19:
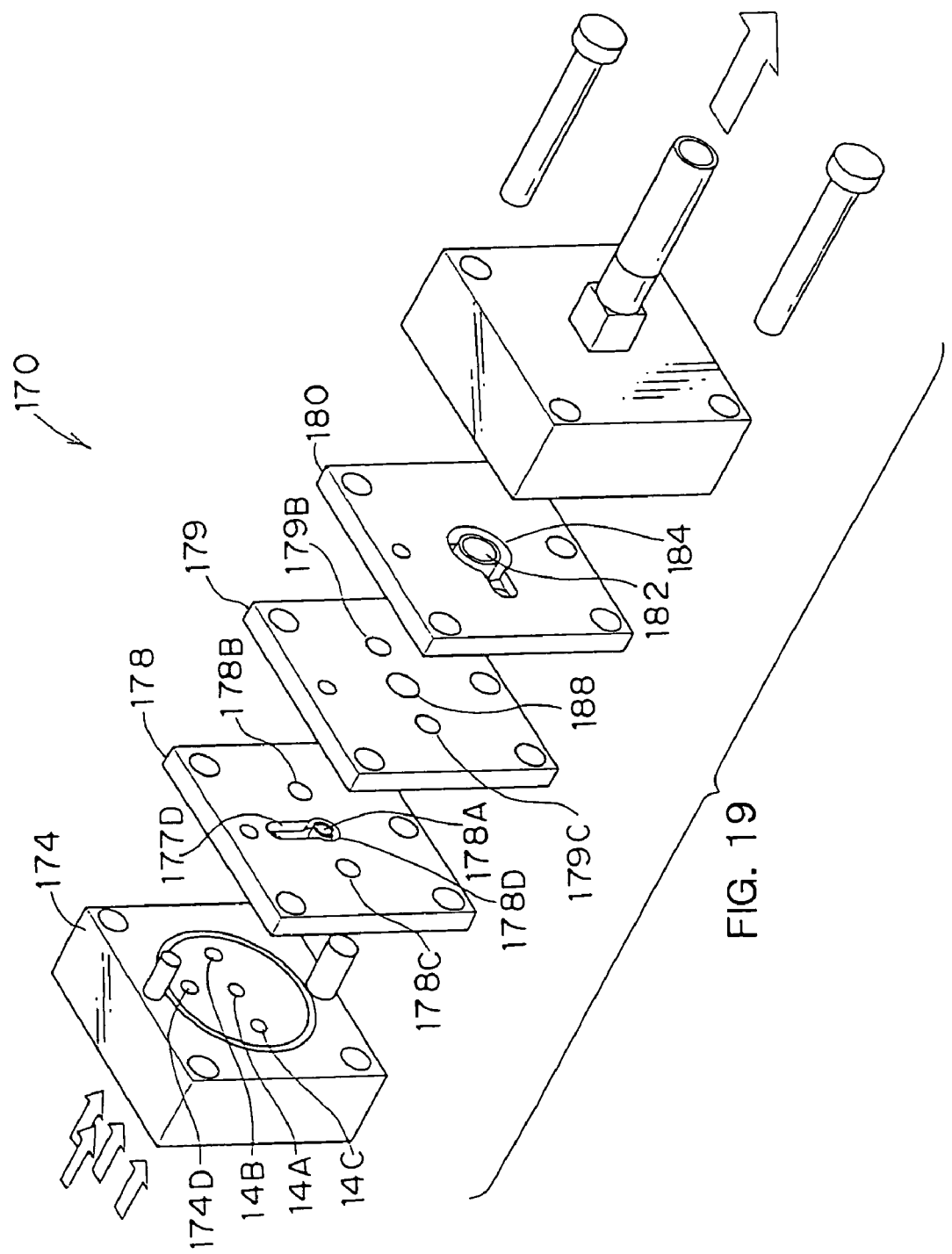
FIG. 19 is a development perspective view of a micro-reactor of a tenth embodiment.

Next, the tenth embodiment will be described. As shown in FIG. 19, compared to the ninth embodiment, in a micro-reactor 170 according to the tenth embodiment, plates having micro-channels are provided in a laminated structure.

The micro-reactor 170 includes a lid member 174, a first plate 178, a partitioning plate 179, and a second plate 180 (also see FIGS. 1 and 2), which are laminated sequentially from the lid member 174 side, and a receiving member 186 (also see FIGS. 1 and 2).

In the lid member 174, compared to the lid member 14 (see FIG. 2) described in the first embodiment, a lid member through hole 174D is further formed, and a connector and a pipe are connected to the lid member through hole 174D as well as to the lid member through holes 14A to 14C.

In the first plate 178, a first plate through hole 178A communicating the lid member through hole 14A and a slit cylindrical through hole 178D formed around the first plate through hole 178A, and a radial channel 177D communicating the lid member through hole 174D and the slit cylindrical through hole 178D are formed. Further, in the first plate 178, a first plate through hole 178B communicating the lid member through hole 14B and a first plate through hole 178C communicating the lid member through hole 14C are formed. By such construction, the fluid flowing out from the slit cylindrical through hole 178D flows out in a laminar flow in the state of covering the surrounding of the fluid flowing out in a laminar flow from the first plate through hole 178A.

The partitioning plate 179 has a first mixing channel 188 in which the fluid flowing out from the first plate through hole 178A and the fluid flowing out from the slit cylindrical through hole 178D are mixed. Further, in the partitioning plate 179, a partitioning plate through hole 179B for allowing the fluid flowing out from the first plate through hole 178B to pass through and a partitioning plate through hole 179C for allowing the fluid flowing out from the first plate through hole 178C to pass through are formed.

The construction of the second plate 180 is the same as compared to the plate 12 (see FIGS. 1 to 3) described in the first embodiment except that the diameter of a second plate through hole 182 formed at the center of the plate and a slit cylindrical through hole 184 formed around the second plate through hole 182 are made slightly larger in conformity to the first mixing channel 188.

The construction of the receiving member 186 is also the same as compared to the receiving member (see FIGS. 1 to 3) described in the first embodiment except that the diameter of a mixing channel (not shown) is made slightly larger in conformity to the slit cylindrical through hole 184.

According to the embodiment, four fluids can be mixed by allowing a four-layer concentrically laminar flow to flow out.

Eleventh Embodiment

Figure 20:
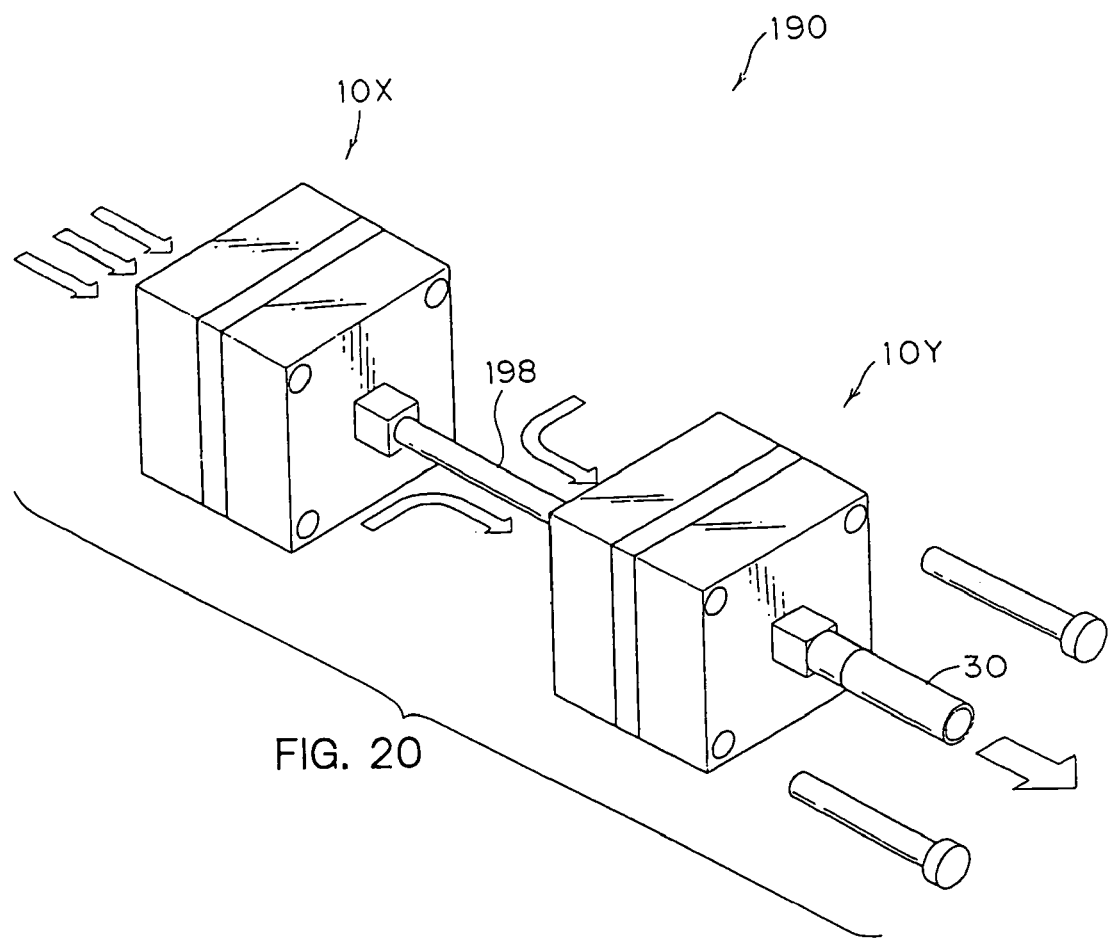
FIG. 20 is a perspective view showing the construction of a micro-reactor of an eleventh embodiment.

Next, the eleventh embodiment will be described. As shown in FIG. 20, a micro-reactor 190 according to the eleventh embodiment is an apparatus in which two micro-reactors 10X and 10Y having the same construction as in the first embodiment are serially connected by a pipe 198.

Thereby, five fluids can be mixed by allowing them to flow out in a concentrically laminar flow of five layers and further react with each other. In addition, micro-reactors having the same construction are further connected serially and thereby, a laminar flow of further more layers can be formed and mixed.

Twelfth Embodiment

Figure 21:
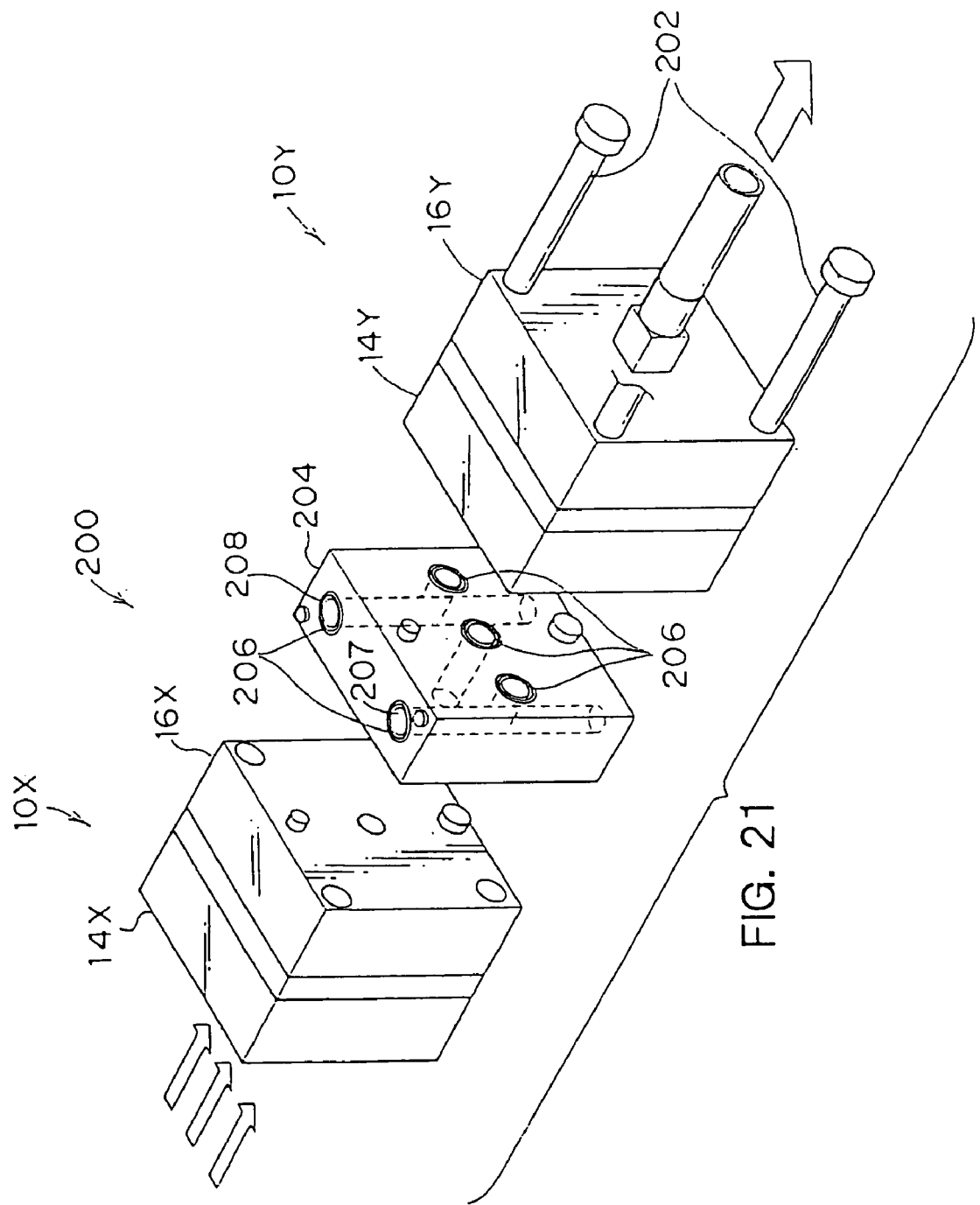
FIG. 21 is a development perspective view of a micro-reactor of a twelfth embodiment.

Next, the twelfth embodiment will be described. As shown in FIG. 21, compared to the eleventh embodiment, in a micro-reactor 200 according to the twelfth embodiment, the micro-reactors 10X and 10Y are connected using a connecting member 204 in place of the pipe 198. On all the peripheries of the pipe ports of ports provided in the connecting member 204, O-rings are provided, and the leakage of the fluids is prevented by pressing them against other members by an external force. A lid member 14X of the upstream side micro-reactor 10X and a receiving member 16Y of the downstream side micro-reactor 10Y are secured by bolts 202.

The connecting member 204 also has pipe ports in the surfaces other than the regions facing a receiving member 16X of the upstream side micro-reactor 10X and a lid member 14Y of the downstream side micro-reactor 10Y, and, for example, two pipe ports 207 and 208 are formed on the top surface of the connecting member 204. Thereby, inflow ports for two fluid to be diffused can be further provided on an arbitrary surface such as the top surface of the connecting member 204.

According to this embodiment, compared to the eleventh embodiment, a region that easily receives a deformation force such as the pipe 198 (see FIG. 20) can be eliminated and the connector for connecting the pipe 198 is dispensed with, and thereby, the apparatus construction can be made compact.

Thirteenth Embodiment

Figure 22A:
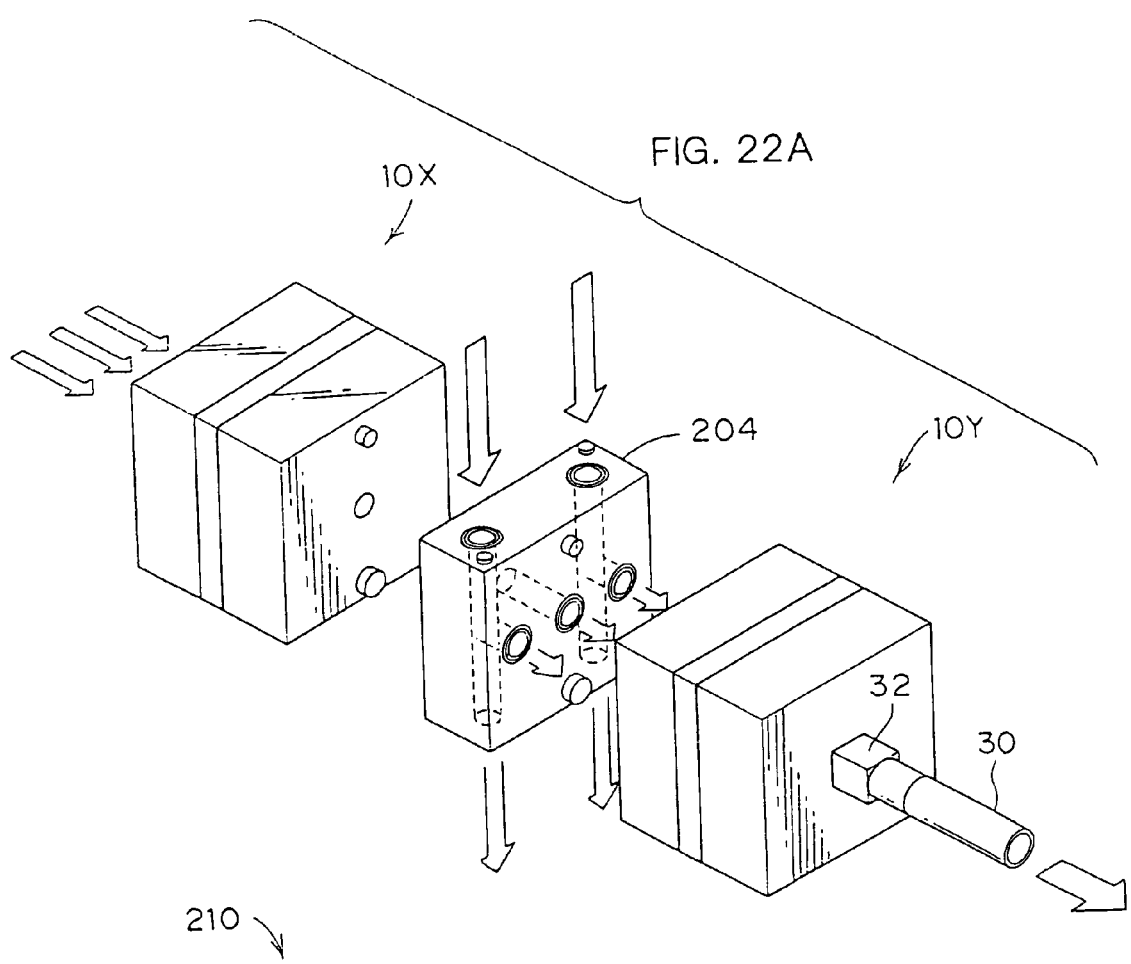
FIGS. 22A and 22B are a development perspective view of a micro-reactor of a thirteenth embodiment, and a perspective view in an assembled state, respectively.
Figure 22B:
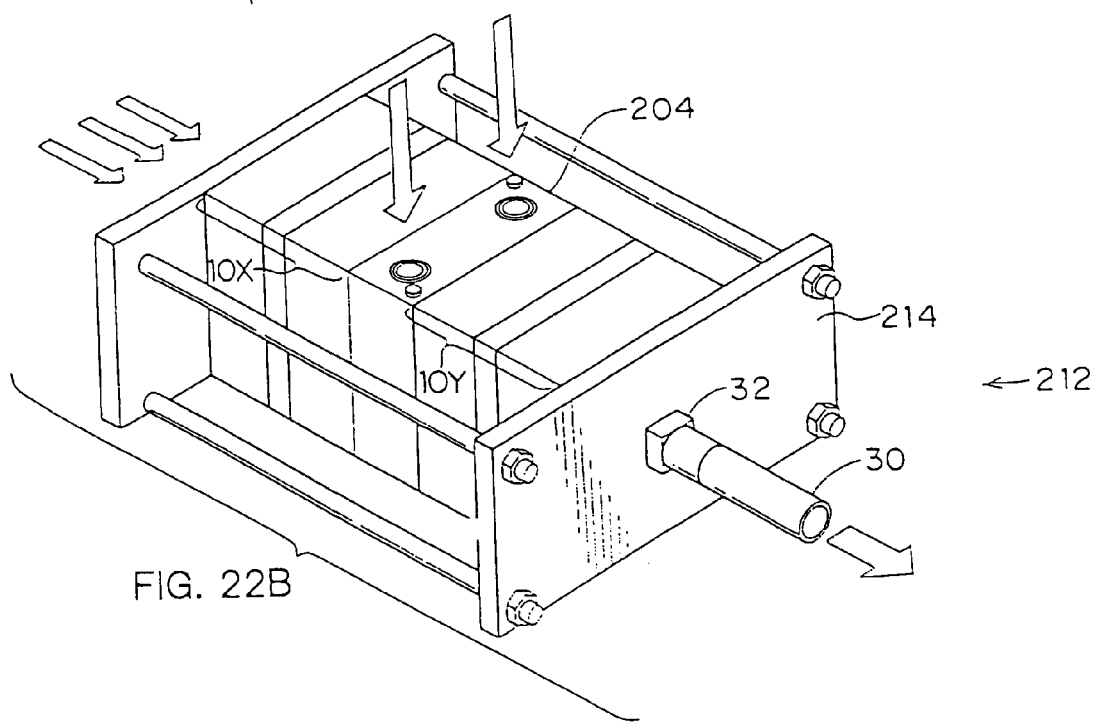

Next, the thirteenth embodiment will be described. As shown in FIGS. 22A and 22B, compared to the twelfth embodiment, in a micro-reactor 210 according to the thirteenth embodiment, component members are secured using a damper 212. The damper 212 has a plate member 214 having an opening through which the connector 32 passes formed therein, and the outflow tube 30 is connected to the connector 32.

According to this embodiment, a modularized micro-reactor 210 can be realized.

Fourteenth Embodiment

Figure 23:
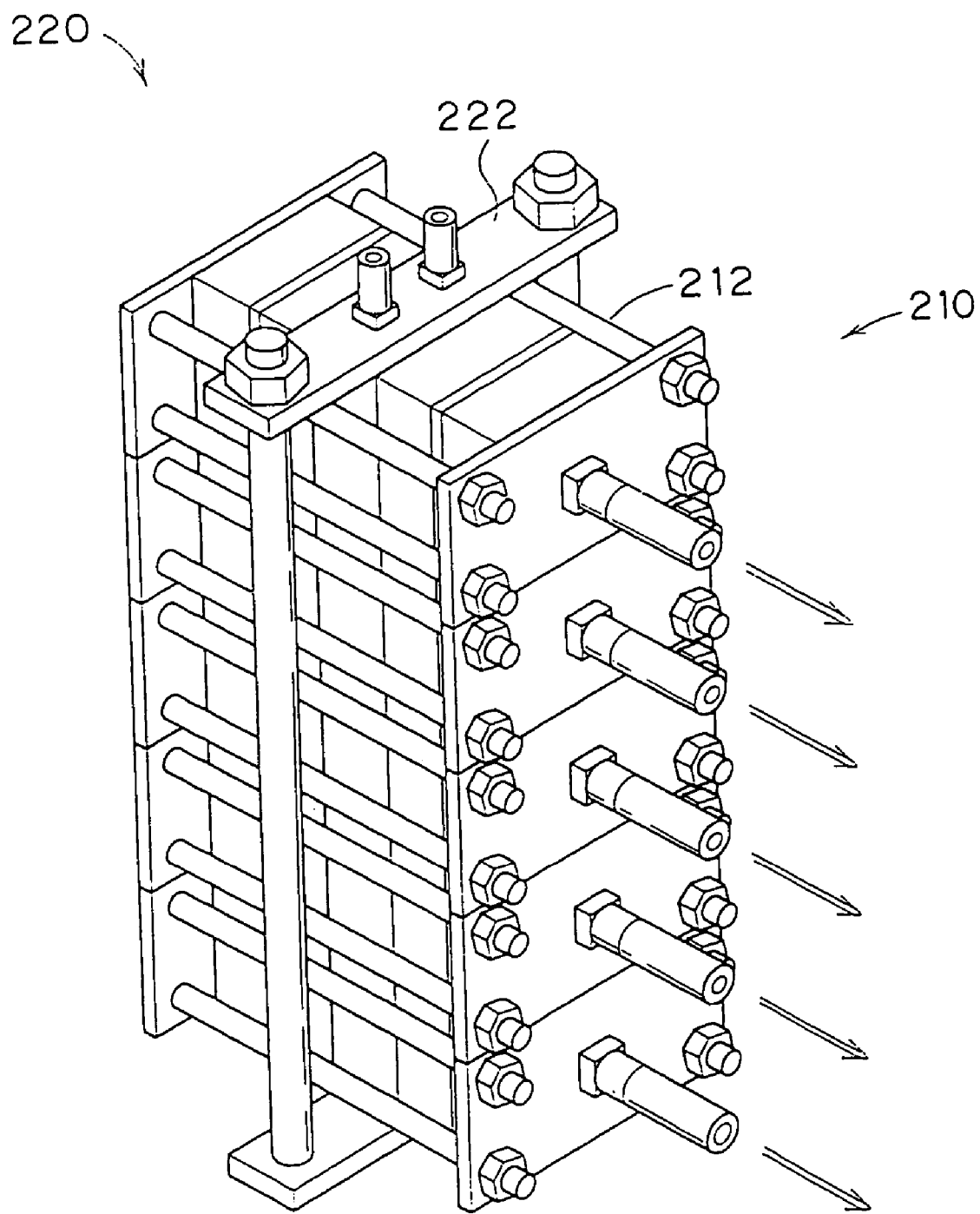
FIG. 23 is a perspective view showing an example of a micro-reactor of a fourteenth embodiment.
Figure 24:
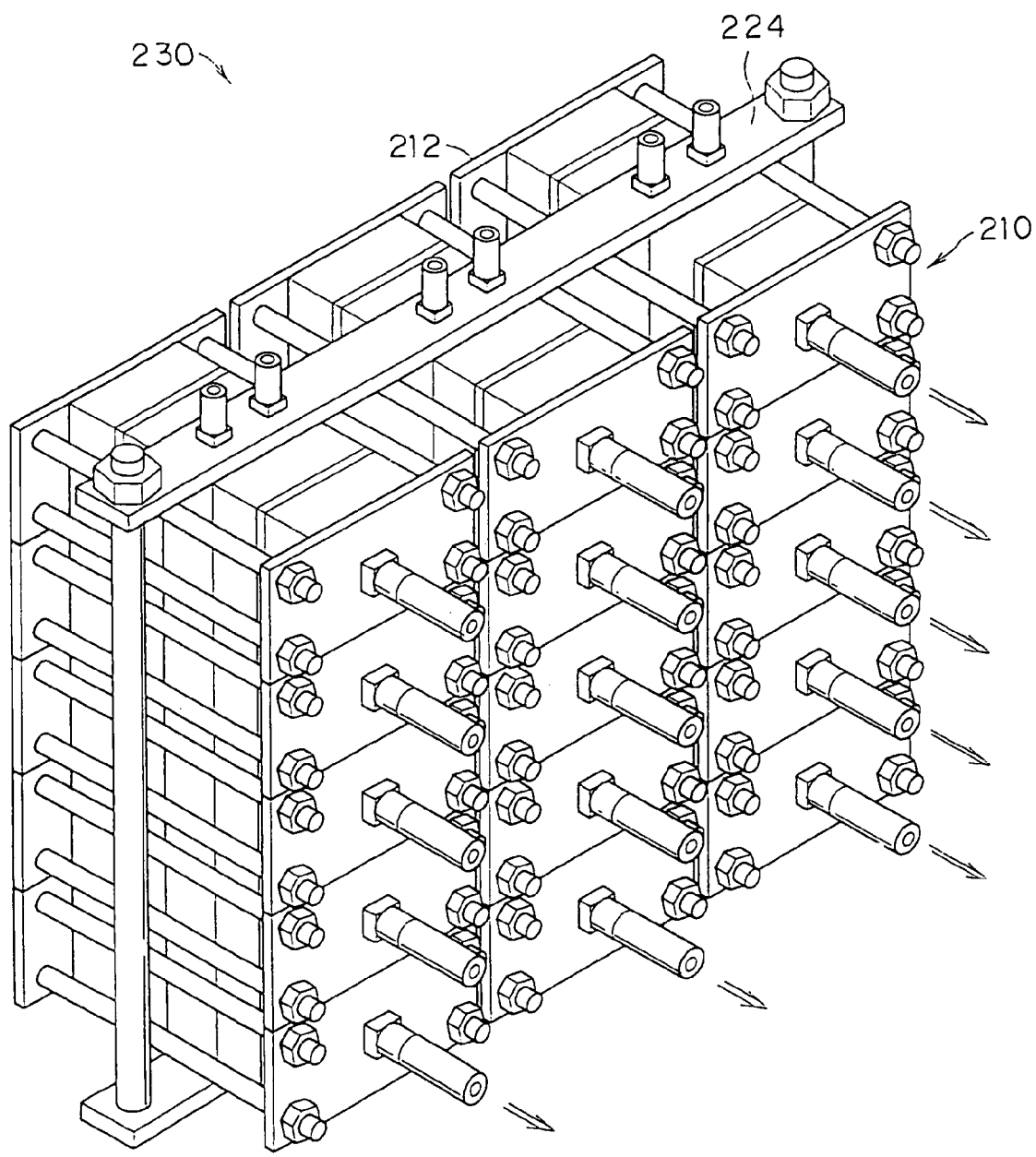
FIG. 24 is a perspective view showing another example of the micro-reactor of the fourteenth embodiment.

Next, the fourteenth embodiment will be described. As shown in FIG. 23, compared to the thirteenth embodiment, in a micro-reactor 220 according to the fourteenth embodiment, the micro-reactors 210 according to the thirteenth embodiment are aligned along the longitudinal direction and secured by another damper 222. By changing the form of the damper 222 to use a wider clamper 224 as shown in FIG. 24, a micro-reactor 230 in which micro-reactors 210 are two-dimensionally arranged can be formed.

Thereby, pipes and connectors for connecting micro-reactors 210 are dispensed with, and a compact micro-reactor 220 or 230 is realized.

Note that, by standardizing the fluid supply port (the outflow port of the reaction product) of the clamper 210, the production equipment (that is, the micro-reactor 220 or micro-reactor 230) can be renewed if only the component members of the micro-reactor 220, i.e., component members such as the lid member, plate, receiving member, and connecting member are replaced with good ones, and thereby, the production equipment can be renewed extremely easily in a short period of time.

Fifteenth Embodiment

Figure 25:
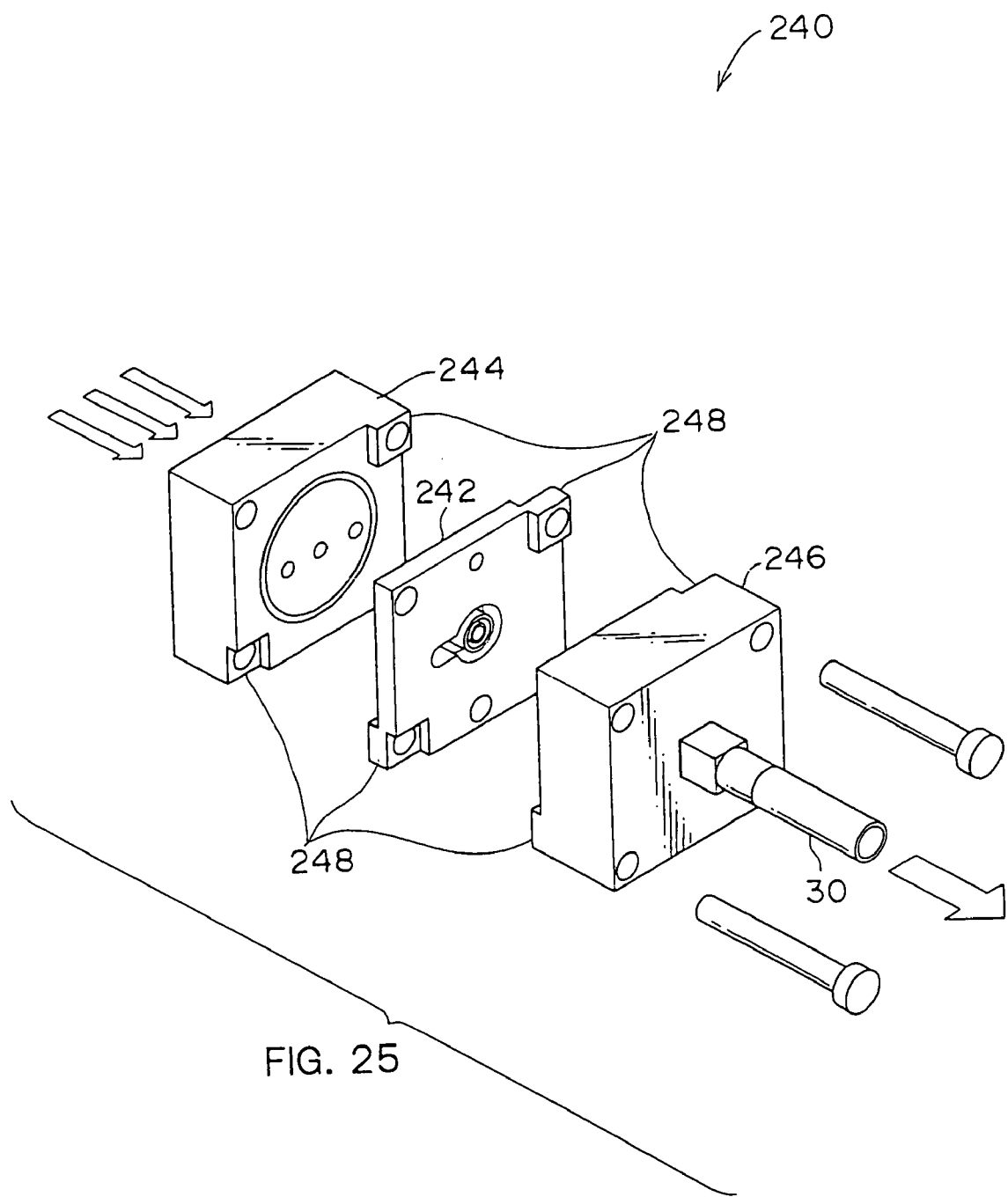
FIG. 25 is a development perspective view of a micro-reactor of a fifteenth embodiment.

Next, the fifteenth embodiment will be described. As shown in FIG. 25, compared to the first embodiment, in a micro-reactor 240 according to the fifteenth embodiment, in diagonal corners of adjacent members, i.e., a lid member 244, a plate 242, and a receiving member 246, spigot structure portions 248 are formed. The spigot structure portions provided in adjacent members refer to a structure in which a convex portion is provided on one of the adjacent members and a concave portion that engages with the convex portion is provided on the other.

According to this embodiment, when the number of laminated plate members is increased or decreased, positioning thereof can be easily performed. Note that the spigot structure is effective for positioning of the micro-reactor and the clamper.

Sixteenth Embodiment

Figure 26:
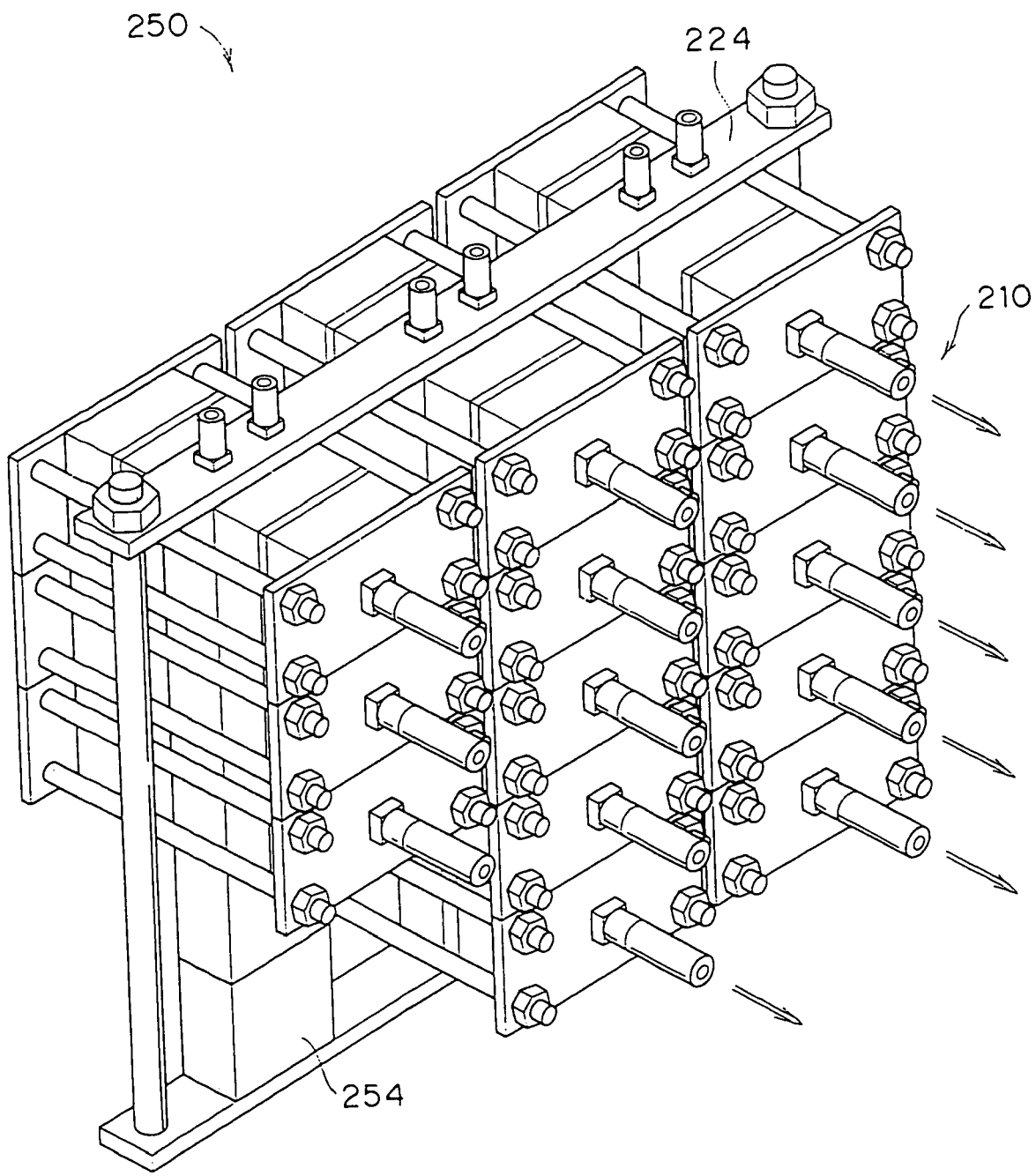
FIG. 26 is a perspective view of a micro-reactor of a sixteenth embodiment.

Next, the sixteenth embodiment will be described. As shown in FIG. 26, a micro-reactor 250 according to the sixteenth embodiment is an example in which dummy blocks are used in the case where the total number of provided micro-reactors 210 is less than the number that can be secured by the damper 224. As the dummy block, a connecting member 254 having no channel formed therein is used.

According to this embodiment, the number of provided micro-reactors can be reduced to an arbitrary number without changing the form of the damper 224.

Seventeenth Embodiment

Next, the seventeenth embodiment will be described. Compared to the first embodiment, in a micro-reactor according to the seventeenth embodiment, the lid member 14, the plate 12, and the receiving member 16 (see FIGS. 1 and 2) are secured with adhesives instead of being secured by bolts. When securing with adhesives, transfer application and precision application using a precision dispenser are sometimes performed in order to prevent adhesives from running off.

Thus, the problem of running off the adhesives can be avoided by applying direct bonding.

Note that in the case where the same material is used for the lid member 14, the plate 12, and the receiving member 16, hot direct bonding can be applied. In the case where the materials are different, cold direct bonding is sometimes applied in order to reduce strain generated by thermal expansion.

Eighteenth Embodiment

Next, the eighteenth embodiment will be described. Compared to the first embodiment, in a micro-reactor according to the eighteenth embodiment, the lid member 14, the plate 12, and the receiving member 16 (each see FIGS. 1 and 2) are allowed to be attracted to each other by magnetic force. For example, the plate 12 is manufactured with a magnetic material such as carbon steel, and the lid member 14 and the receiving member 16 are manufactured with an iron material. As a result, the plate 12 attracts the lid member 14 and the receiving member 16 by magnetic force.

In the micro-channels 24, because forces for separating the respective members are small even when the pressure of the fluids is high, weak magnetic force is often not problematic. Further, by erasing the permanent magnetic property by applying an inverse magnetic field externally to the micro-reactor, disassembly into respective member units can be easily performed.

As long as the lid member 14, the plate 12, and the receiving member 16 are attracted to each other by magnetic force, the lid member 14 and the receiving member 16 may be consisted of a magnetic material.

In the case where strong holding power is needed, if the plate 12 is manufactured using a neodymium-iron-boron series magnet, magnetic force is strong and strong holding power can be obtained. The neodymium-iron-boron series magnet can be obtained generally by the procedure of "dissolution of raw materials→crushing→press molding within the magnetic field→liquid phase sintering→ageing", and the production method can be applied to the embodiment.

Further, by allowing a magnetic fluid to flow in the outermost layer, a magnetic protective layer can be formed on the inner surface of the channels and pipes, and thereby, the coverage effect of the micro-channel wall can be improved.

Nineteenth Embodiment

Figure 27A:
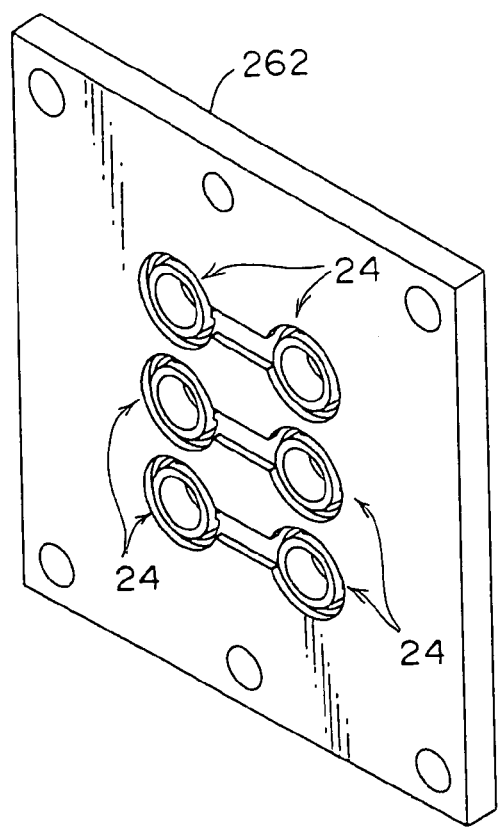
FIG. 27A is a perspective view of a plate of the micro-reactor of a twelfth embodiment viewed from the inflow side thereof.
Figure 27B:
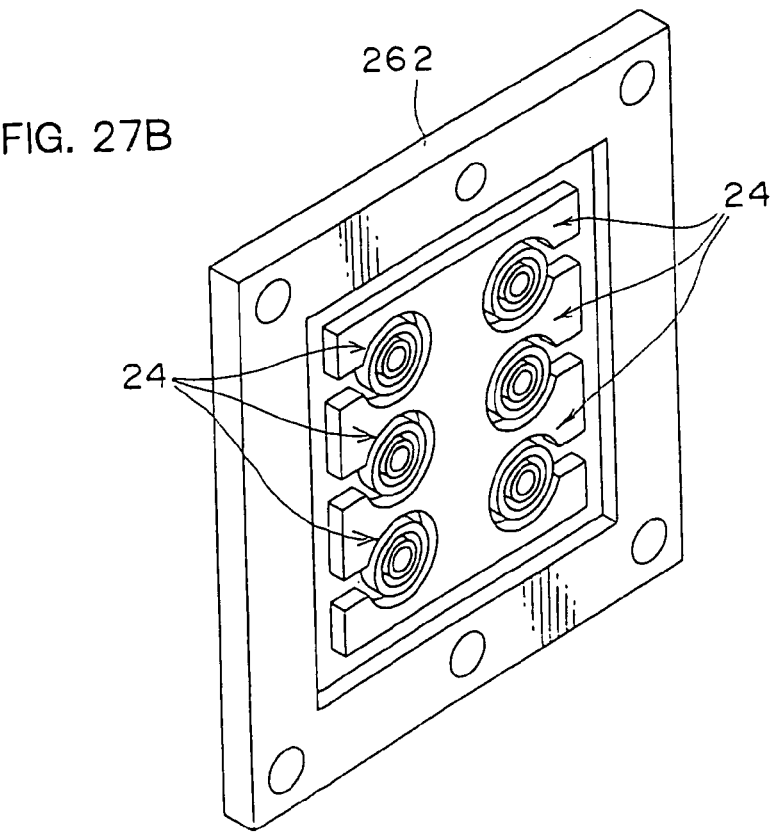
FIG. 27B is a perspective view of a plate of the micro-reactor of a twelfth embodiment viewed from the outflow side thereof.

Next, the nineteenth embodiment will be described. As shown in FIG. 27, a micro-reactor according to the nineteenth embodiment is an example in which a large number of micro-channels 24 are arranged on one plate 262, and increase in the number of apparatuses is implemented. The plate 262 is connected (bonded) to the lid member and the receiving member by direct bonding, and thereby, O-rings are omitted, and the number and the length of pipes are kept to the minimum.

As a manufacturing technology, a semiconductor manufacturing technology such as dry etching, plastic forming technology such as micro-imprint, and laser ablation can be used.

According to the embodiment, high-density packaging of the micro-reactor can be performed.

Twentieth Embodiment

Figure 28:
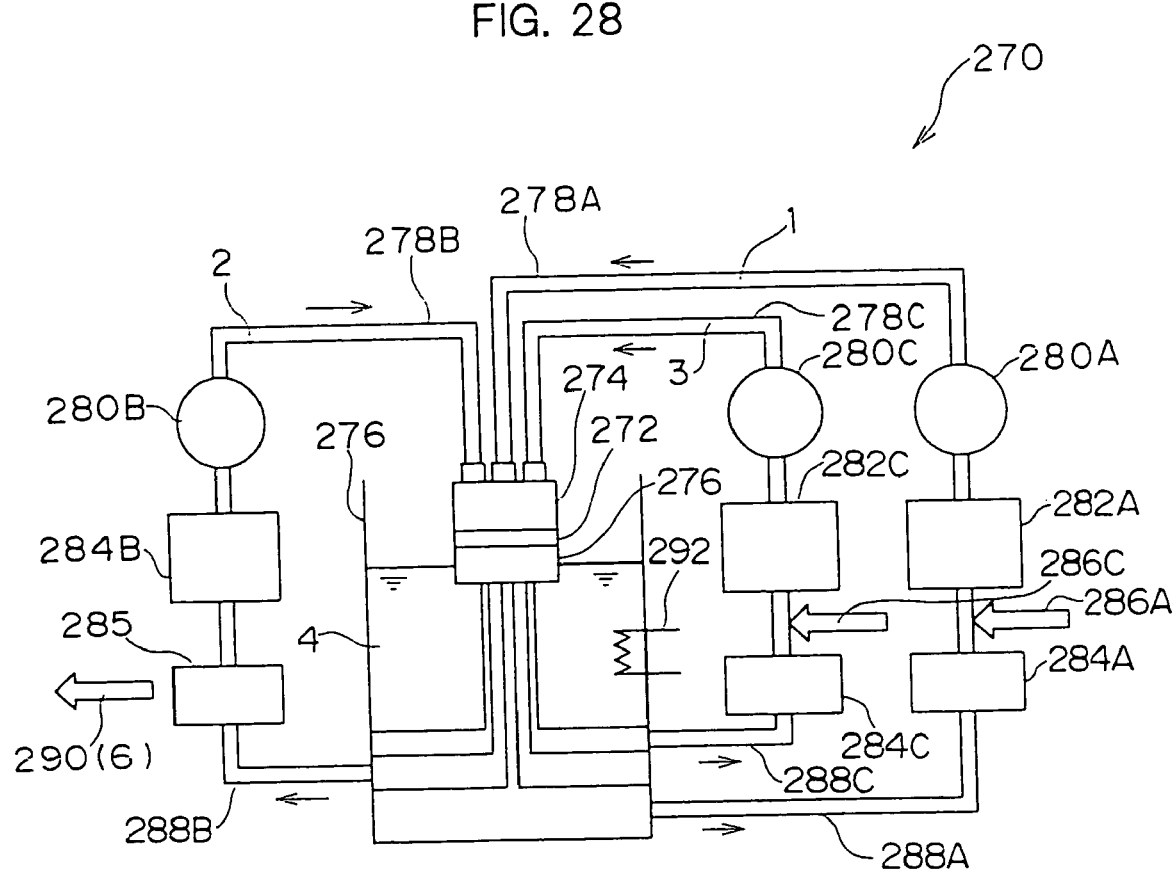
FIG. 28 is a structural diagram of a fluid mixing system of a twentieth embodiment.

Next, the twentieth embodiment will be described. As shown in FIG. 28, a fluid mixing system 270 according to the twentieth embodiment includes a lid member 274, a receiving member 276, and a plate 272 sandwiched by the lid member 274 and the receiving member 276, and pipes 278A to 278C connected to the lid member 274. The constitution thereof is the same as that described in the first embodiment, but scaled up. Further, the fluid mixing system 270 includes a container 276 for accommodating the fluid 4, in place of the tube 30 (see FIGS. 1 and 2) shown in the first embodiment.

As the fluid 4, a liquid such as oil having a specific gravity lower than other used fluids and no affinity to each other is accommodated in the container 276 and used. Further, the fluids 1 to 4 have been selected so that specific gravities of the fluids 1 to 3 allowed to respectively flow through the pipes 278A to 278C and used as raw materials and the above described fluid 4 may be in the order of fluid 4<fluid 3<fluid 2<fluid 1, and the mixed fluids can be separable after the reaction is completed. If the specific gravity of the fluid 4 is too low, because the concentrically laminar flow is accelerated by gravity and becomes a turbulent flow, the specific gravity and viscosity of the fluid is set in the range where the concentrically laminar flow is not broken. The fluids 1 to 3 are such that, for example, the fluid 1 is a silver nitrate solution, the fluid 2 is a gelatin solution, and the fluid 3 is a haloid salt solution.

In this embodiment, the fluid 1 is allowed to flow as the innermost layer, the fluid 2 as the intermediate layer, and the fluid 3 as the outermost layer in the fluid 35.

At that time, the fluid 1 is diffused into the fluid 2 and the fluid 2 is diffused and infiltrates into the fluid 1. Because the specific gravity of the fluid 1 is the highest among the fluids, the fluid 1 in which the fluid 2 is diffused and infiltrates stays as a bottom layer.

The fluid mixing system 270 includes a circulating pump 280A connected to the pipe 278A for delivering the fluid to the pipe 278A, a mixer 282A connected to the downstream side of the circulating pump 280A, a filter 284A connected to the downstream side of the mixer 282A, and a supply line 286A for supplying reaction products to the mixer 282A. A pipe 288A is connected in the position where the fluid staying in the bottom layer of the container 276 is led out, and the downstream side of the filter 284A is connected to the pipe 288A.

Accordingly, the fluid staying in the bottom layer of the container 276 (fluid 1 in which the fluid 2 is diffused and infiltrates) passes through the filter 284A. Then, the reaction product flows in from the supply line 286A and is mixed in the mixer 282A, and delivered again to the pipe 278A by the circulating pump 280A.

Further, the fluid 3 in the outermost layer is diffused into the fluid 2 and the fluid 2 in the outermost layer is diffused into the fluid 3. Because the specific gravity of the fluid 3 is the second lowest to that of the fluid 35 among the fluids, in the container 276, the fluid 4 stays as a top layer and the fluid 3 in which the fluid 2 is diffused and infiltrates stays in a layer immediately below the fluid 35.

The fluid mixing system 270 includes a circulating pump 280C connected to the pipe 278C for delivering the fluid to the pipe 278C, a mixer 282C connected to the downstream side of the circulating pump 280C, a filter 284C connected to the downstream side of the mixer 282C, and a supply line 286C for supplying reaction products to the mixer 282C. A pipe 288C is connected in the position where the fluid staying in the layer immediately below the layer of the fluid 4 of the container 276 is led out, and the downstream side of the filter 284C is connected to the pipe 288C.

Accordingly, the fluid staying in the layer immediately below the layer of the fluid 4 within the container 276 (the fluid 3 in which the fluid 2 is diffused and infiltrates) passes through the filter 284C. Then, the reaction product flows in from the supply line 286C and is mixed in the mixer 282C, and delivered again to the pipe 278C by the circulating pump 280C.

In addition, the fluid 2 flows as the intermediate layer between the fluid 1 and the fluid 3, and the fluid 2 is diffused into the fluid 1 and the fluid 3 and the fluid 1 and the fluid 3 are diffused into the fluid 2. Because the specific gravity of the fluid 2 is lower than the fluid 1 and higher than the fluid 3, in the container 276, the three-fluid mixed fluids 5 in which the fluid 3 and the fluid 1 infiltrate in the fluid 2 stay as a layer immediately above the bottom layer.

The three-fluid mixed fluids 5 include an emulsion 6 formed by suitably mixing three fluids (fluid 1, fluid 2, and fluid 3) and the fluid 2.

The fluid mixing system 270 includes a circulating pump 280B connected to the pipe 278B for delivering the fluid to the pipe 278B, a filter 284B connected to the downstream side of the circulating pump 280B, and a separating unit 285 connected to the downstream side of the filter 284B. A pipe 288B is connected in the position where the fluid staying in the layer immediately above the bottom layer of the container 276 is led out, and the downstream side of separating unit 285 is connected to the pipe 288B.

Accordingly, the fluid staying in the layer immediately above the bottom layer of the container 276 is separated into the emulsion 6 and the fluid 2 in the separating unit 285. The emulsion 6 flows into an emulsion outflow pipe 290 connected to the separating unit 285 and is collected. The separated liquid 2 passes through the filter 284B, and is delivered again to the pipe 278B by the circulating pump 280B.

In this embodiment, effects that an outflow tube connected to the receiving member 276 is dispensed with, and the reaction temperature can be precisely controlled by controlling the temperature of the fluid 4 by a heater 292 and the like can be obtained. Further, the media of the fluids 1 to 3 can be recycled.

Note that, by applying the micro-reactor described in the first embodiment and the second embodiment to the mixers 282A to 282C, more efficient mixing can be performed.

Twenty-First Embodiment

Figure 29:
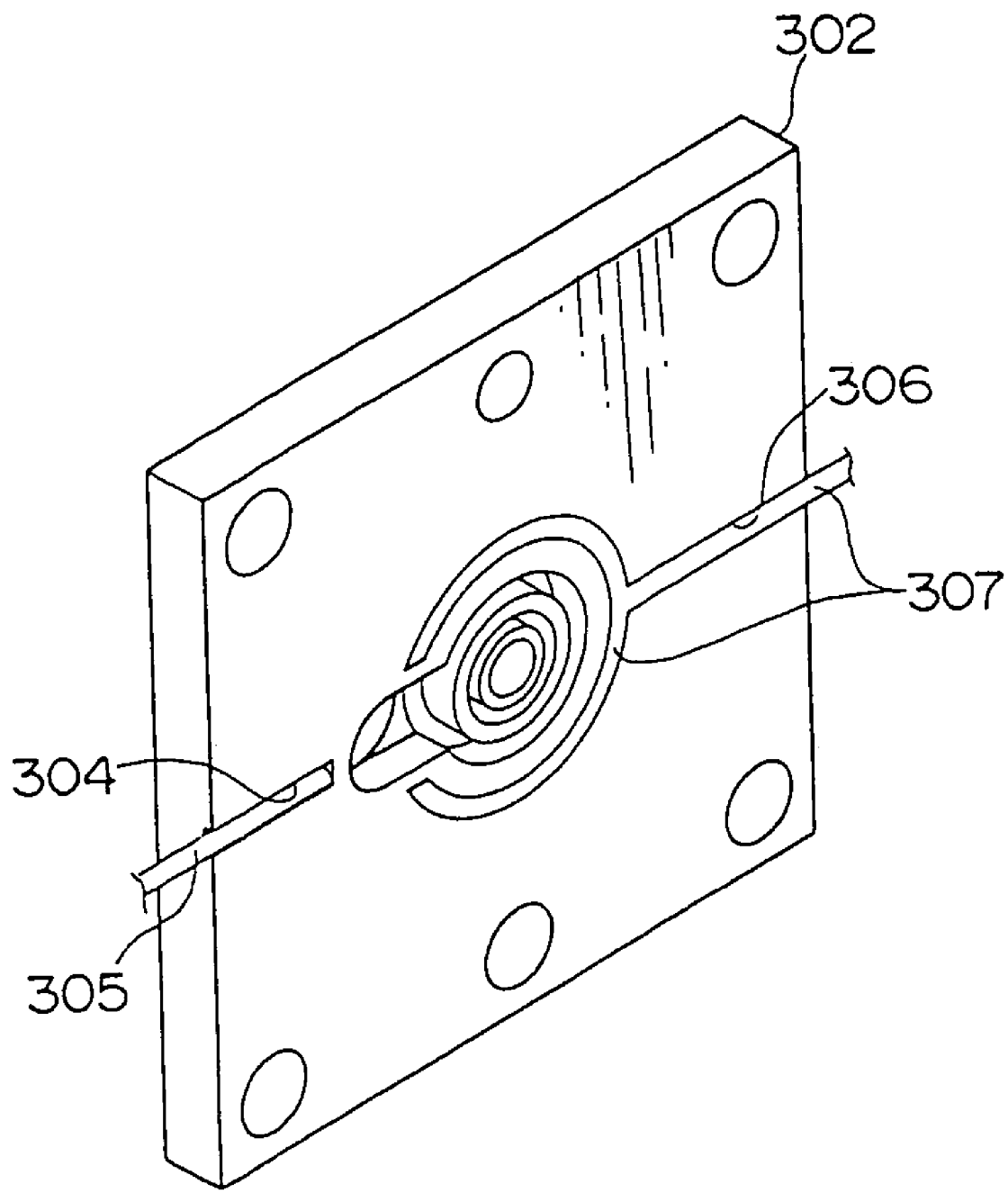
FIG. 29 is a perspective view of a plate of a micro-reactor of a twenty-first embodiment.

Next, the twenty-first embodiment will be described. As shown in FIG. 29, in a micro-reactor according to the twenty-first embodiment, micro grooves 304 and 306 are formed in a plate 302, and a temperature sensor 305 and a heater 307 are incorporated into them, respectively. Thereby, precise temperature control can be performed, and the reaction can be made uniform and highly efficient.

Note that, by using a silicon member as the plate 302, the temperature sensor and the heater can be directly mounted on the plate using MEMS technology. Further, in the case where it is difficult to machine both sides of the plate 302, the micro-manufacturing may be performed on one sides by etching and non-machined sides may be bonded with the back sides of the plates facing to each other.

Twenty-Second Embodiment

Figure 30:
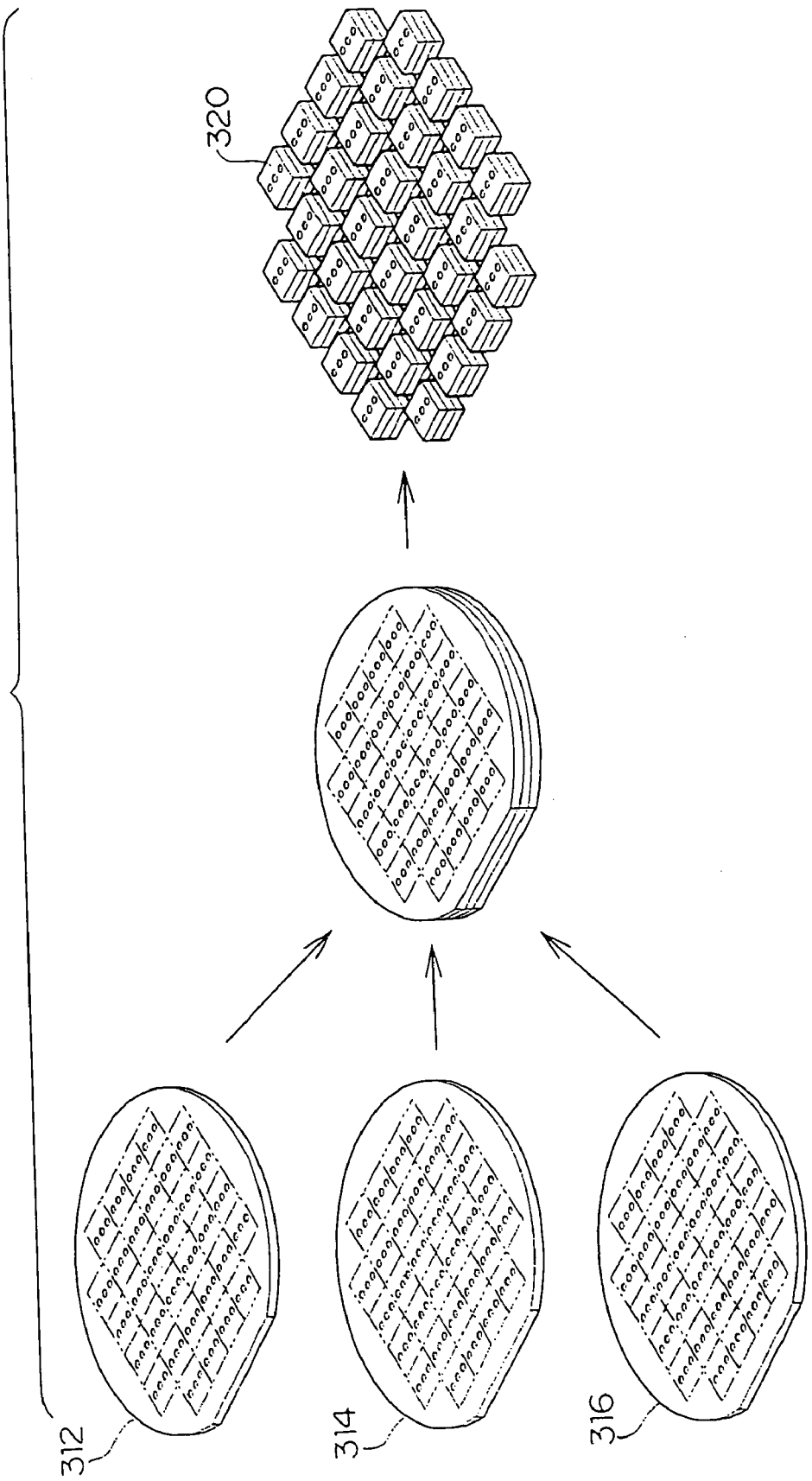
FIG. 30 is a schematic diagram showing the procedure for manufacturing a micro-reactor in a twenty-second embodiment.

Next, the twenty-second embodiment will be described. As shown in FIG. 30, the twenty-second embodiment is an example in which a micro-reactor is manufactured by bonding wafers and dividing.

In this embodiment, a wafer 312 is etched to manufacture plural plates in continuous relation to each other in the arranged state, and a wafer 314 and a wafer 316 are respectively etched to manufacture plural lid members and receiving members in continuous relation to each other in the respectively arranged state.

Then, the wafers are bonded by cool direct bonding and divided into individual micro-reactors 320 by dicing.

By such wafer level packaging technology, the manufacturing efficiency of the micro-reactor can be further improved.

Figure 31:
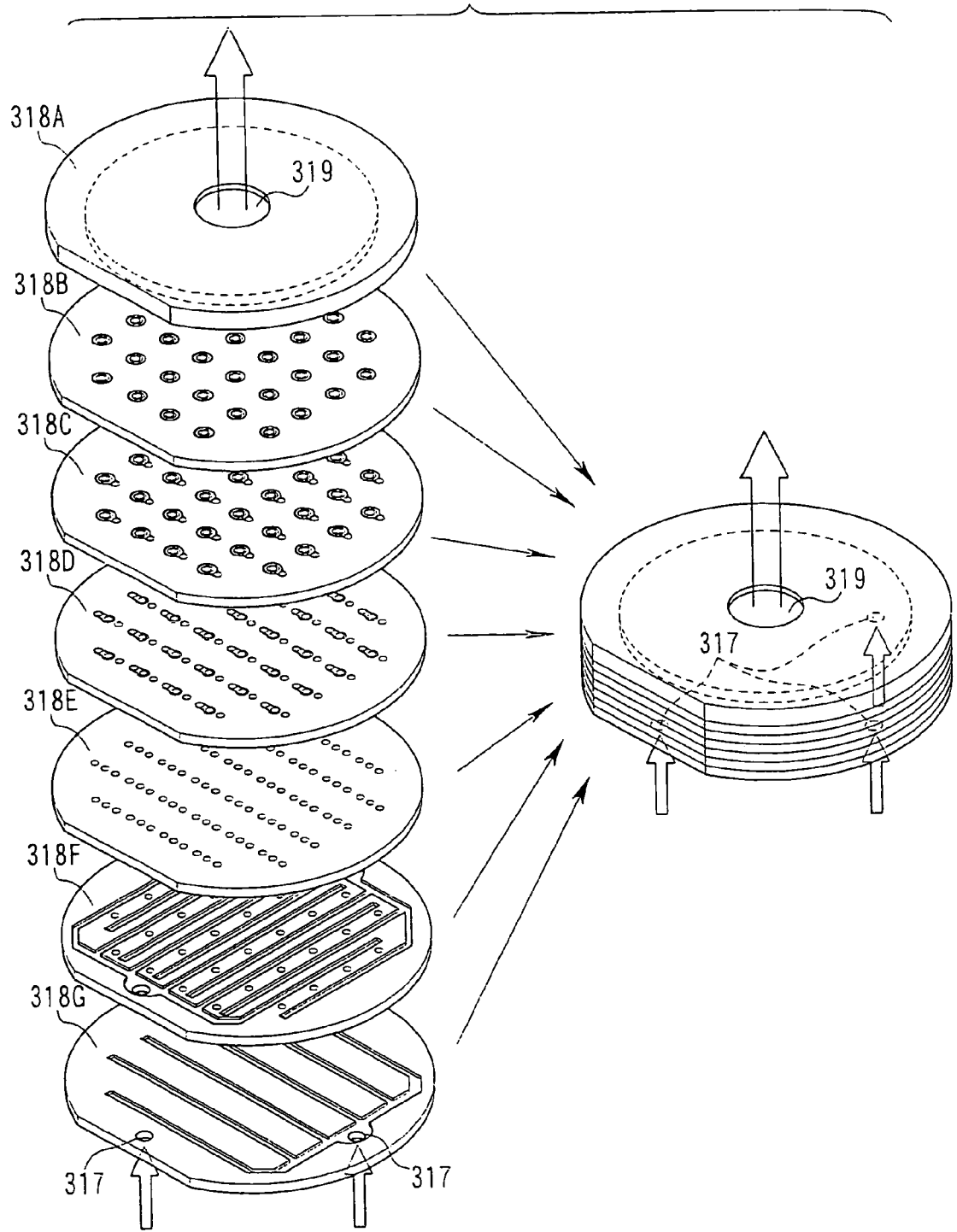
FIG. 31 is a schematic diagram showing the procedure for manufacturing another micro-reactor in the twenty-second embodiment.
Figure 32:
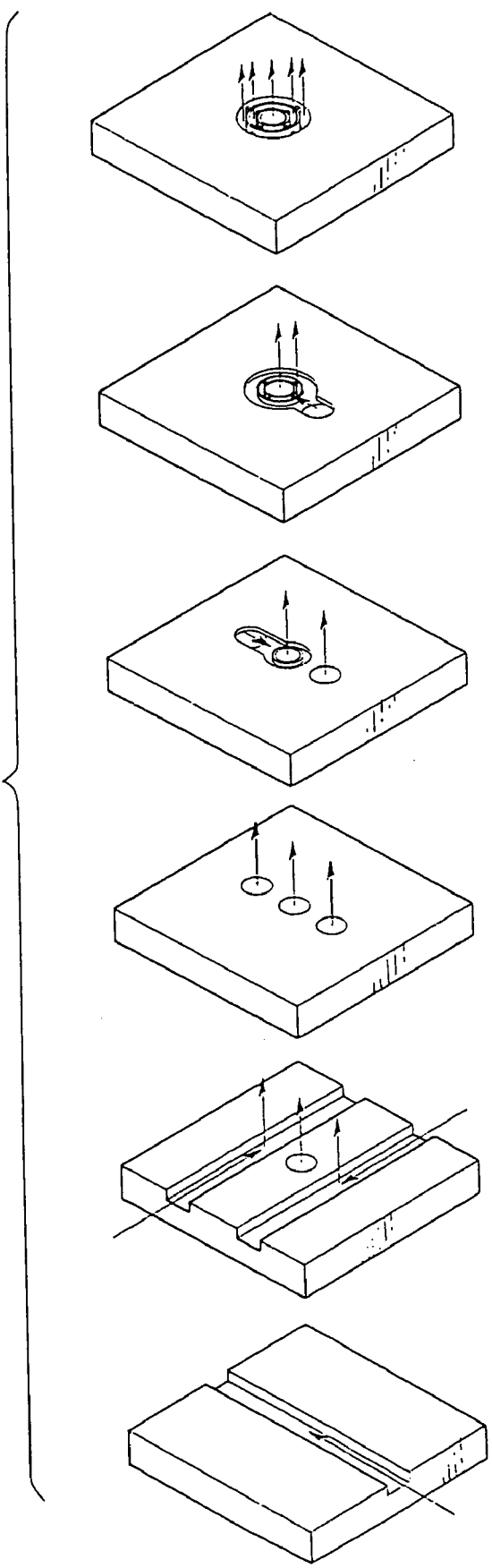
FIG. 32 is a development perspective view showing the construction of a basic module of another micro-reactor in the twenty-second embodiment.

Note that, as shown in FIGS. 31 and 32, by constructing such that the channels are formed in a state where wafers 318A to 318G are superposed, a large number of fluid mixing apparatuses can be arranged without dicing the wafers 318A to 318G.

Thus, in the case where a large amount of reaction products is manufactured by increasing the number of the apparatuses, the time required for piping operation can be drastically reduced. Further, by supplying fluids from a small number of supply ports 317 (three in FIG. 31) to a large number of concentrically rectifying portion, the mixed fluids discharged from the large number of fluid mixing parts can be taken out from one discharge port 319. By such construction, there is possibility that clogging is produced in the conventional and normal fluid mixing apparatus, however, a large-scaled apparatus that hardly clogs can be constructed by allowing the fluids to flow in the concentric manner.

Twenty-Third Embodiment

Figure 33:
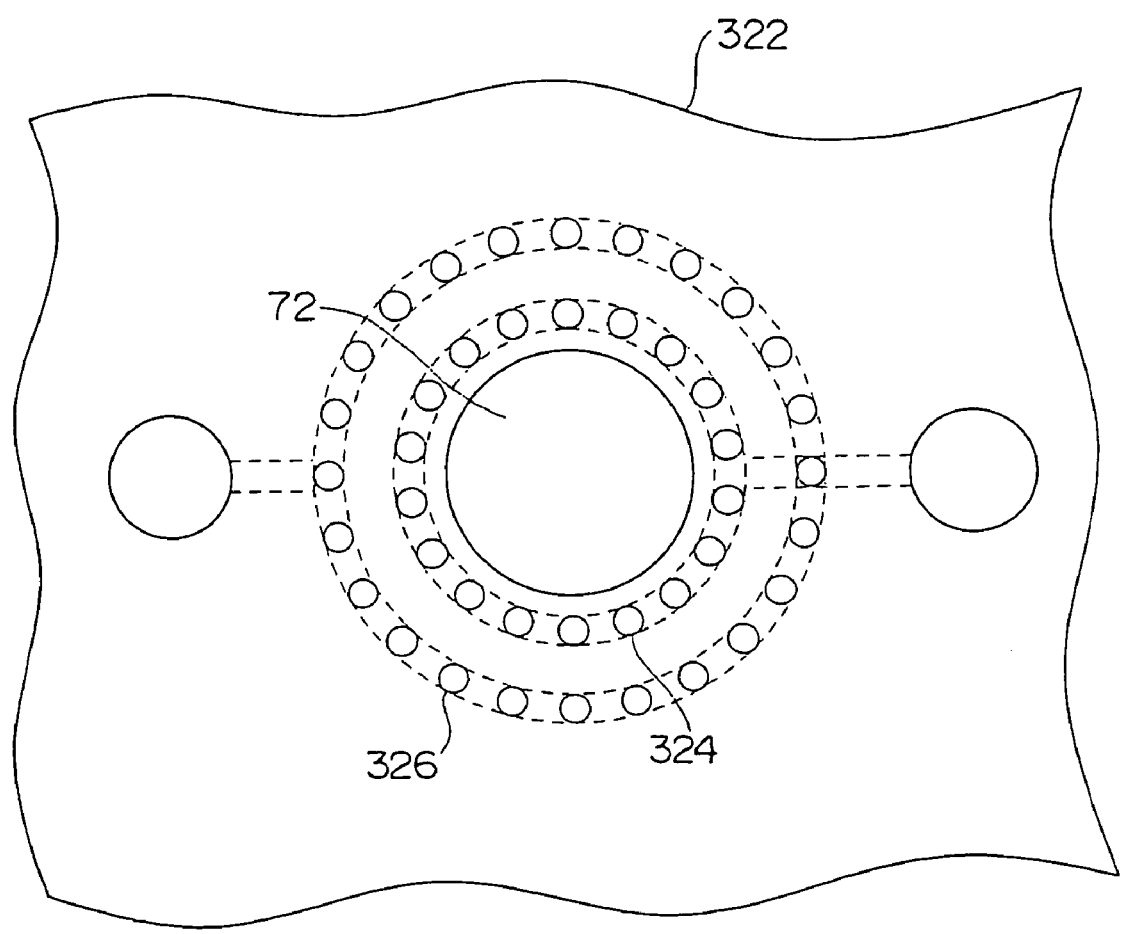
FIG. 33 is a partial front view showing the outflow side of a micro-reactor of a twenty-third embodiment.

Next, the twenty-third embodiment will be described. As shown in FIG. 33, compared to the second embodiment, a micro-reactor according to the twenty-third embodiment has a different plate construction. In a plate 322, a large number of intermediate layer outflow holes 324 arranged on the same circle are formed in place of the slit cylindrical through hole 12B described in the second embodiment (see FIG. 4 described in the first embodiment), and a large number of outermost layer outflow holes 326 arranged on the same circle are formed in place of the thick and short cylindrical concave portion 12C described in the second embodiment (see FIG. 11).

Thereby, fluids flowing from the intermediate layer outflow holes 324 and the outermost layer outflow holes 326 can generate a turbulent flow, and, alternately, even the laminar flow, that can make mutual contact interfaces of fluids broader. Therefore, the time required for mixing can be further shortened as compared to the second embodiment.

Twenty-Fourth Embodiment

Figure 34:
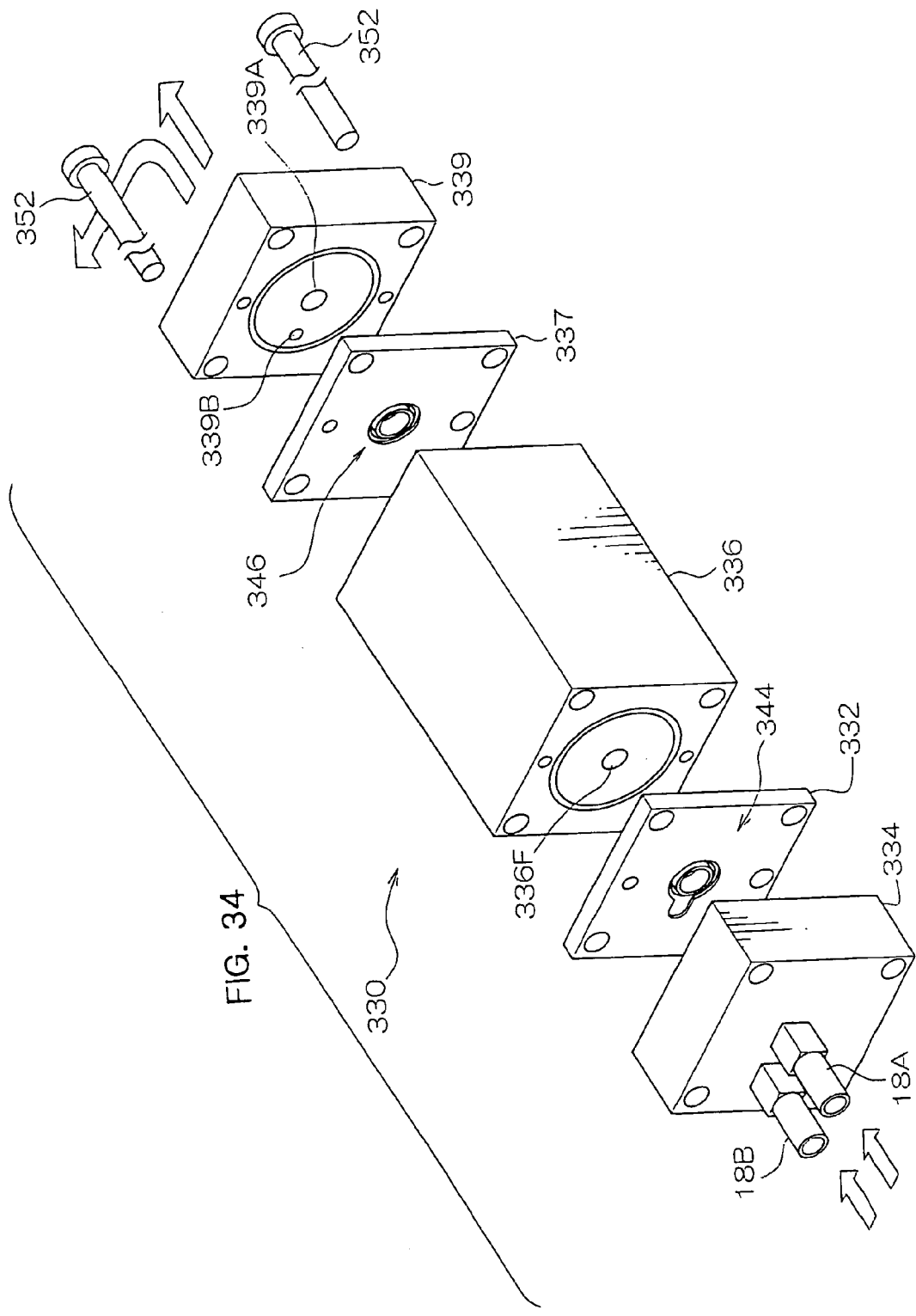
FIG. 34 is a development perspective view showing a micro-reactor of a twenty-fourth embodiment.
Figure 35:
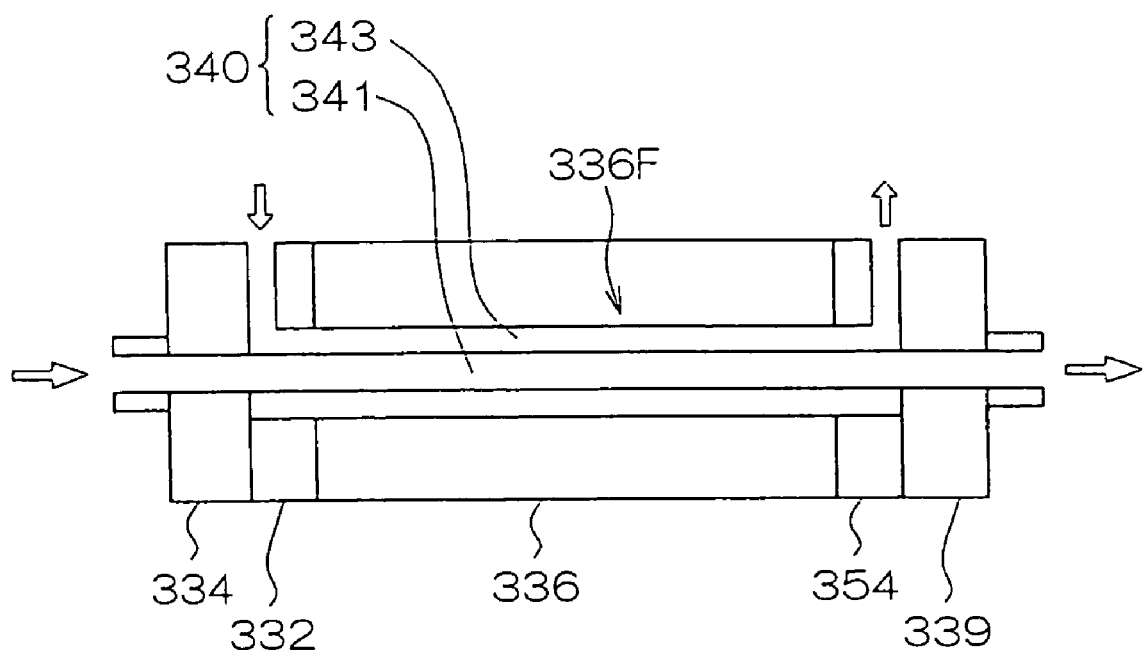
FIG. 35 is a schematic side sectional view showing that two fluids are mixed and separated in the micro-reactor of the twenty-fourth embodiment.

Next, the twenty-fourth embodiment will be described. As shown in FIGS. 34 and 35, a micro-reactor 330 according to the twenty-fourth embodiment is an apparatus for causing two fluids to react with each other by making them into a concentrically laminar flow and simultaneously mixing them, and further, obtaining the fluid flowing on the channel core side as an extract.

Figure 36:
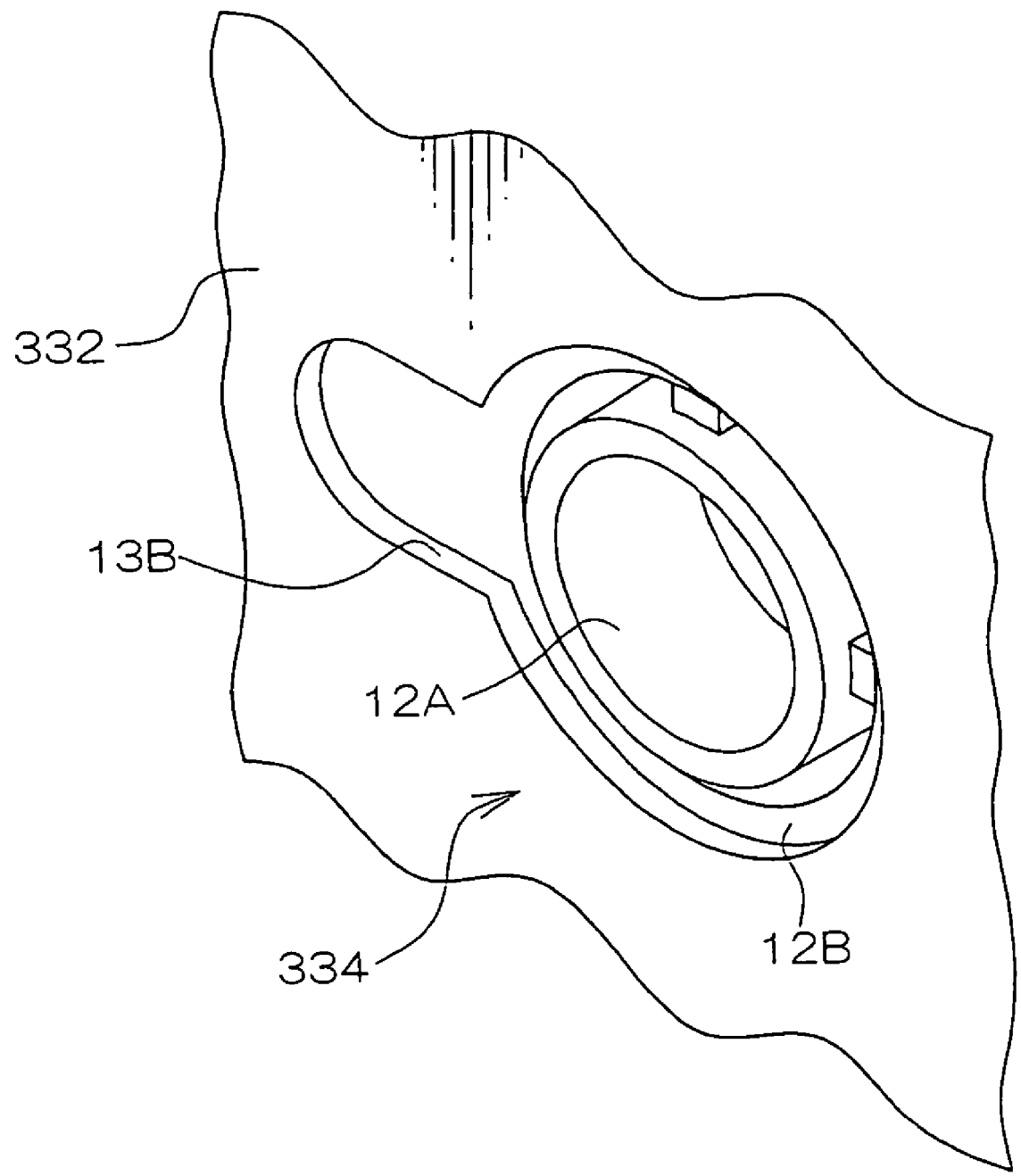
FIG. 36 is a partial perspective view showing the inflow side of a first plate constituting the micro-reactor of the twenty-fourth embodiment.

The micro-reactor 300 includes a first plate 332 (also refer to FIG. 36), and a first lid member 334 and a mixing channel member 336 disposed on the upstream side and the downstream side of the first plate 332, respectively, so as to sandwich the first plate 332. The first plate 332 and the first lid member 334 are detachably mounted on the micro-reactor. Further, compared to the first embodiment, in the first plate 332 and the first lid member 334, no channel for allowing fluids to flow to the outermost layer is formed, and the following structure is adopted.

That is, on the upstream side of the first lid member 334, connectors 20A and 20B on which two inflow pipes 18A and 18B are detachably mounted are provided. In the first plate 332, first micro-channels 344 for making the fluids respectively flowing out from the pipes 18A and 18B into a concentrically laminar flow are formed.

Further, in the mixing channel member 336, a mixing channel 336F for simultaneously mixing the two fluids flowing out from the first micro-channels 344 to make them into mixed fluids (reaction product) is formed, and thereby, reaction, diffusion, cleaning and the like proceed while the two fluids flowing out from the first micro-channels 344 maintain the concentrically laminar flow.

Furthermore, the micro-reactor 330 includes a second plate 337 (also refer to FIG. 37) disposed on the downstream side of the mixing channel member 336, and a second lid member 339 that sandwiches the second plate 337 between the mixing channel member 336 and itself. The second plate 337 and the second lid member 339 are detachably mounted on the micro-reactor 330.

In the second plate 337, second micro-channels 346 for separating and taking out a core side fluid 341 flowing on the channel core side and a wall side fluid 343 flowing on the channel wall side (channel circumference side) of the fluids flowing out in the concentrically laminar flow 340 from the mixing channel 336F, are formed. In the second lid member 339, an outflow channels 339A and 339B for discharging the core side fluid 341 and the wall side fluid 343 that have been separated and flown out by the second micro-channels 346, respectively.

Figure 37:
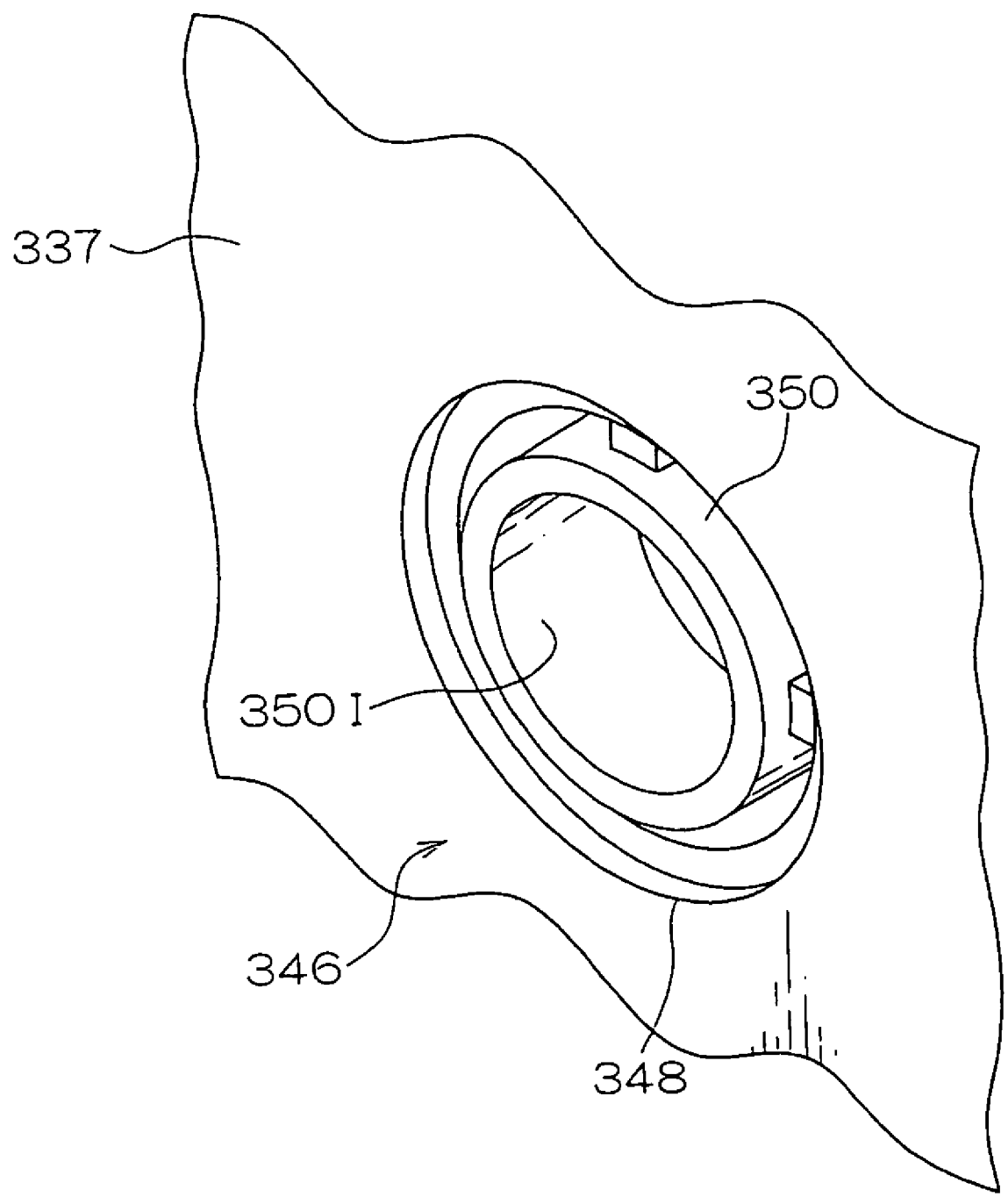
FIG. 37 is a partial perspective view showing the inflow side of a second plate constituting the micro-reactor of the twenty-fourth embodiment.

In order to form the second micro-channels 346, in the second plate 337, as shown in FIG. 37, an inflow port 348 in which the concentrically laminar flow 340 flows and an extraction partition wall plate portion 350 having a ring-shaped extraction port 350I within this inflow port 348 are formed.

The combination of the second lid member 339 and the second plate 337 is in mirror symmetrical (plane symmetrical) relation with the combination of the first plate 332 and the first lid member 334, and can form two fluids into a concentrically laminar flow and separate the concentrically laminar flow 340 having passed through the mixing channel 336F into two fluids.

The separation and collection rate of the core side fluid 341 as an extract can be improved by making the center hole diameter of the second plate 337 (inner diameter of the extraction partition wall plate portion 350) slightly larger than that of the first plate 332. If the center hole diameter of the second plate 337 is made slightly smaller than that of the first plate 332, the purity of the core side fluid 341 can be improved.

In the embodiment, for example, an organic pigment dispersant is used as the core side fluid 341, and water is used as the wall side fluid 343. Hydroxyl ions of water are diffused in the organic pigment dispersant, and thereby, organic pigments are precipitated. Because the precipitated organic pigment is larger in size and smaller in diffusion rate than the hydroxyl ion, the diffusion of the hydroxyls and the precipitation of the organic pigments are completed within the period in which they diffuse little in the water layer (wall side fluid 343) surrounding the outer periphery thereof. Therefore, there is no worry that the organic pigments adhere to the wall of the mixing channel 336F.

After the fluids separate, that is, after they pass through the second plate 337, there is worry that the organic pigments adheres to the wall, however, the second plate 337 for separation can be manufactured relatively thinner, and easily cleaned. Further, because the channel of the second lid member 339 is not necessarily a micro-channel, there is little worry about occlusion.

The diffusion rate can be made faster and the mixing channel 336F can be shortened by incorporating a heater or Peltier element into the mixing channel member 336 to heat the fluids within the mixing channel 336F to suitable temperature. By incorporating a cooling unit into the mixing channel member 336, the precipitation rate can also be made faster. Furthermore, by a combination of heating and cooling, further effect can be expected.

As a material of the micro-reactor, for example, Stainless steels (SUS) having resistance to heat and the organic pigment dispersant will be used. Note that, in the embodiment, because the organic material is covered by the water layer, even a resin generally weak for organic materials can be employed as a component member of the mixing channel member 336 by taking advantage of machinability.

The diameter of the mixing channel 336F may be a diameter of the Reynolds number equal to or less than 2300. It depends on the flow volume and the viscosity of the fluids, however, if the equivalent diameter of the mixing channel 336F is equal to or less than 10 mm$\phi$, the Reynolds number becomes equal to or less than 2300 and a laminar flow is formed in most cases. Note that, because the time for material diffusion is proportional to square of distance, if the equivalent diameter of the mixing channel 336F is larger, longer time is taken until the diffusion (reaction, cleaning) is completed, and thereby, the mixing channel 336F is required to be made longer. On this account, practically, the equivalent diameter of the mixing channel 336F is sometimes made equal to or less than 10 mm$\phi$.

Figure 38:
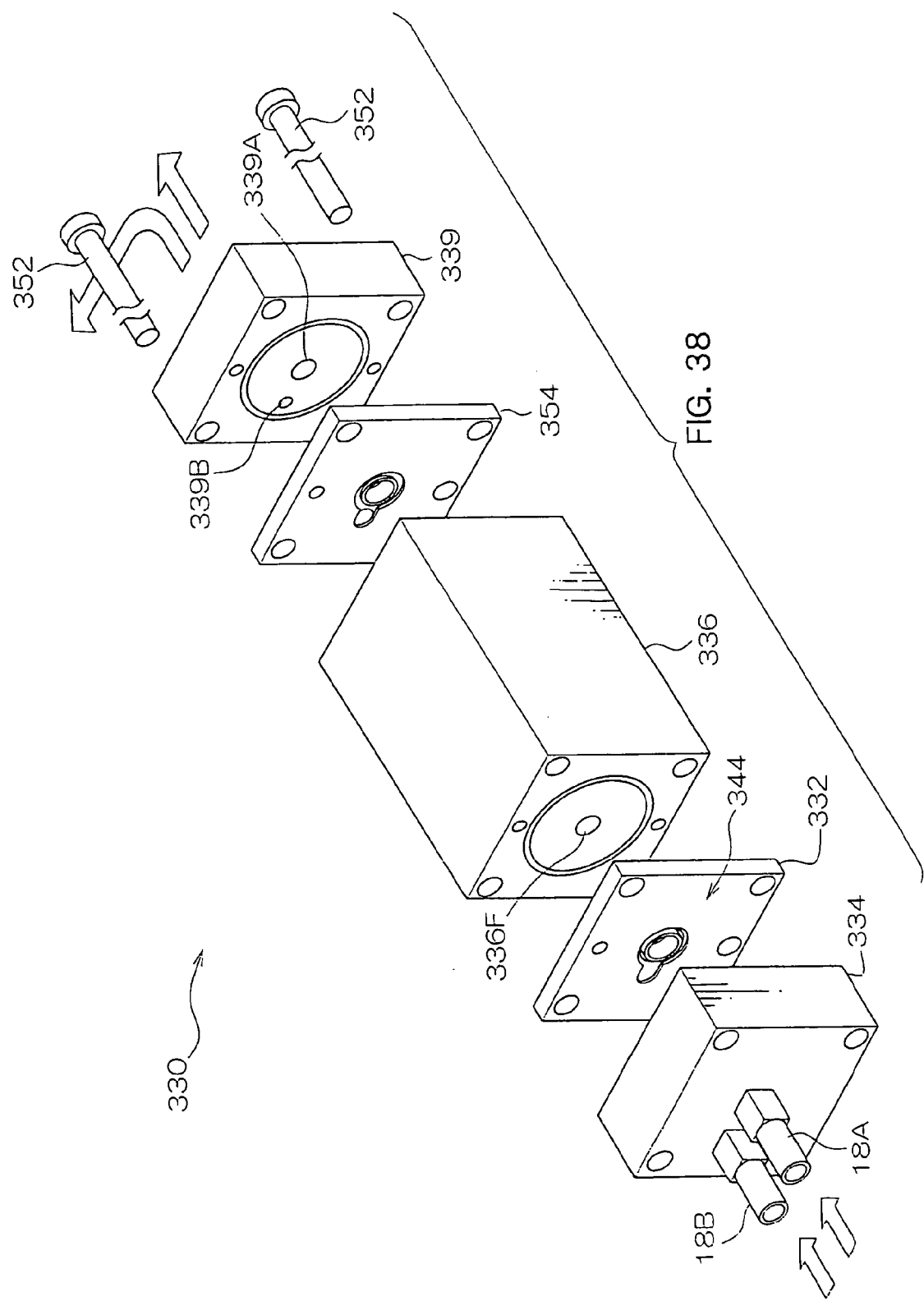
FIG. 38 is a development perspective view of a variation of the micro-reactor of the twenty-fourth embodiment.
Figure 39:
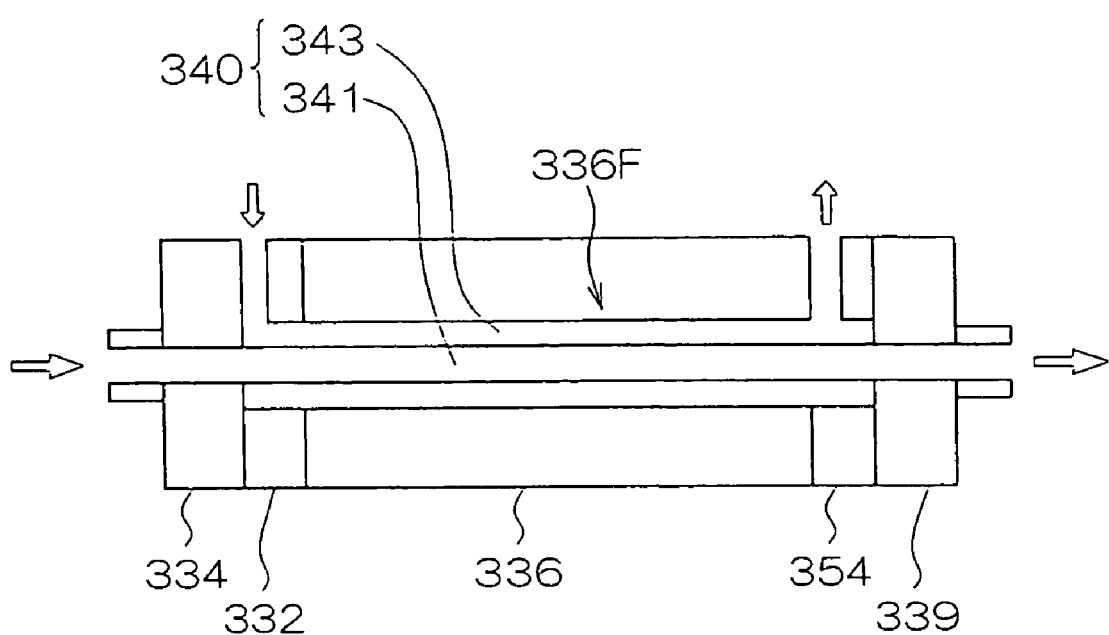
FIG. 39 is a cross-sectional view which exemplifies mixture and separation of two types of liquids of the micro-reactor of the twenty-fourth embodiment.
Figure 40:
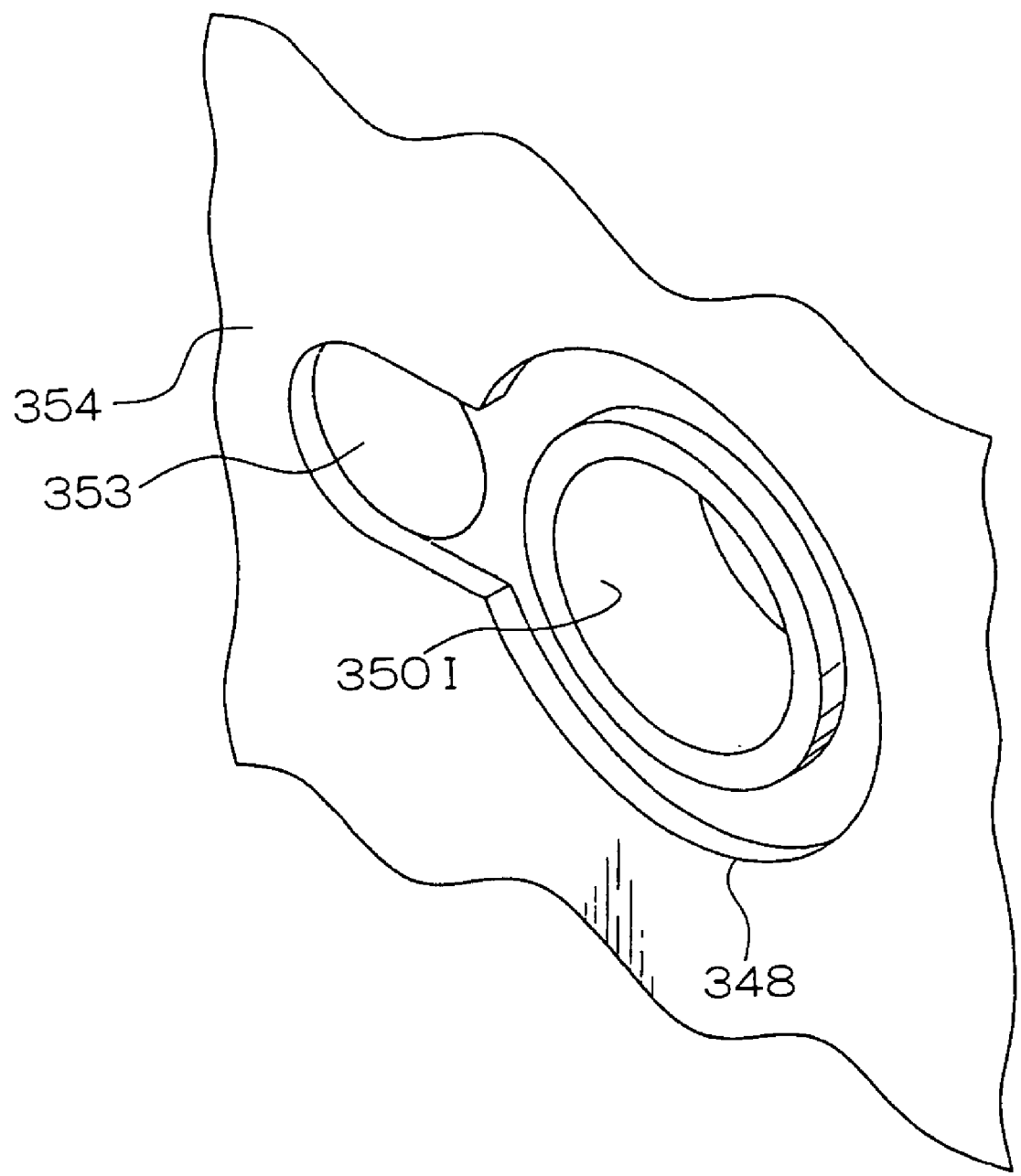
FIG. 40 is a partial perspective view of the in-flow side of the second plate of a variation of the micro-reactor of the twenty-fourth embodiment.

In the present embodiment, an example in which the second plate with the second micro-channels 346 is installed is presented as shown in FIGS. 34, 35 and 37. The second plate 354 with a through hole 353 between the upper and lower stream sides maybe installed as shown in FIGS. 38 through 40. With the second plate 337, turbulence will be prevented and separation efficiency will be ensured. No new design of micro-channels is required because the second plate 337 is the mirror image of the first plate 332. The second plate 354 has a simpler structure without micro-channels. This will facilitate production.

Figure 41:
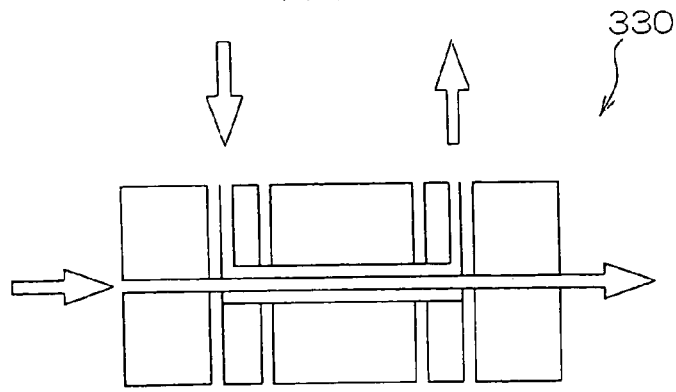
FIG. 41 is a diagram showing that the micro-reactor of the twenty-fourth embodiment is disposed along the horizontal direction.
Figure 42:
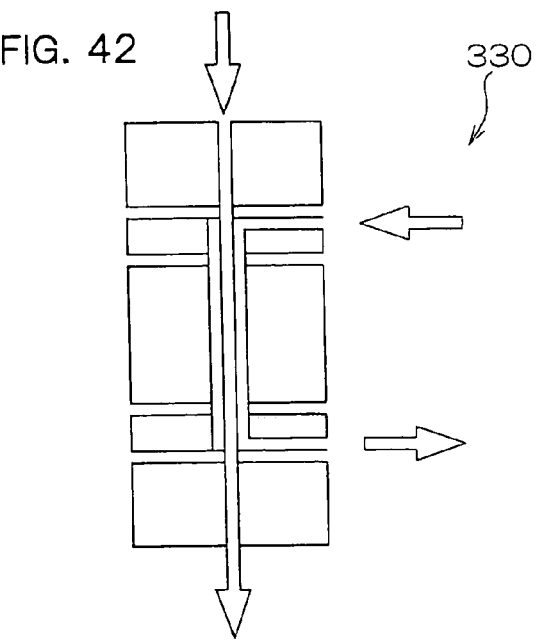
FIG. 42 is a diagram showing that the micro-reactor of the twenty-fourth embodiment is disposed along the vertical direction.

In the embodiment, as shown in FIG. 41, the example in which the micro-reactor 330 is disposed in the direction so that the mixing channel 336F is directed to the horizontal direction is shown, however, as shown in FIG. 42, disturbance of the concentrically laminar flow due to gravity can be suppressed by disposing the micro-reactor 330 in the direction so that the mixing channel 336F is directed to the vertical direction. As a result, in the case of using fluids having largely different specific gravities and large particles diffused therein, the concentrically laminar flow can be formed stably.

In addition, in the embodiment, the first lid member 334, the first plate 332, the mixing channel member 336, the second plate, and the second lid member 339 are coupled with screws 352, and O-rings are used for leak prevention of fluids, however, the assembly method is not limited to that, and direct bonding utilizing intermolecular forces between one another's member surfaces can be used. By utilizing the direct bonding, the structure using no O-ring can be adopted, and can be applied to fluids that corrode rubber materials. Furthermore, thermal deformation effect on members can be suppressed by applying an argon ion beam and the like within vacuum to members to clean the surfaces of the members at the atomic level and utilizing cold direct bonding (surface activation bonding technology) for pressure bonding at normal temperature. This cold direct bonding technology is effective for suppressing thermal stress due to difference in linear expansion coefficients in the case where the first plate 332 and the first lid member 334 are constituted by members having different materials from each other, or the second plate 337 and the second lid member 339 are constituted by members having different materials from each other.

Twenty-Fifth Embodiment

Figure 43:
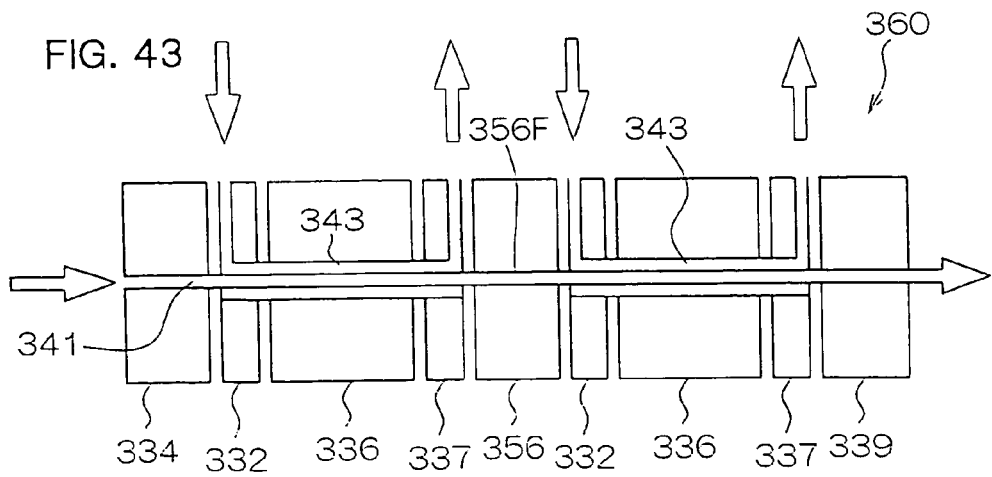
FIG. 43 is a diagram showing a micro-reactor of a twenty-fifth embodiment.

Next, the twenty-fifth embodiment will be described. As shown in FIG. 43, in a micro-reactor 360 according to the twenty-fifth embodiment, a micro-reactor 330 having no first lid member 332 is connected on the subsequent stage side of another micro-reactor 330, which form a construction similar to one in which two micro-reactors 330 are serially connected. In a block member 356, a guide channel 356F for guiding the core side fluid 341 flowing out from the upstream side micro-reactor to the downstream side micro-reactor is formed.

By using the micro-reactor 360, processes such as diffusion, reaction, or cleaning can be performed thoroughly.

Figure 44:
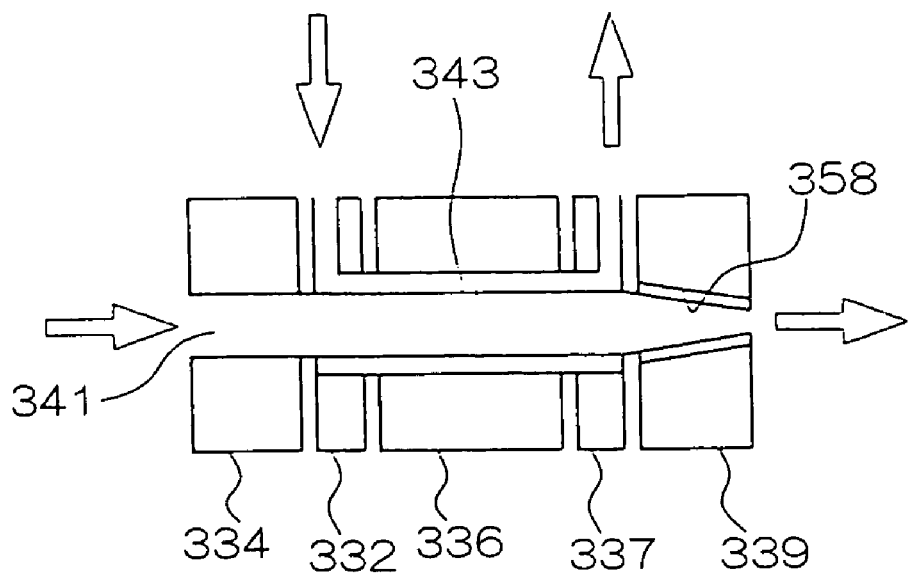
FIG. 44 is a diagram showing a module constituting an example of the micro-reactor of the twenty-fifth embodiment.

Further, in the case where the center hole diameter of the second plate 337 is made slightly larger than that of the first plate 332 to improve the collection rate, the exit dimensions of the first stage micro-reactor and the entrance dimensions of the second stage micro-reactor are made in conformity to each other by forming a tapered channel 358, which is narrowed toward end, in the second lid member 339 as shown in FIG. 44, and thereby, the micro-reactor can be modularized.

Figure 45:
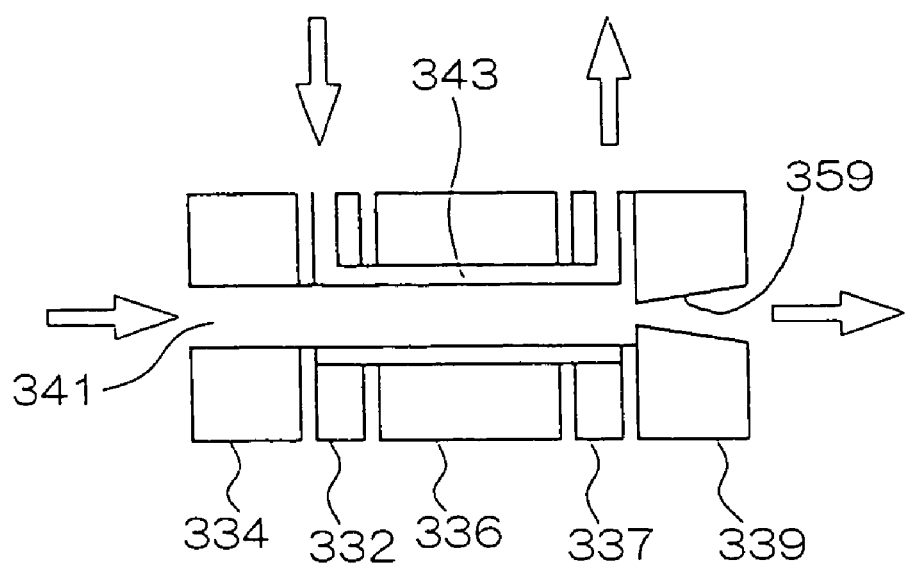
FIG. 45 is a diagram showing a module constituting an example of the micro-reactor of the twenty-fifth embodiment.

In the case where the purity of the extracted core side fluid 341 is improved, the center hole diameter of the first plate 332 is made slightly larger than that of the second plate 337 and a tapered channel 359, which is thickened toward end, is formed in the second plate 337 as shown in FIG. 45, and thereby, the micro-reactor can be modularized similarly.

Twenty-Sixth Embodiment

Figure 46:
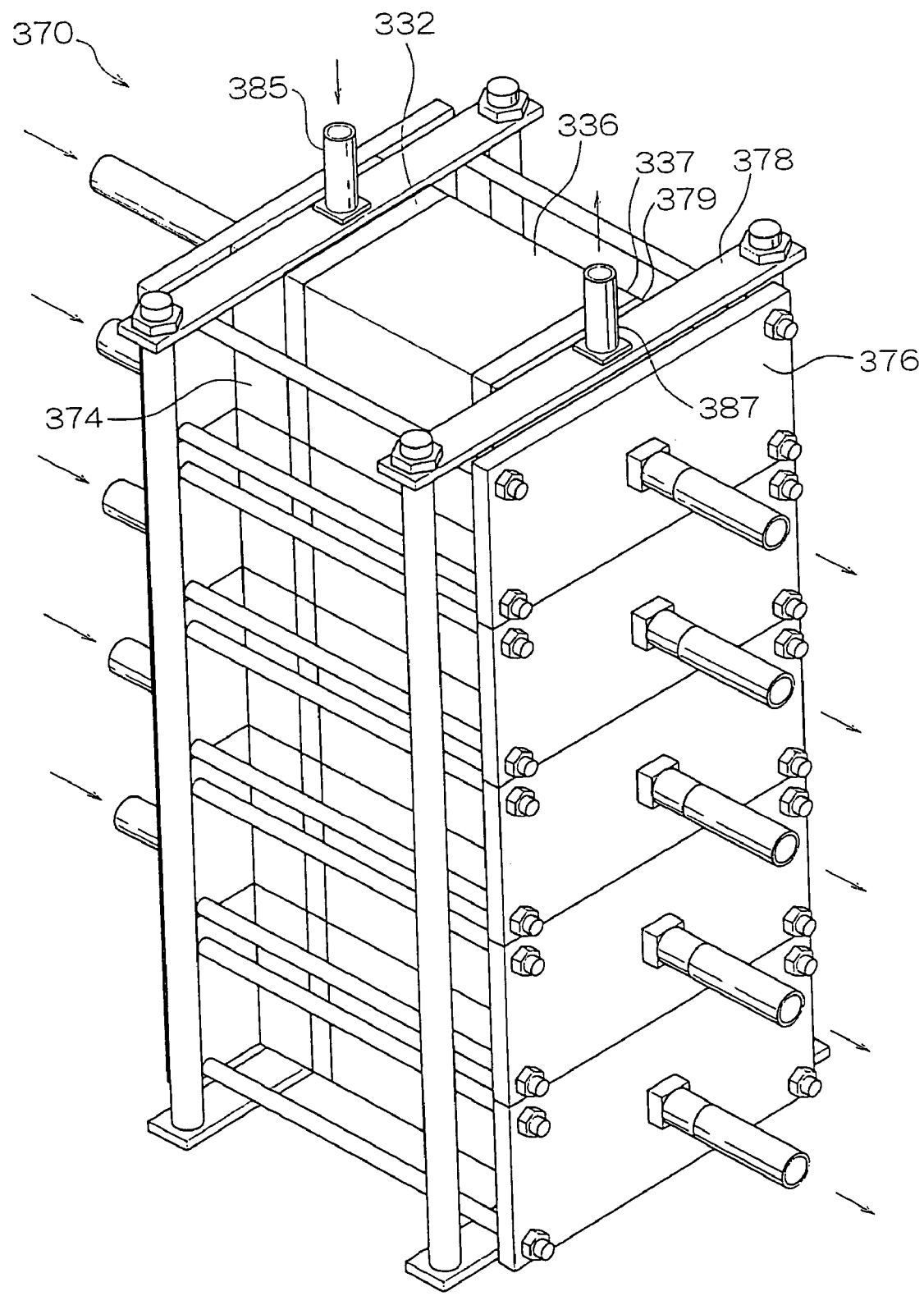
FIG. 46 is a diagram showing a micro-reactor of a twenty-sixth embodiment.

Next, the twenty-sixth embodiment will be described. As shown in FIG. 46, in the twenty-sixth embodiment, a micro-reactor 370 in which component members are secured using dampers 376 are vertically connected.

This micro-reactor 370 includes the first plate 332 and the second plate 337 described in the twenty-fourth embodiment, a first lid member 374 and the mixing channel member 336 that sandwich the first plate 332 from the upstream side and the downstream side thereof, a second lid member 379 that sandwiches the second plate 337 between the mixing channel member 336 and itself, and the above damper 376 for securing these component members. Further, in the embodiment, the micro-reactors 370 are connected vertically by outer frame dampers 378.

Figure 47:
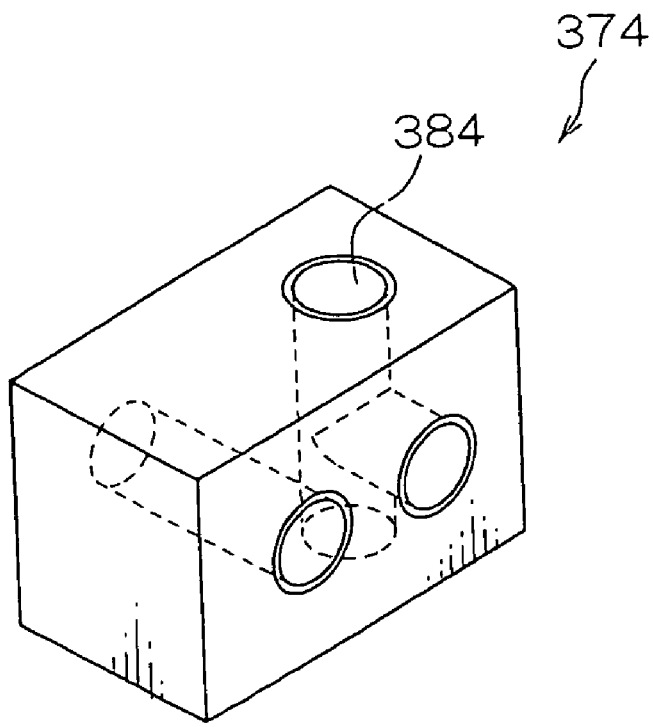
FIG. 47 is a diagram showing a first lid member constituting the micro-reactor of the twenty-sixth embodiment.

As shown in FIG. 47, in the first lid member 374, an inflow vertical channel 384 to which the fluid flowing on the channel wall side within the mixing channel of the mixing channel member 336 flows in from above is formed. This inflow vertical channel 384 penetrates the first lid member 374 in the vertical direction and communicates with inflow vertical channels of adjacent micro-reactors 370.

Figure 48:
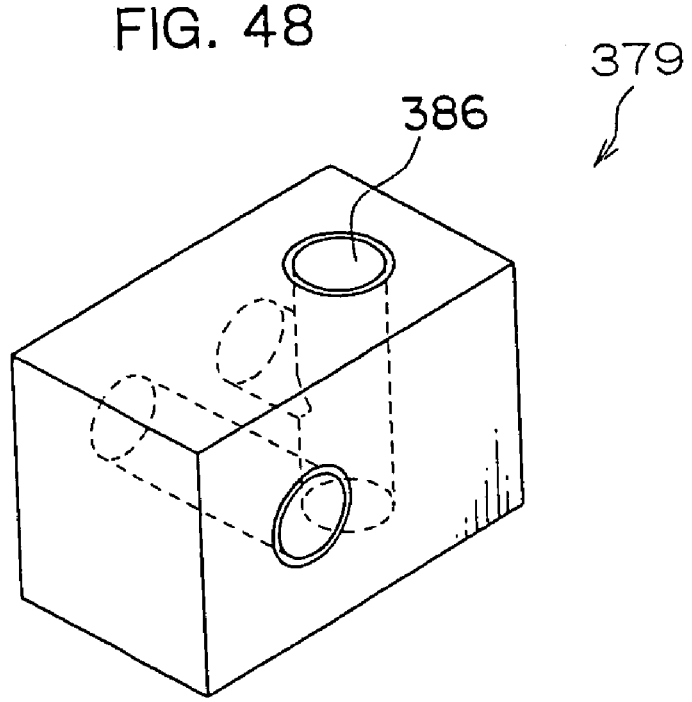
FIG. 48 is a diagram showing a second lid member constituting the micro-reactor of the twenty-sixth embodiment.

As shown in FIG. 48, in the second lid member 379, an outflow vertical channel 386 to which the fluid that has flown on the channel wall side within the mixing channel of the mixing channel member 336 flows out upwards is formed. This outflow vertical channel 386 penetrates the second lid member 379 in the vertical direction and communicates with outflow vertical channels of adjacent micro-reactors 370.

Note that, in the outer frame damper 378, an inflow pipe 385 that communicates with the inflow vertical channel 384 and an outflow pipe 387 that communicates with the outflow vertical channel 386 are formed.

As described above, in the embodiment, the micro-reactor is connectably modularized, and thereby, increase in the amount of collection by the "numbering up" (industrial application of laboratory results in a short period) can be achieved.

Twenty-Seventh Embodiment

Figure 49:
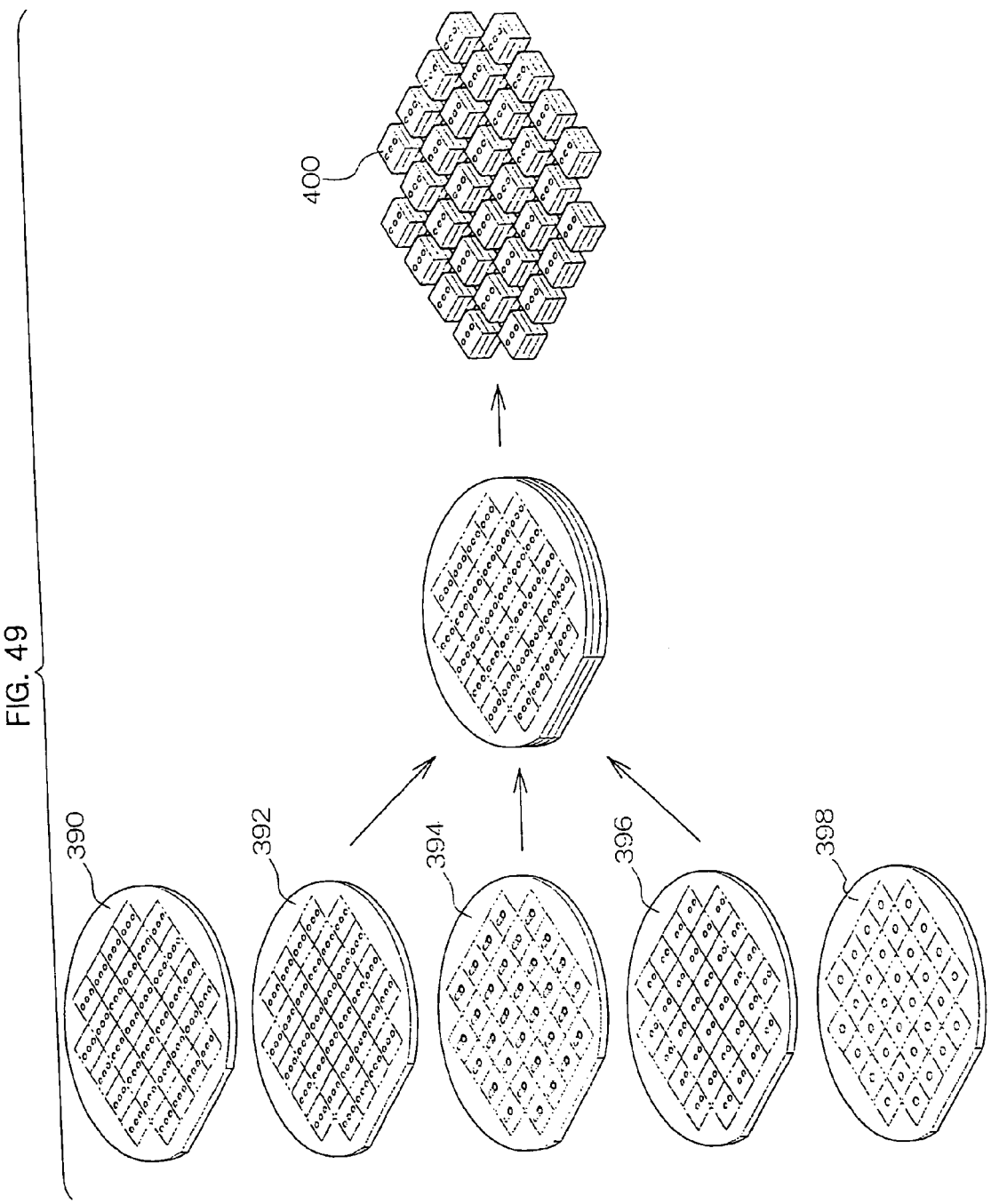
FIG. 49 is a schematic diagram showing the procedure for manufacturing a micro-reactor in a twenty-seventh embodiment.

Next, the twenty-seventh embodiment will be described. As shown in FIG. 49, the twenty-seventh embodiment is an example in which a micro-reactor is manufactured by bonding wafers and dividing.

In this embodiment, a wafer 390 is etched to manufacture plural first lid members in continuous relation to each other in the arranged state, and a wafer 392 and a wafer 394 are respectively etched to manufacture plural first plates and mixing channel members in continuous relation to each other in the respectively arranged state. Further, a wafer 396 and a wafer 398 are respectively etched to manufacture second plates and second lid members in continuous relation to each other in the respectively arranged state.

Then, the wafers are bonded and divided into individual micro-reactors 400 by dicing. When bonding, adhesives may be used, however, by using the direct bonding technology, running off of the adhesives to channels can be prevented. In the case where heat bonding is performed, pyrex (R) having nearly the same linear expansion coefficient as silicon can be used, however, in the case where wafers having different linear expansion coefficients are bonded, cool direct bonding is preferably performed.

By such wafer level packaging technology, the manufacture efficiency of micro-reactors can be raised further.

In addition, because the micro-channels are formed by wet etching, materials (for example, SUS) other than silicon can be used. Further, using the electric discharge machining, machining can be performed on all materials having conductivity.

Figure 50:
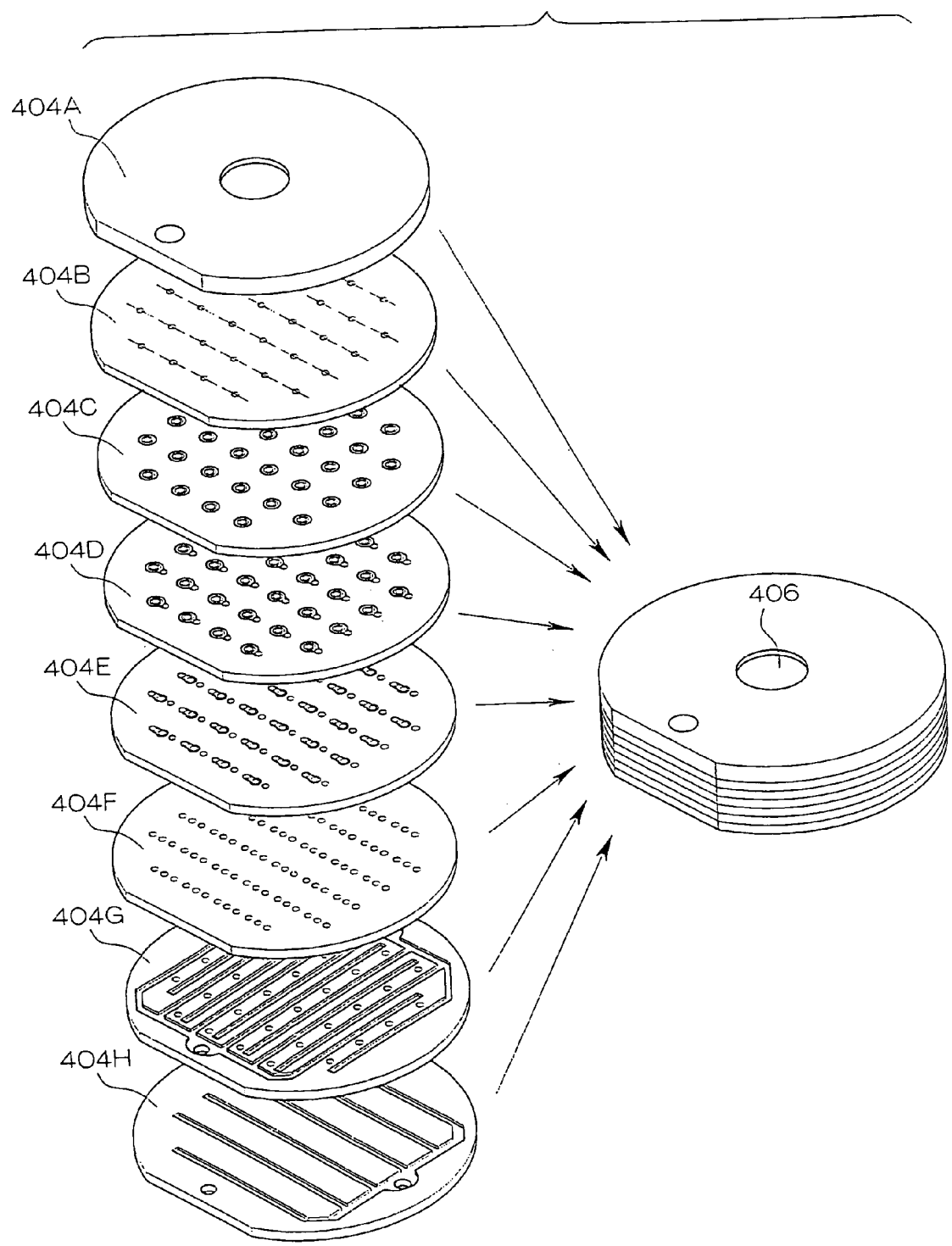
FIG. 50 is a schematic diagram showing the procedure for manufacturing another micro-reactor in the twenty-seventh embodiment.

Furthermore, as shown in FIG. 50, because the construction in which the channels are formed with wafers 404A to 404H in a superposed state has been adopted, a large number of micro-reactors can be arranged without dicing the wafers 404A to 404H. Thereby, in the case where a large amount of reaction product is manufactured by numbering up, the time required for dicing or piping operation can be drastically reduced. In addition, fluids can be supplied from a small number of supply ports to a large number of micro-reactors and extracted mixed fluids can be taken out from one take-out port 406. By adopting such construction, a large-scaled apparatus that hardly clogs can be constructed.

Twenty-Eighth Embodiment

Figure 51:
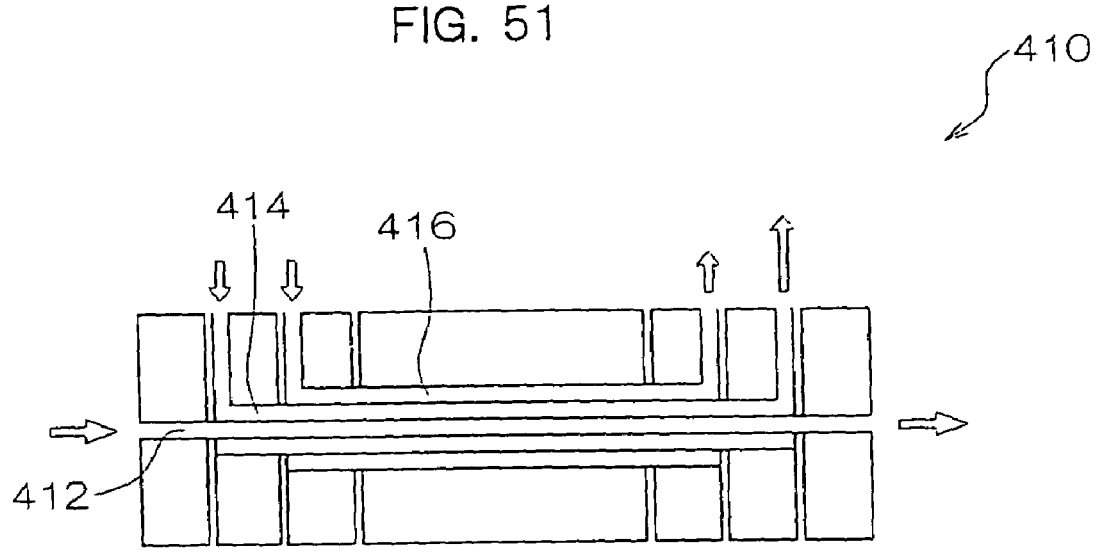
FIG. 51 is a schematic side sectional view showing that separation and extraction are performed by causing three fluids to react with each other to in a micro-reactor of a twenty-eighth embodiment.

Next, the twenty-eighth embodiment will be described. As shown in FIG. 51, a micro-reactor 410 according to the twenty-eighth embodiment is a micro-reactor for causing three fluids to react with each other to perform separation and extraction.

In this embodiment, the silver nitrate solution, the gelatin solution, and the haloid salt solution are allowed to flow in an innermost portion 412, an intermediate layer 414, an outermost layer 416, respectively, in a concentrically laminar flow state to form silver salt fine particles for photosensitive materials. The silver halide formed by reaction of silver nitrate and halide salt is trapped by the gelatin solution as the intermediate layer 414.

By this embodiment, only the intermediate layer 414 can be separated and extracted.

Twenty-Ninth Embodiment

Figure 52:
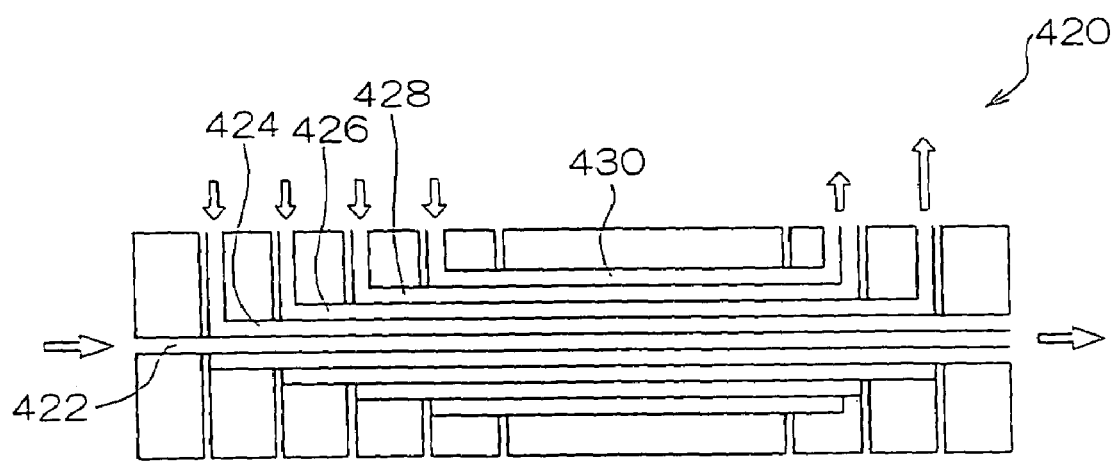
FIG. 52 is a schematic side sectional view showing that separation and extraction are performed by causing three fluids to react with each other to in a micro-reactor of a twenty-ninth embodiment.
Figure 53:
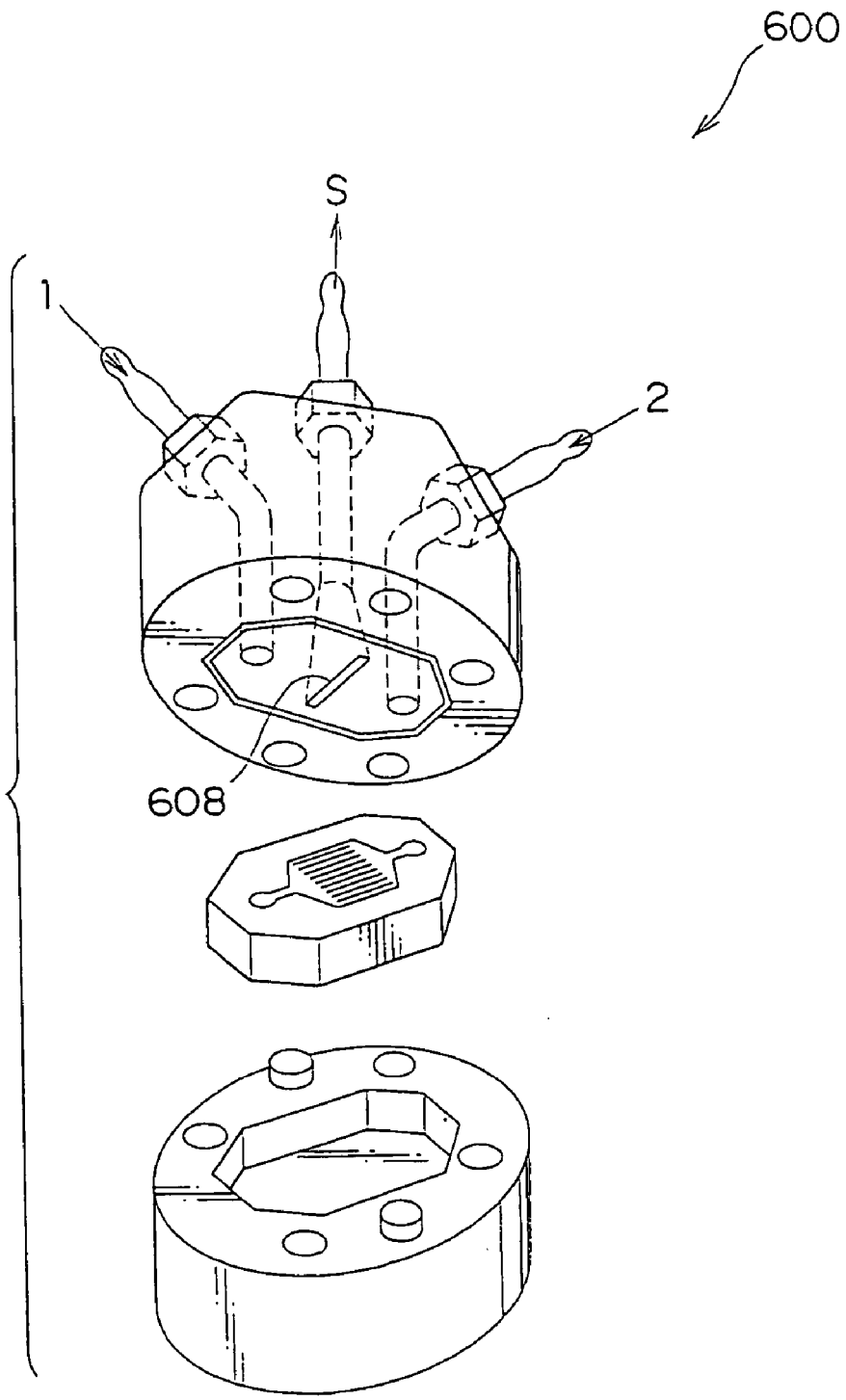
FIG. 53 is a development perspective view showing an example of a conventional micro-reactor.
Figure 54:
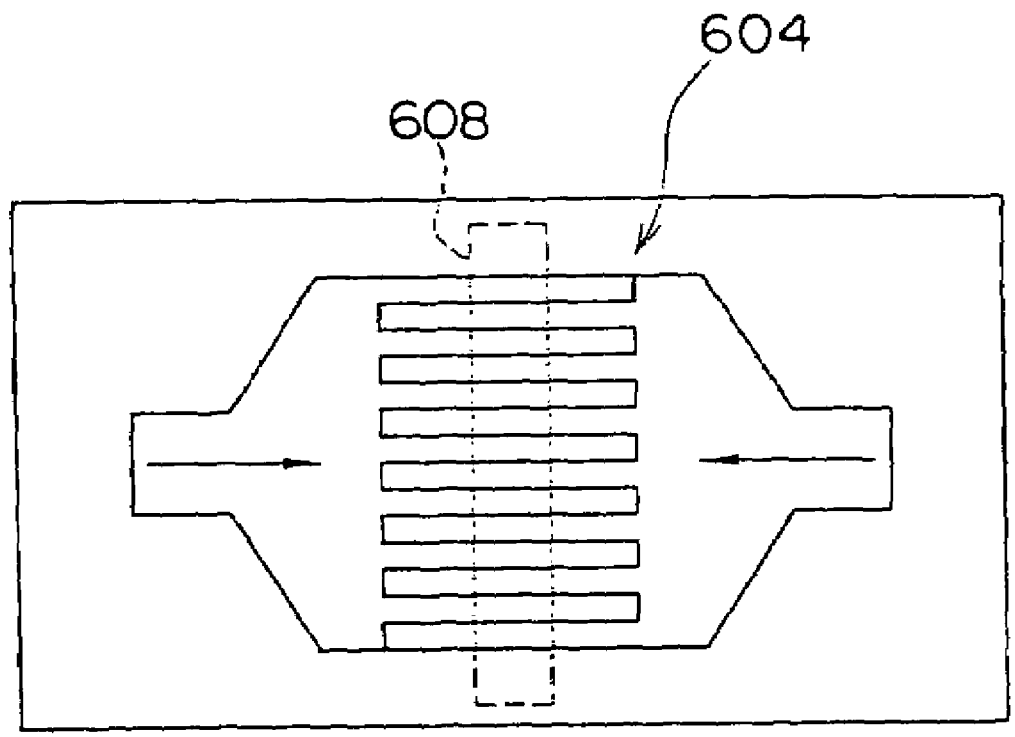
FIG. 54 is a plan view showing a micro-channel structure in the example of the conventional micro-reactor.
Figure 55:
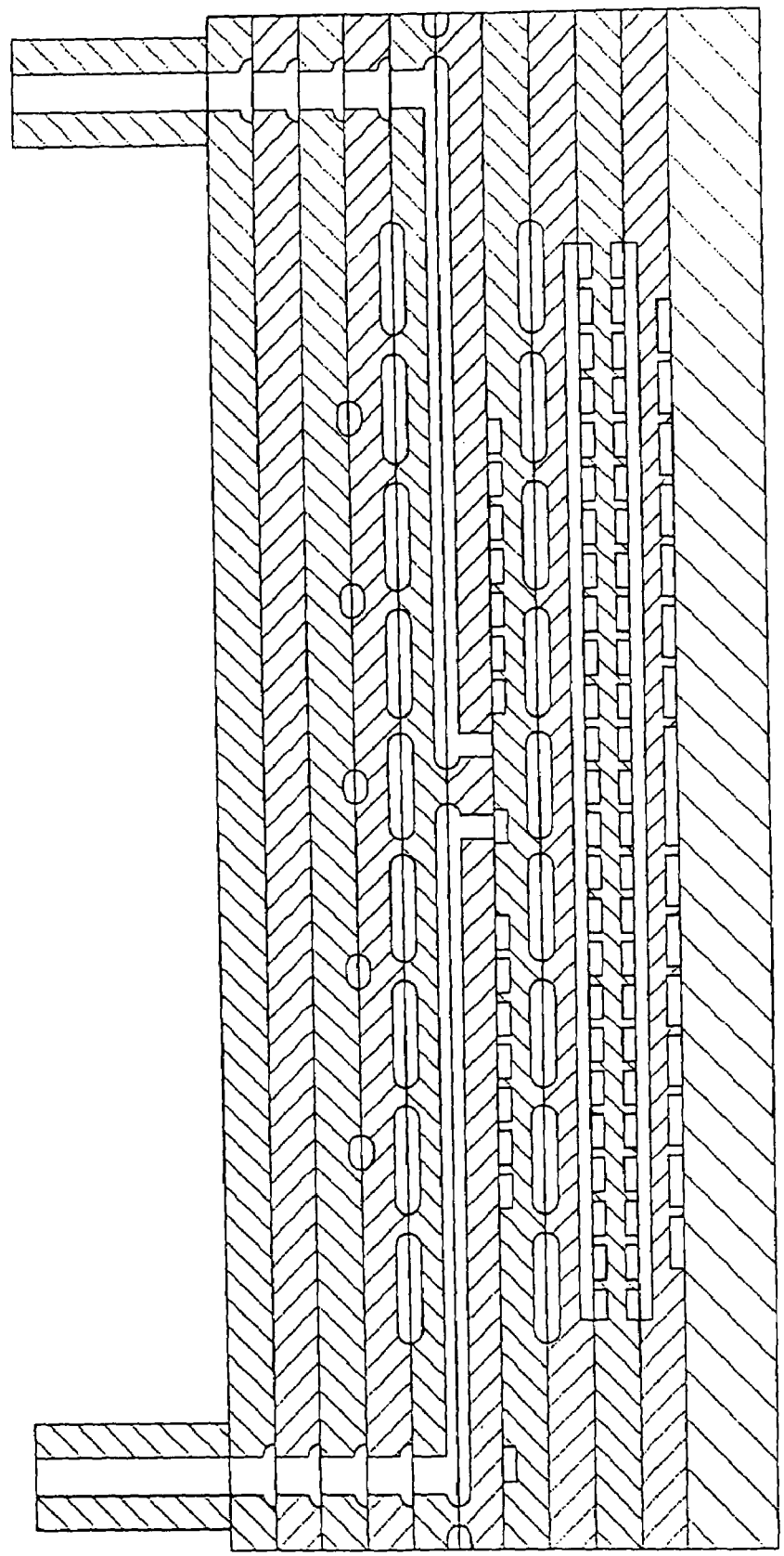
FIG. 55 is a sectional view showing the structure of another example of the conventional micro-reactor.
Figure 56:
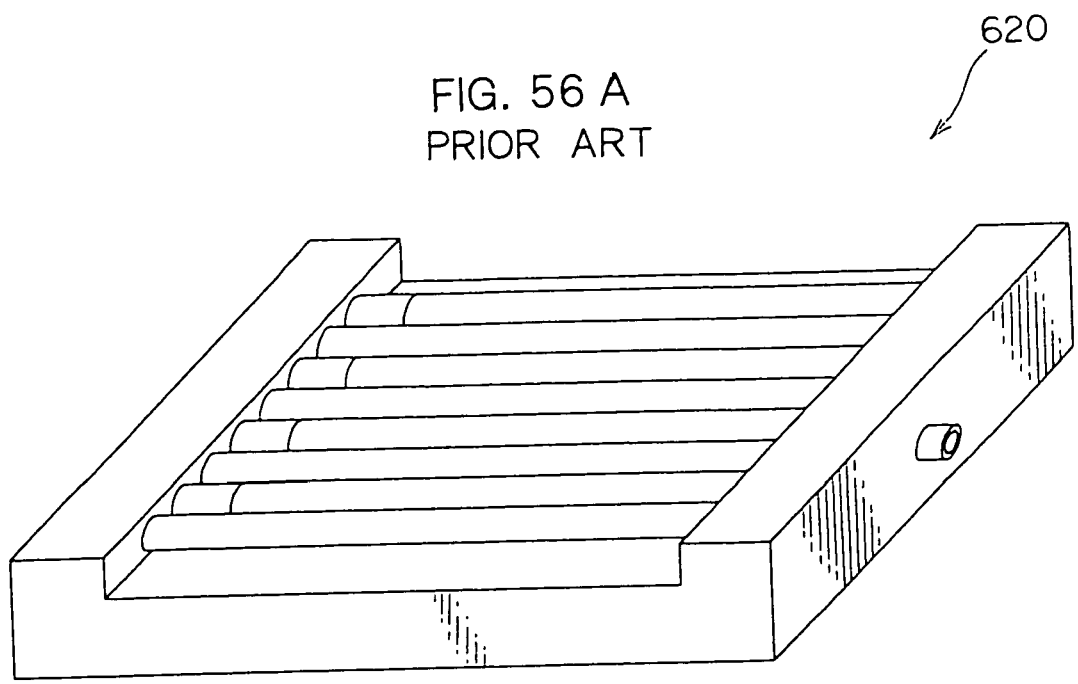
FIG. 56A is a perspective view showing yet another example of the conventional micro-reactor.
FIG. 56B is a side sectional view showing yet another example of the conventional micro-reactor.
FIG. 56C is a partial enlarged perspective view showing yet another example of the conventional micro-reactor.
Figure 56:
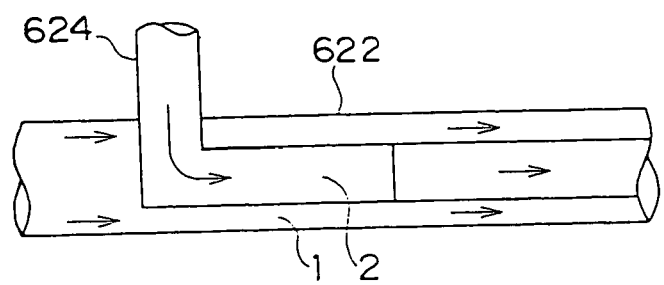
Figure 56:
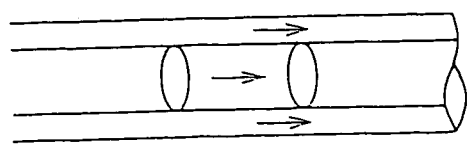

Next, the twenty-ninth embodiment will be described. As shown in FIG. 52, a micro-reactor 420 according to the twenty-ninth embodiment is a micro-reactor for causing five fluids to flow in a concentrically laminar flow to perform reaction, separation, and extraction.

In this embodiment, water is allowed to flow in both the innermost portion 422 and the outermost layer 430, and the silver nitrate solution, the gelatin solution, and the haloid salt solution are allowed to flow in a first intermediate layer 424 adjacent to the outer periphery side of the innermost portion 422, a second intermediate layer 426 adjacent to the outer periphery side of first intermediate layer 424, and a third intermediate layer 428 adjacent to the outer periphery side of second intermediate layer 426, respectively.

Thereby, the area of the reaction interface can be increased, and haloid salt can be prevented from adhering to channel walls along which the concentrically laminar flow of five fluids flow. Note that, in the embodiment, Neither separation or extraction of the inner side (the third intermediate layer 428) haloid salt solution from the water in the outermost layer 430, and neither separation or extraction of the outer side (the first intermediate layer 424) silver nitrate solution from the water in the innermost layer 422 are required to be performed. Therefore, the fluids may be separated and extracted into three kinds of the gelatin solution flowing out from the second intermediate layer 426, the solution on the outer side thereof, and the solution on the inner side thereof.

Even in a micro-reactor for allowing six fluids or more in a concentrically laminar flow, only a particular fluid can be separated and extracted by the same construction.

As described above, the embodiments of the invention have been described referring to the embodiments, however, these embodiments are examples, and can be implemented by making various changes to the embodiments within the scope without departing from the content. Further, it goes without saying that the scope of the right of the invention is not limited to the above described embodiments.

Because the invention adopts the above described constructions, a fluid mixing apparatus and a fluid mixing system capable of preventing the reaction product from adhering to the channel wall and being mass-produced at low cost, and of having ease of maintenance can be realized. Further, a fluid separation apparatus and a fluid mixing and separation apparatus for separating and extracting a fluid layer to be extracted after mixing from other fluid layers can be realized.

What is claimed is:

1. A fluid mixing apparatus for mixing different kinds of fluids comprising:
   a concentrically rectifying portion which rectifies fluids flowing into the concentrically rectifying portion to flow out as concentric flows; and
   a fluid mixing portion for mixing the concentric flow that is flowing out from the concentrically rectifying portion,
   wherein the concentric rectifying portion and the fluid mixing portion are separate members,
   wherein the concentrically rectifying portion comprises radial channels and axial through holes in a plate and includes plural outflow channels for allowing fluids as concentric flows, wherein said concentric rectifying portion is detachably mounted to the fluid mixing portion,
   wherein a rib is provided along an outflow direction between an innermost channel wall portion forming an innermost channel that is located innermost of the plural outflow channels and an adjacent channel wall portion located outside of the innermost channel wall portion and forming an outflow channel between the innermost channel wall portion and itself, and the innermost channel wall portion is supported onto the adjacent channel wall portion by the rib,
   wherein the downstream portion side of the rib is chamfered.

2. A fluid mixing apparatus according to claim 1, wherein a lid portion to which an inflow pipe is connected for guiding the fluid from the inflow pipe to an inflow port of the concentrically rectifying portion is detachably mounted to an inflow port side of the concentrically rectifying portion.

3. A fluid mixing apparatus according to claim 2, wherein positioning holes are formed in the lid portion, the concentrically rectifying portion, and the fluid mixing portion, and the relative positions of the lid portion, the concentrically rectifying portion, and the fluid mixing portion are positioned by a positioning pin penetrating the positioning holes.

4. A fluid mixing apparatus according to claim 2, wherein spigot structure portions are formed in the lid portion, the concentrically rectifying portion, and the fluid mixing portion, and the relative positions of the lid portion, the concentrically rectifying portion, and the fluid mixing portion are positioned by the spigot structure portions.

5. A fluid mixing apparatus according to claim 1, wherein the concentrically rectifying portion has a plate form and includes plural outflow channels for allowing fluids as concentric flows, and the concentrically rectifying portion and the fluid mixing portion are bonded by hot direct bonding or cold direct bonding.

6. A fluid mixing apparatus according to claim 5, wherein the concentrically rectifying portion and the fluid mixing portion are manufactured by forming a large number of the parts on a wafer in an arranged state and dicing them.

7. A fluid mixing apparatus according to claim 5, wherein a large number of the concentrically rectifying parts and the fluid mixing parts are formed on a wafer or a blank material, and
   a channel plate for supplying fluids from one or a small number of supply ports to the large number of the concentrically rectifying parts and the wafer or the blank material are coupled.

8. A fluid mixing apparatus according to claim 7, wherein mixed fluids discharged from a large number of the fluid mixing parts are taken out from one or a small number of take-out ports.

9. A fluid mixing apparatus according to any one of claims 1 and 3 to 8, wherein a tapered portion is formed in a direction in which an outflow cross section area is enlarged on at least one channel wall of the plural outflow channels.

10. A fluid mixing apparatus according to claim 1, wherein an outflow port area of the plural outflow channels is set according to concentration of fluids to be allowed to flow in the concentrically rectifying portion so that a flow volume ratio of the fluids respectively flowing out from the plural outflow channels may be a mixing ratio necessary for a product formed by mixing.

11. A fluid mixing apparatus according to claim 1, wherein a downstream portion side of the rib is eliminated.

12. A fluid mixing apparatus according to claim 1, wherein an annular channel is formed by putting a core material through the innermost outflow channel.

13. A fluid mixing apparatus according to claim 1, wherein a cross section area of at least one of the plural outflow channels has a polygonal form or a contact area enlargement form in and out of which the channel wall comes.

14. A fluid mixing apparatus according to claim 1, further comprising a turbulence plate in which a turbulence generating hole for generating a turbulent flow by passage of fluids is formed between the concentrically rectifying portion and the fluid mixing portion.

15. A fluid mixing apparatus according to claim 1, wherein the fluid mixing apparatuses are serially connected, and fluids mixed in the upstream side fluid mixing apparatus are allowed to flow in one inflow port of the downstream side fluid mixing apparatus, and fluids to be mixed are further allowed to flow in the other inflow port of the downstream side fluid mixing apparatus.

16. A fluid mixing apparatus according to claim 15, wherein the fluid mixing apparatuses are serially connected with a plate-form connecting member therebetween, and
   an inflow port for allowing fluids to be mixed to flow in is further formed in the connecting member.

17. A fluid mixing apparatus according to claim 1, wherein plural of the concentrically rectifying parts are formed in one plate.

18. A fluid mixing apparatus according to claim 1, wherein the apparatus is formed by modularizing the fluid mixing apparatuses and connecting them to each other.

19. A fluid mixing apparatus according to claim 1, wherein a concave portion is formed in the concentrically rectifying portion, and a convex portion that enters the concave portion is formed in the fluid mixing portion, and the outermost outflow channel is extended by a gap formed by the concave portion and the convex portion.

20. A fluid mixing apparatus according to claim 1, wherein a temperature sensor for measuring temperature of fluids and a heater for heating fluids within the channels are provided in the concentrically rectifying portion.

21. A fluid mixing apparatus according to claim 20, wherein the temperature sensor and the heater are embedded in the concentrically rectifying portion.

22. A fluid mixing apparatus according to claim 1, wherein the concentrically rectifying portion and the fluid mixing portion are consisted of a magnetic material, and are attracted to each other by magnetic force.

23. A fluid mixing apparatus according to claim 1, further comprising a channel for one of the concentric flows which is tapered to an enlarged outflow cross sectional area.

24. The fluid mixing apparatus according to claim 1, wherein the plate has a polygonal shape.

* * * * *